(12) United States Patent
Depelteau et al.

(10) Patent No.: US 7,725,450 B1
(45) Date of Patent: May 25, 2010

(54) INTEGRATED SEARCH ENGINE DEVICES HAVING PIPELINED SEARCH AND TREE MAINTENANCE SUB-ENGINES THEREIN THAT MAINTAIN SEARCH COHERENCE DURING MULTI-CYCLE UPDATE OPERATIONS

(75) Inventors: Gary Depelteau, Ottawa (CA); David W. Carr, Ottawa (CA)

(73) Assignee: NetLogic Microsystems, Inc., Mountain View, CA (US)

( * ) Notice: Subject to any disclaimer, the term of this patent is extended or adjusted under 35 U.S.C. 154(b) by 391 days.

(21) Appl. No.: 11/685,982

(22) Filed: Mar. 14, 2007

Related U.S. Application Data

(63) Continuation-in-part of application No. 11/184,243, filed on Jul. 19, 2005.

(60) Provisional application No. 60/867,277, filed on Nov. 27, 2006, provisional application No. 60/590,500, filed on Jul. 23, 2004, provisional application No. 60/642,799, filed on Jan. 11, 2005.

(51) Int. Cl.
G06F 7/00 (2006.01)
G06F 17/30 (2006.01)

(52) U.S. Cl. .................. 707/706; 707/764; 707/797

(58) Field of Classification Search .................. 707/706, 707/764, 769, 797, 999.003
See application file for complete search history.

(56) References Cited

U.S. PATENT DOCUMENTS 4,606,002 A   8/1986   Waisman et al.
5,228,115 A   7/1993   Natarajan
5,430,869 A   7/1995   Ishak et al.
5,446,887 A   8/1995   Berkowitz
5,475,837 A   12/1995  Ishak et al.
5,560,007 A   9/1996   Thai
5,644,763 A   7/1997   Roy
5,666,494 A   9/1997   Mote, Jr.
5,758,356 A   5/1998   Hara et al.
5,787,430 A   7/1998   Doeringer et al.
5,812,996 A   9/1998   Rubin et al.
5,813,000 A   9/1998   Furlani
5,822,749 A   10/1998  Agarwal
5,897,655 A   4/1999   Malick
5,918,245 A   6/1999   Yung (Continued)

FOREIGN PATENT DOCUMENTS

WO    WO2004088548 A1   10/2004

OTHER PUBLICATIONS

Chang et al., "Dynamic Routing Tables using Augmented Balanced Search Tree," National Cheng Kung University and I-Shou University, Admitted Prior Art, 35 pages.

(Continued)

*Primary Examiner*—Pierre M Vital
*Assistant Examiner*—Berhanu Mitiku
(74) *Attorney, Agent, or Firm*—Mahamedi Paradice Kreisman LLP; William L. Paradice, III

(57) ABSTRACT

A search engine includes a pipelined arrangement of a plurality of search and tree maintenance sub-engines therein, which are configured to support the performance of search operations on exclusively valid multi-way trees of search prefixes concurrently with the performance of update operations on the multi-way trees as they are being searched.

19 Claims, 40 Drawing Sheets

U.S. PATENT DOCUMENTS

| | | | |
|---|---|---|---|
| 5,924,115 | A | 7/1999 | Von Herzen et al. |
| 6,098,150 | A | 8/2000 | Brethour et al. |
| 6,115,792 | A | 9/2000 | Tran |
| 6,138,123 | A | 10/2000 | Rathbun |
| 6,219,662 | B1 | 4/2001 | Fuh et al. |
| 6,389,507 | B1 | 5/2002 | Sherman |
| 6,401,117 | B1 | 6/2002 | Narad et al. |
| 6,404,752 | B1 | 6/2002 | Allen, Jr. et al. |
| 6,421,730 | B1 | 7/2002 | Narad et al. |
| 6,430,527 | B1 | 8/2002 | Waters et al. |
| 6,441,053 | B1 | 8/2002 | Klein et al. |
| 6,460,112 | B1 | 10/2002 | Srinivasan et al. |
| 6,460,120 | B1 | 10/2002 | Bass et al. |
| 6,480,839 | B1 | 11/2002 | Whittington et al. |
| 6,490,592 | B1 | 12/2002 | St. Denis et al. |
| 6,522,632 | B1 | 2/2003 | Waters et al. |
| 6,526,055 | B1 | 2/2003 | Perlman et al. |
| 6,532,457 | B1 | 3/2003 | Tal et al. |
| 6,535,491 | B2 | 3/2003 | Dutt et al. |
| 6,539,369 | B2 * | 3/2003 | Brown .......................... 707/1 |
| 6,553,370 | B1 | 4/2003 | Andreev et al. |
| 6,564,211 | B1 | 5/2003 | Andreev et al. |
| 6,611,832 | B1 | 8/2003 | van Lunteren |
| 6,633,865 | B1 | 10/2003 | Liao |
| 6,636,849 | B1 | 10/2003 | Tang et al. |
| 6,636,956 | B1 | 10/2003 | Venkatachary et al. |
| 6,662,287 | B1 | 12/2003 | Andreev et al. |
| 6,691,124 | B2 | 2/2004 | Gupta et al. |
| 6,694,323 | B2 | 2/2004 | Bumbulis |
| 6,697,276 | B1 | 2/2004 | Pereira et al. |
| 6,707,693 | B1 | 3/2004 | Ichiriu |
| 6,757,779 | B1 | 6/2004 | Nataraj et al. |
| 6,768,739 | B1 | 7/2004 | Kobayashi et al. |
| 6,778,530 | B1 | 8/2004 | Greene |
| 6,831,850 | B2 | 12/2004 | Pereira et al. |
| 6,839,800 | B2 | 1/2005 | Stark |
| 6,859,455 | B1 | 2/2005 | Yazdani et al. |
| 6,868,414 | B2 * | 3/2005 | Khanna et al. ........................ 1/1 |
| 6,934,795 | B2 | 8/2005 | Nataraj et al. |
| 6,941,314 | B2 | 9/2005 | Andreev et al. |
| 6,944,709 | B2 | 9/2005 | Nataraj et al. |
| 7,007,027 | B2 | 2/2006 | Najork et al. |
| 7,016,904 | B1 | 3/2006 | Grove et al. |
| 7,017,021 | B2 | 3/2006 | Gupta et al. |
| 7,023,807 | B2 | 4/2006 | Michels et al. |
| 7,035,844 | B2 | 4/2006 | Andreev et al. |
| 7,047,317 | B1 | 5/2006 | Huie et al. |
| 7,076,602 | B2 | 7/2006 | Stark et al. |
| 7,107,263 | B2 | 9/2006 | Yianilos et al. |
| 7,162,572 | B2 | 1/2007 | Somasunaram |
| 7,231,383 | B2 | 6/2007 | Andreev et al. |
| 7,257,530 | B2 | 8/2007 | Yin |
| 7,289,979 | B2 | 10/2007 | Wilson |
| 7,292,162 | B2 | 11/2007 | Samasundaram |
| 7,383,276 | B2 * | 6/2008 | Lomet .......................... 707/102 |
| 7,426,518 | B2 | 9/2008 | Venkatachary et al. |
| 7,571,156 | B1 | 8/2009 | Gupta et al. |
| 2002/0089937 | A1 | 7/2002 | Venkatachary et al. |
| 2002/0146009 | A1 | 10/2002 | Gupta et al. |
| 2002/0152413 | A1 | 10/2002 | Waters et al. |
| 2002/0161969 | A1 | 10/2002 | Nataraj et al. |
| 2003/0009453 | A1 * | 1/2003 | Basso et al. .................... 707/3 |
| 2003/0009466 | A1 * | 1/2003 | Ta et al. ........................ 707/100 |
| 2003/0093613 | A1 | 5/2003 | Sherman |
| 2003/0093646 | A1 | 5/2003 | Stark |
| 2003/0123397 | A1 | 7/2003 | Lee et al. |
| 2003/0123459 | A1 | 7/2003 | Liao |
| 2003/0163302 | A1 | 8/2003 | Yin |
| 2004/0030686 | A1 | 2/2004 | Cardno et al. |
| 2004/0059731 | A1 | 3/2004 | Yianilos et al. |
| 2004/0083336 | A1 | 4/2004 | Stark et al. |
| 2004/0109451 | A1 * | 6/2004 | Huang et al. ................. 370/392 |
| 2004/0139274 | A1 | 7/2004 | Hui |
| 2004/0170379 | A1 | 9/2004 | Yao et al. |
| 2004/0193619 | A1 | 9/2004 | Venkatachary et al. |
| 2004/0205229 | A1 | 10/2004 | Stojancic |
| 2004/0249803 | A1 * | 12/2004 | Vankatachary et al. ......... 707/3 |
| 2005/0091443 | A1 | 4/2005 | Hershkovich et al. |
| 2005/0131867 | A1 | 6/2005 | Wilson |
| 2005/0163122 | A1 | 7/2005 | Sahni et al. |
| 2006/0259682 | A1 | 11/2006 | Somasundaram |
| 2007/0276648 | A1 * | 11/2007 | Andreev et al. ............... 703/22 |

OTHER PUBLICATIONS

O'Connor et al., "The iFlow Address Processor," 2001 IEEE, pp. 16-23.

Lu et al., "A B-Tree Dynamic Router-Table Design," IEEE Transactions on Computers, vol. 54, Issue 7, Jul. 2005, pp. 1-27.

Suri et al. "Multiway Range Trees: Scalable IP Lookup with Fast Updates" http://www.cs.edu/ ~ varghese/PAPERS/globecome2001.pdf, 5 pages.

"B-Trees: Balanced Tree Data Structures," http://www.bluerwhite.org/btree/, Admitted Prior Art, Printed, 8 pages. (believed prior to Jul. 23, 2004).

Answers.com, http://www.answers.com/topic/b-tree, B~tree: Information From Answers.com, Admitted prior art. 6 pages.

B*-tree, http://en.wikipedia.org/wiki/B%2A-tree, Admitted prior art. 1 page.

Bayer, R. et al., "Prefix B-Trees," ACM Trans. On Database Systems, vol. 2, No. 1, Mar. 1977, pp. 11-26.

Bender et al. "Cache-oblivious B-trees", SIAM J. Comput, 2000, pp. 1-18.

B-Trees: Balanced Tree Data Structures, http://www.bluerwhite.org/btree/, Admitted Prior Art, Printed, 8 pages.

Canonical form http://en.wikipedia.org/wiki/Canonical_form, Admitted prior art, 1 page.

Henry Hong-yi Tzeng, "Longest Prefix Search Using Compressed Trees", In Proceedings of IEEE Globe.com, 1998.

Kobayashi et al. "A Longest Prefix Match Search Engine for Multi-Gigabit IP Processing ", C&C Media Research Laboratories, NEC Corporation 2000 IEEE.

Nasser Yazdani et al., "Prefix Trees: New Efficient Data Structures for Matching Strings of Different Lengths", IEEE, 2001, p. 76-85.

Network address processor makes embedded DRAM a virtue, http://www.electronicproducts.com/print.asp?ArticleURL=oct12.oct2000, Printed Aug. 14, 2006, Admitted Prior Art, 1 page.

Srinivasan et al. "Fast Address Lookups Using Controlled Prefix Expansion" Washington University in St. Louis, ACM Sigmetrics '98/ Performance '98 Joint International Conference on Measurement and Modeling of Computer Systems.

Suri et al., "Multiway Range Trees: Scalable IP Lookup with Fast Updates," http:!www.cs.edu/-Varghese/PAPERS/globecome2001.pdf, Admitted Prior Art, 5 pages.

Tree (data structure), http://en.wikipedia.org/wiki/Tree_data_structure, (Redirected from Tree data structure, Admitted prior art. 2 pages.

Uga et al. "A fast and compact longest match prefix look-up method using pointer cache for very long network address", IT Network Service Systems Laboratories Midori 3-9-1 1, Musashino, Tokyo 180-8585, Japan, 1999 IEEE.

Aggarwal et al. "A Model for Hierarchical Memory" *Proceedings of the Nineteenth Annual ACM Conference on Theory of Computing STOC* pp. 305-314 (1987).

Choudhury et al. "A New Buffer Management Scheme for Hierarchical Shared Memory Switches" *IEEE/ACM Transactions on Networking (TON)* 5(5):728-738 (1997).

Djordjevic et al. "A Hierarchical Memory System Environment" *Proceedings of the 1988 Workshop on Computer Architecture Education WCAE* (6 pages)(1998).

* cited by examiner

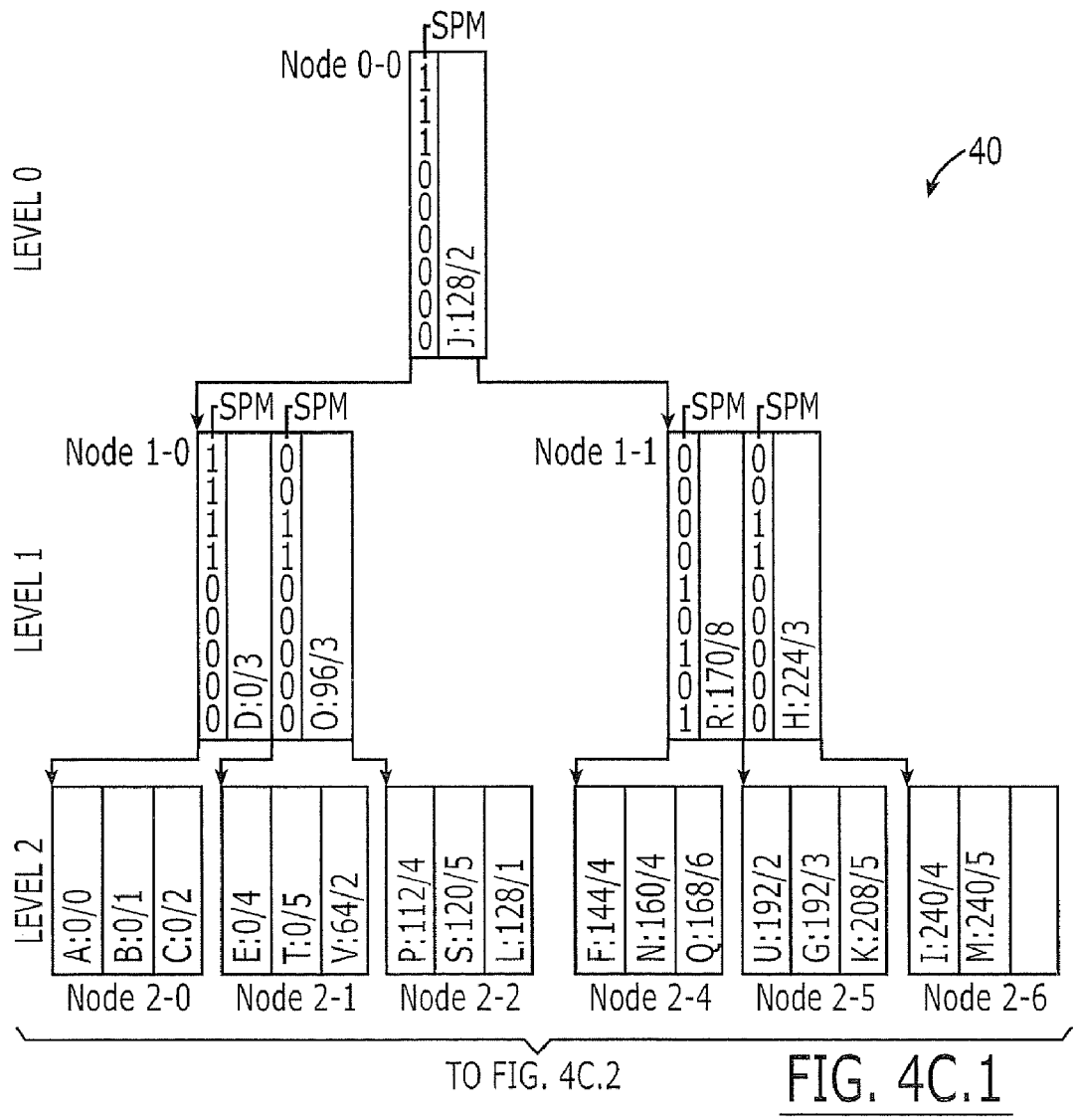
FIG. 4C.1

FIG. 4C.2

| SPM Length | Handle Memory Level 0 | Node & Key | SPM Length | Handle Memory Level 1 | Node & Key | Key | Handle Memory Level 2 | Node |
|---|---|---|---|---|---|---|---|---|
| /0 | Handle A | | /0 | Handle A | | 0 | Handle A | |
| /1 | Handle L | | /1 | Handle B | | 1 | Handle B | 2-0 |
| /2 | Handle J | | /2 | Handle C | | 2 | Handle C | |
| /3 | | 0-0 Key 0 | /3 | Handle D | 1-0 Key 0 | | | |
| /4 | | | /4 | | | 0 | Handle E | |
| /5 | | | /5 | | | 1 | Handle T | 2-1 |
| /6 | | | /6 | | | 2 | Handle V | |
| /7 | | | /7 | | | | | |
| /8 | | | /8 | | | 0 | Handle P | |
| | | | | | | 1 | Handle S | 2-2 |
| | | | | | | 2 | Handle L | |
| | | | /0 | | | | | |
| | | | /1 | | | 0 | Handle F | |
| | | | /2 | Handle V | | 1 | Handle N | 2-4 |
| | | | /3 | Handle O | 1-0 Key 1 | 2 | Handle Q | |
| | | | /4 | | | | | |
| | | | /5 | | | 0 | Handle U | |
| | | | /6 | | | 1 | Handle G | 2-5 |
| | | | /7 | | | 2 | Handle K | |
| | | | /8 | | | | | |
| | | | | | | 0 | Handle I | |
| | | | | | | 1 | Handle M | 2-6 |
| | | | | | | 2 | | |
| | | | /0 | | | | | |
| | | | /1 | | | | | |
| | | | /2 | | | | | |
| | | | /3 | | | | | |
| | | | /4 | Handle N | 1-1 Key 0 | | | |
| | | | /5 | | | | | |
| | | | /6 | Handle Q | | | | |
| | | | /7 | | | | | |
| | | | /8 | Handle R | | | | |
| | | | /0 | | | | | |
| | | | /1 | | | | | |
| | | | /2 | Handle U | | | | |
| | | | /3 | Handle H | 1-1 Key 1 | | | |
| | | | /4 | | | | | |
| | | | /5 | | | | | |
| | | | /6 | | | | | |
| | | | /7 | | | | | |
| | | | /8 | | | | | |

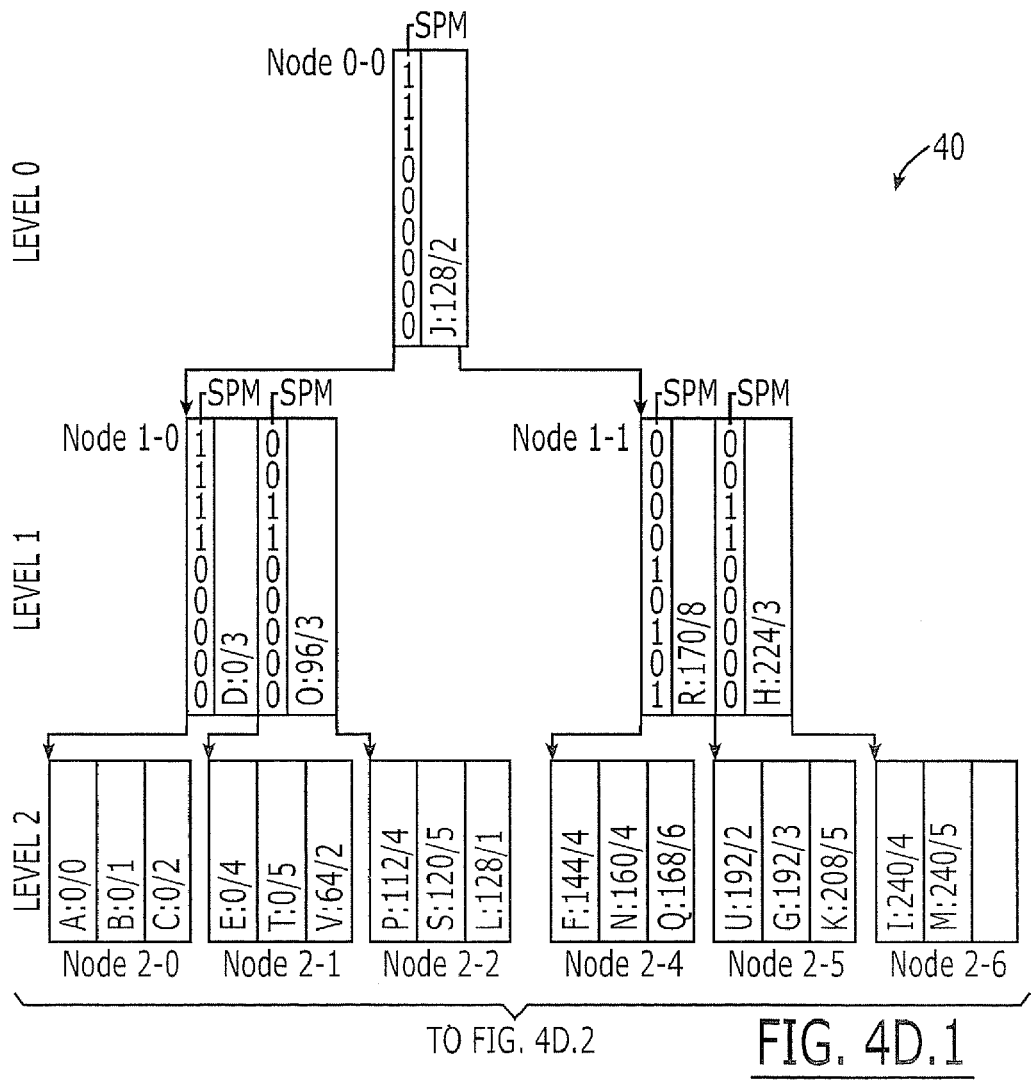
FIG. 4D.1

FROM FIG. 4D.1

| SPM Length | Handle Memory Level 0 | Node & Key | # of Less Significant Set Bits in SPM | Handle Memory Level 1 | Node & Key | Key | Handle Memory Level 2 | Node |
|---|---|---|---|---|---|---|---|---|
| /0 | Handle A | | 0 | Handle A | | 0 | Handle A | 2-0 |
| /1 | Handle L | | 1 | Handle B | 1-0 | 1 | Handle B | |
| /2 | Handle J | | 2 | Handle C | Key 0 | 2 | Handle C | |
| /3 | | 0-0 | 3 | Handle D | | | | |
| /4 | | Key 0 | 0 | Handle V | | 0 | Handle E | 2-1 |
| /5 | | | 1 | Handle O | 1-0 | 1 | Handle T | |
| /6 | | | 2 | | Key 1 | 2 | Handle V | |
| /7 | | | 3 | | | | | |
| /8 | | | | | | 0 | Handle P | 2-2 |
| | | | | | | 1 | Handle S | |
| | | | | | | 2 | Handle L | |
| | | | 0 | Handle N | | | | |
| | | | 1 | Handle Q | 1-1 | 0 | Handle F | 2-4 |
| | | | 2 | Handle R | Key 0 | 1 | Handle N | |
| | | | 3 | | | 2 | Handle Q | |
| | | | 0 | Handle U | | 0 | Handle U | 2-5 |
| | | | 1 | Handle H | 1-1 | 1 | Handle G | |
| | | | 2 | | Key 1 | 2 | Handle K | |
| | | | 3 | | | | | |
| | | | | | | 0 | Handle I | 2-6 |
| | | | | | | 1 | Handle M | |
| | | | | | | 2 | | |

INSERT KEY D+

INTEGRATED SEARCH ENGINE DEVICES HAVING PIPELINED SEARCH AND TREE MAINTENANCE SUB-ENGINES THEREIN THAT MAINTAIN SEARCH COHERENCE DURING MULTI-CYCLE UPDATE OPERATIONS

REFERENCE TO PRIORITY APPLICATION

This application claims priority to U.S. Provisional Application Ser. No. 60/867,277, filed Nov. 27, 2006. This application is also a continuation-in-part (CIP) of U.S. application Ser. No. 11/184,243, filed Jul. 19, 2005, which claims priority to U.S. Provisional Application Ser. Nos. 60/590,500, filed Jul. 23, 2004 and 60/642,799, filed Jan. 11, 2005. The disclosures of all of these applications are hereby incorporated herein by reference.

FIELD OF THE INVENTION

The present invention relates to integrated circuit devices and, more particularly, to integrated circuit search engine devices and methods of operating same.

BACKGROUND OF THE INVENTION

Linear sorting techniques may be utilized to arrange a plurality of search prefixes (a/k/a search "keys") within an integrated circuit search engine device. One such linear sorting technique is based on the starting address of a prefix range associated with each search prefix. In the event a plurality of the search prefixes have the same starting address but different prefix lengths, then a search prefix with a shorter prefix length may be treated as being "less than" a search prefix with a longer prefix length. One example of a plurality of 8-bit search prefixes is illustrated by TABLE 1.

The search prefixes in TABLE 1 may be sorted linearly by prefix value and prefix length, as shown in FIG. 1, with the smallest search prefix (e.g., A:0/0) located on the left side of the array 10 and the largest search prefix (e.g., M:240/5) located on the right side on the array 10. To perform a linear search (i.e., lookup) operation, an applied search key is compared with every search prefix in the array 10, starting with the search prefix on the left side of the array 10, until a search prefix is found with a start address that is greater than the applied search key. Each search prefix in the array 10 that matches the applied search key is a potential longest prefix match. Once the search operation terminates at the right side of the array 10 (or at a search prefix with a start address than is greater than the applied search key), the rightmost search prefix that matches the search key is treated as the longest prefix match (LPM).

TABLE 1

| ID | KEY |
|---|---|
| A | 0/0 |
| B | 0/1 |
| C | 0/2 |
| D | 0/3 |
| E | 0/4 |
| F | 144/4 |
| G | 192/3 |
| H | 224/3 |
| I | 240/4 |
| J | 128/2 |
| K | 208/5 |
| L | 128/1 |

TABLE 1-continued

| ID | KEY |
|---|---|
| M | 248/5 |
| N | 160/4 |
| O | 96/3 |
| P | 112/4 |
| Q | 168/6 |
| R | 170/8 |
| S | 120/5 |
| T | 0/5 |
| U | 192/2 |
| V | 64/2 |

This search operation is an iterative process, with each search prefix being compared in sequence with the applied search key. As illustrated by FIG. 2, this process can also be implemented in a hardware-based array 20, by simultaneously comparing the applied search key (e.g., 171) to all of the search prefixes within the array 20, using a plurality of comparators 22 that generate match and non-match signals. In particular, each match between the applied search key and a search prefix results in the generation of a match signal (M) and each non-match results in the generation of a "less than" signal (LT) or a "greater than" signal (GT). The comparators 22 may generate these signals as two-bit binary signals (e.g., M=11b, LT=01b, and GT=10b). The longest prefix match is represented by the search prefix associated with the rightmost match signal M, which in FIG. 2 is represented by the search prefix Q:168/2. This longest prefix match may be identified using a priority encoder (not shown) that is configured to receive the signals generated by the comparators 22.

Conventional network routing applications may also utilize tree data structures to support search operations within an integrated circuit device. These tree data structures may include b-tree structures that are kept balanced to prevent one or more branches of the tree from becoming longer that other branches of the tree and thereby increasing search latency. FIG. 3 illustrates a three-level b-tree data structure 30 containing the search prefixes of TABLE 1 and the array 20 of FIG. 2. This b-tree 30 is illustrated as including six leaf nodes at Level 2 (i.e., Nodes 2-0, 2-1, 2-2, 2-4, 2-5 and 2-6), two leaf nodes at Level 1 (Node 1-0 and 1-1) and a root node at Level 0 (Node 0-0).

As illustrated by the highlighted search path, a search of the b-tree using 171 as an applied search key begins at Node 0-0. The search prefix J at Node 0-0 represents a match with the search key 171 because 171 (i.e., 10101011b) is a match with 128/2 (i.e., 10XXXXXX), where X represents a "don't-care" value. The search then proceeds to Node 1-1 (i.e., along a right-side branch from Node 0-0 to Node 1-1) because 171 is greater than 128. No matches are present at Node 1-1 because the search key 171 (i.e., 10101011b) does not match either the search prefix R: 170/8 (10101010b) or the search prefix H:224/3 (i.e., 111XXXXX). Because the search key 171 is greater than 170 and less than 224, the search then proceeds to and terminates at Node 2-5, which is a leaf node of the b-tree 30. None of the search prefixes U:192/2, G:192/3 or K:208/5 at Node 2-5 represent a match with the search key 171. Thus, based on the illustrated search path, which traverses Nodes 0-0, 1-1 and 2-5 of the b-tree 30, only search prefix J:128/2 represents a matching entry within the search key 171. However, as illustrated best by FIG. 2, the search prefix Q:168/6, which resides at Node 2-4 of FIG. 3, actually represents the longest prefix match with the search key 171, yet this search prefix was not within the search path and was not detected during the search operation. Moreover, the search prefixes A:0/0, L:128/1 and N:160/4 also represent matches that were not within the search path. This means that the conventional sorting of prefixes within the b-tree 30 of FIG. 3 will not yield correct results for all applied search keys.

Another example of a b-tree data structure is described in U.S. Pat. No. 6,490,592, which is assigned to Nortel Networks Limited. As described at Col. 1 of the '592 patent, conventional b-tree data structures may not be well suited for search operations that require identification of longest prefix matches (LPMs) within the b-tree data structure. To address this limitation, the '592 patent describes a modified b-tree data structure that is arranged so that data elements stored therein, which have no overlapping prefixes, are arranged in a standard b-tree structure. However, other data elements that have overlapping prefixes are arranged in a modified structure so that the prefix of such a data element contains the prefixes of all such data elements that succeed it in the b-tree. This modified structure is referred to as an L-structure. FIG. 3 of the '592 patent shows portions 300 and 340 that includes a b-tree into which an L-structure 320 is inserted. Unfortunately, the use of L-structures within a b-tree may represent a form of prefix nesting that reduces a likelihood of achieving ideal b-tree properties that typically reduce search latency and result in efficient utilization of memory space. In particular, for a fixed memory capacity and latency, which is related to tree height, the number of search prefixes that can be supported within the b-tree of the '592 patent is statistically dependent on the degree of nesting within the prefix data set supported by the b-tree. Accordingly, prefix data sets that require a high degree of nesting may result in an inefficient utilization of the memory space that is required to maintain the b-tree.

A network address processor that supports longest prefix match lookup operations is disclosed in U.S. Pat. No. 7,047,317 to Huie et al. In particular, FIGS. 2-3 of the '317 patent illustrate a lookup engine that supports an M-way tree data structure. This data structure includes a plurality of lookup tables, with each lower stage table providing an index to a key within a next higher stage table.

An additional type of b-tree data structure includes a b*tree data structure, which can require non-root nodes to be at least ⅔ full at all times. To maintain this fill requirement, a sibling node is not immediately split whenever it is full. Instead, keys are first shared between sibling nodes before node splitting is performed. Only when all sibling nodes within a group are full does a node splitting operation occur upon insertion of a new search key. FIG. 14 illustrates a conventional three-level b*tree data structure. These three levels are illustrated as L0, L1 and L2, where L0 is treated as the root level and L2 is treated as a leaf level. Level L1 is an intermediate level, which is a child relative to the root level and a parent relative to the leaf level. As will be understood by those skilled in the art, a b*tree of type N:(N+1) (i.e., 2:3, 3:4, 4:5, . . . ) requires all non-root nodes to be between N/(N+1) and 100% capacity (i.e, 67%, 75%, 80%, . . . up to 100%) before and after an insert or delete operation has been fully performed. The b*tree of FIG. 14 is a 3:4 tree, with four key locations per node (i.e., M=4).

FIG. 15A illustrates a portion of a b*tree with excess capacity having three sibling nodes at a leaf level and a parent node (at the root level) containing the search keys A-K, which represent numeric search key values. The leftmost sibling node contains the search keys A, B and C, the middle sibling node contains the search keys E, F and G and the rightmost sibling node contains the search keys I, J and K. The parent node contains the search keys D and H. These sibling nodes are at 75% capacity, which meets the requirement that all non-root nodes be between N/(N+1) and 100% capacity for a 3:4 type b*tree, where N=3. As illustrated by FIG. 15B, an insertion of the key L into the b*tree of FIG. 15A increases the rightmost sibling node to full capacity without affecting the other two sibling nodes. The additional insertion of key M into the rightmost sibling node in the b*tree of FIG. 15B causes the transfer of key I to the parent node and the transfer of key H from the parent node to the middle sibling node, as illustrated by FIG. 15C.

FIG. 15D illustrates the further insertion of node N into the rightmost sibling node, which causes an overflow that ripples through the parent and middle sibling nodes into the leftmost sibling node, which is now at full capacity. In FIG. 15E, a split between the sibling nodes and an increase in population of the parent node occurs in response to the further insertion of key 0 into the rightmost sibling node. This split from three to four sibling nodes is necessary to maintain a capacity of all non-root nodes in a range from 75% to 100% capacity, for N=3.

FIGS. 16A-16D illustrate three insertion examples that result in the splitting of sibling nodes having no excess capacity. As illustrated by FIG. 16A, the insertion of any additional key (#) into a b*tree with sibling nodes at full capacity results in a split among the sibling nodes and a repopulation of these nodes at equivalent levels (shown at 75%). In FIG. 16B, the insertion of key D+ into the leftmost sibling node results in a split that causes keys D, G and K to move to the parent node (displacing keys E and J) and a grouping of keys D+, E and F together in a sibling node. In FIG. 16C, the insertion of key I+ into the middle sibling node results in a split that causes keys D, H and K to move to the parent node (displacing keys E and J) and a grouping of keys I, I+ and J together in a sibling node. Finally, in FIG. 16D, the insertion of key N+ into the rightmost sibling node results in a split that causes keys D, H and L to move to the parent node (displacing keys E and J) and a grouping of keys M, N and N+ together in a rightmost sibling node. Thus, as illustrated by FIGS. 16B-16D, the value of the search key to be inserted into sibling nodes having no excess capacity influences the nature of the overflow and regrouping of keys during an operation to split the sibling nodes. This means that conventional hardware to perform insert operations may need to account for every possible insert location amongst the plurality of sibling nodes.

SUMMARY OF THE INVENTION

A search engine device according to some embodiments of the present invention includes a hierarchical memory that is configured to store a b-tree of search prefixes and span prefix masks (SPMs) therein. Some of these SPMs are evaluated during each search operation. SPMs serve to identify search prefixes that match an applied search key, yet reside at nodes of the b-tree that are not traversed during the search operation (e.g., lie lower and left of the search path). Such matches are typically referred to as longest prefix matches (LPMs). The search engine device also includes handle memory. This handle memory may be configured to support a respective handle memory block for each search prefix within each of a plurality of nodes of the b-tree that reside at a leaf parent level within the b-tree. Each of these handle memory blocks may have sufficient capacity to support one result handle per bit within a span prefix mask associated with a corresponding search prefix. In other cases, each of these handle memory blocks may have sufficient capacity to support only M+1 handles, where M is a positive integer corresponding to a quantity of search prefixes supported by each of a plurality of leaf nodes within the b-tree.

An additional embodiment of the present invention includes a pipelined search engine device having at least one storage device therein. This storage device is configured to support a tree data structure having at least a first search prefix and at least a first span prefix mask therein that supports LPM operations. This first span prefix mask has a value that encodes an identity of at least a second search prefix in the tree data structure that is a prefix match to the first search prefix. This encoding of the identity is based on positions of "set" bits within the first span prefix mask.

Still further embodiments of the present invention include methods of searching a b-tree of search prefixes within a hierarchical memory. These methods include evaluating span prefix masks (SPMs) associated with each of a plurality of search prefixes located at first nodes within the b-tree during a search operation. This evaluating step is performed to identify search prefixes that match an applied search key yet reside at nodes of the b-tree that are not traversed during the search operation. In this manner, search prefixes that represent longest prefix matches (LPMs) can be identified in situations where a conventional b-tree search operation would not correctly detect a longest prefix match (LPM). These span prefix masks may be configured so that each bit of the mask that has been set operates to identify a respective search prefix within the b-tree. In particular, each bit of a first one of the span prefix masks that has been set identifies a respective search prefix within the b-tree having a value that is less than a value of the search prefix to which the first one of the span prefix masks corresponds.

Additional embodiments of the present invention include a pipelined search engine device having a hierarchical memory and a pipelined tree maintenance engine therein. The hierarchical memory is configured to store a b-tree of search prefixes (and possibly SPMs) within its multiple levels. The pipelined tree maintenance engine, which is embedded within the search engine device, includes a plurality of node maintenance sub-engines that are distributed with the multiple levels of the hierarchical memory. These embodiments of the search engine device may also include pipeline control and search logic that is distributed with the multiple levels of the hierarchical memory.

Still further ones of these embodiments may also include a handle memory pipeline stage having a handle update interface communicatively coupled to the plurality of node maintenance sub-engines and a primary pipeline interface communicatively coupled the pipeline control and search logic associated with a lowest level of the hierarchical memory. This plurality of node maintenance sub-engines includes at least: (i) a root level maintenance sub-engine associated with a root level of the hierarchical memory; (ii) an intermediate level maintenance sub-engine associated with an intermediate level of the hierarchical memory; and (iii) a leaf level maintenance sub-engine associated with a lowermost leaf level of the hierarchical memory.

This leaf node maintenance sub-engine may be configured to perform an insert overflow operation at the leaf level of the hierarchical memory by requesting a first search prefix to be dropped down from the intermediate node maintenance sub-engine. The leaf node maintenance sub-engine may also be configured to push a second search prefix up to the intermediate node maintenance sub-engine during the insert overflow operation. Moreover, in the event the hierarchical memory is configured to store a plurality of search prefixes and corresponding span prefix masks (SPMs) at the multiple levels therein, then the leaf node maintenance sub-engine may be configured to push a second search prefix and an associated span prefix mask up to the intermediate node maintenance sub-engine during the insert overflow operation.

Additional search engine devices according to embodiments of the invention include a pipelined arrangement of a plurality of search and tree maintenance sub-engines therein. These sub-engines are configured to support respective levels of a b-tree (e.g., SPM b-tree) of search prefixes. A handle memory lookup engine may also be provided. This handle memory lookup engine may include: (i) a primary pipeline interface communicatively coupled to a last one of the plurality of search and tree maintenance sub-engines in the pipelined arrangement; and (ii) a handle update interface communicatively coupled to each of the plurality of search and tree maintenance sub-engines in the pipelined arrangement. Pipelined search engine devices according to additional embodiments of the present invention include a hierarchical memory having a plurality of memory levels therein. This hierarchical memory is configured to store a multi-way tree of search prefixes that spans the plurality of memory levels. The hierarchical memory is further configured to support increases in a height of the multi-way tree relative to a leaf node level of the multi-way tree that is fixed in location at a lowest one of the plurality of memory levels. These increases in height occur as a capacity of the multi-way tree is increased in response to search prefix insertions.

These search engine devices also include a plurality of control modules, which are distributed in a pipeline manner with corresponding ones of the plurality of memory levels. A first control module associated with a highest one of the plurality of memory levels may be configured to respond to a search request by determining whether the highest one of the plurality of memory levels contains a root node of the multi-way tree. This first control module may also be configured to pass root node level information downstream to a second control module associated with a second highest one of the plurality of memory levels in the event the highest one of the plurality of memory levels is determined to not contain the root node of the multi-way tree. The first control module may also be configured to pass a node pointer, which identifies a location of a node to be searched in the second highest one of the plurality of memory levels, downstream to the second control module in the event the highest one of the plurality of memory levels is determined to contain the root node of the multi-way tree.

Additional embodiments of the present invention include integrated circuit search engine devices that are configured to perform background update operations concurrently with foreground search operations. These update operations include insert-type update operations and delete-type update operations. The concurrent search and update operations are performed in such a way that the search operations output search results that reflect either the correct state of the tree before an update operation has been performed or after an update operation has been completed. In particular, the concurrent nature of the search and update operations makes it appear as if the operations associated with an update (insert or delete) occur atomically between two consecutive searches even when the update operations actually span multiple searches.

According to some of these embodiments, a search engine is provided having a pipelined arrangement of a plurality of search and tree maintenance sub-engines therein. This pipelined arrangement of sub-engines is configured to support the performance of fixed-latency search operations on exclusively valid multi-way trees of search prefixes concurrently with variable-latency tree update operations. This pipelined arrangement may also be configured to perform an insert-type update operation on a first multi-way tree by searching the first multi-way tree to identify a first branch thereof that is to receive a search prefix to be inserted and then generating a modified copy of the first branch that includes the search prefix to be inserted. These operations to generate a modified copy of the first branch may be performed concurrently with operations to search the first branch of the first multi-way tree. Moreover, once the modified copy of the first branch has been generated, the pipelined arrangement operates to remove the first branch from the first multi-way tree and substitute the modified copy of the first branch therefor.

In some of these embodiments, the pipelined arrangement may generate a modified copy of the first branch by generating a plurality of temporary node pointers associated with copies of nodes of the first branch. This generation of the temporary node pointers may include extracting a plurality of temporary node pointers from a memory free list within the pipelined arrangement. Thereafter, once the first branch has been removed and replaced by the modified copy of the first branch, the pipelined arrangement returns node pointers within the first branch to the free list.

According to still further embodiments of the present invention, an integrated circuit search engine is configured to support fixed-latency search operations on multi-way trees of search prefixes contained therein. These search operations can be performed concurrently with variable-latency tree update operations, which include replacing branches of the multi-way trees with modified copies of the branches that reflect updates to the multi-way trees. This search engine may include a pipelined arrangement of a plurality of search and tree maintenance sub-engines that are configured to support corresponding levels of a b-tree of search prefixes therein. This pipelined arrangement is also configured to support insertions of search prefixes into the b-tree by modifying copies of a plurality of nodes within the b-tree and generating updated pointers to the modified copies of the plurality of nodes in advance of reclaiming the plurality of nodes as free nodes. In some additional embodiments of the invention, the pipelined arrangement may also be configured to support upstream and downstream communications between the plurality of search and tree maintenance sub-engines during operations to insert search prefixes into the b-tree.

Still further embodiments of the present invention include methods of updating an integrated circuit search engine device by searching a multi-way tree within the search engine device to identify a first branch of the tree that is to receive a first search prefix, in response to an insert instruction, and then generating a modified copy of the first branch that includes the first search prefix. These operations to generate a modified copy of the first branch are performed concurrently with searching at least a portion of the first branch of the tree with a second search prefix associated with a search instruction. An operation is then performed to replace the first branch of the tree with the modified copy of the first branch. The latency associated with this replacing may be equivalent to a latency associated with the search instruction, notwithstanding the fact that a latency associated with the insert instruction is variable and the latency associated with the search instruction is fixed.

According to aspects of these embodiments, the replacing operations include replacing the first branch of the tree with the modified copy of the first branch, in response to treating a no-op instruction received by the search engine device as a branch replacement instruction. The operations associated with generating the modified copy of the first branch may include using operations having lower priority to memory resources within the search engine device relative to operations to search the multi-way tree in response to the search instruction.

BRIEF DESCRIPTION OF THE DRAWINGS

FIG. 4C illustrates the three-level b-tree data structure of FIG. 4A along with a diagram that illustrates an allocation of handle memory to support the corresponding b-tree data structure.

FIG. 4D illustrates the three-level b-tree data structure of FIG. 4A along with a diagram that illustrates an alternative allocation of handle memory to support the corresponding b-tree data structure when M<W, where M is a positive integer that represents a maximum number of search prefixes within a leaf node of the b-tree and W is a positive integer that represents a width of the search prefixes.

DESCRIPTION OF PREFERRED EMBODIMENTS

Figure 1:
FIG. 1 illustrates a plurality of 8-bit search prefixes of varying prefix length that are sorted linearly based on prefix value (address) and prefix length, according to the prior art.
Figure 2:
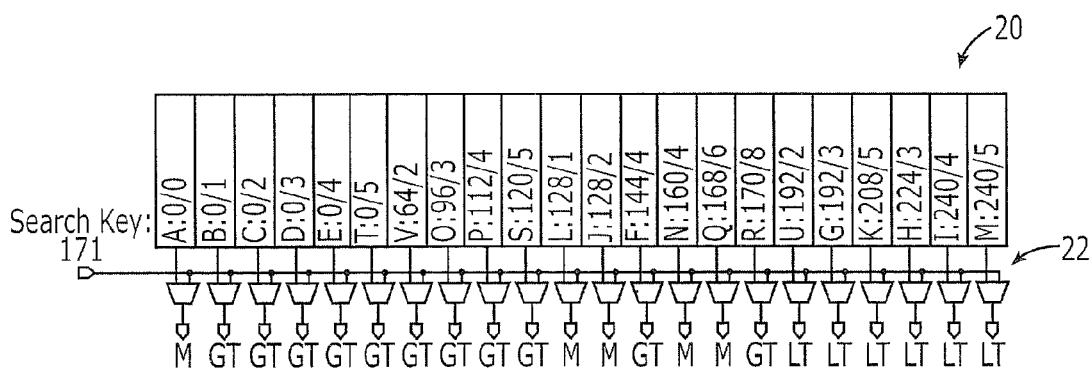
FIG. 2 illustrates a conventional hardware-based array of search prefixes that supports parallel search operations.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout. Moreover, the phrase "communicatively coupled" includes both direct and indirect forms of electrical coupling and the term "key" may be used as a shorthand notation for the more general term "prefix", including both fully specified prefixes and non-fully specified prefixes.

Figure 4A:
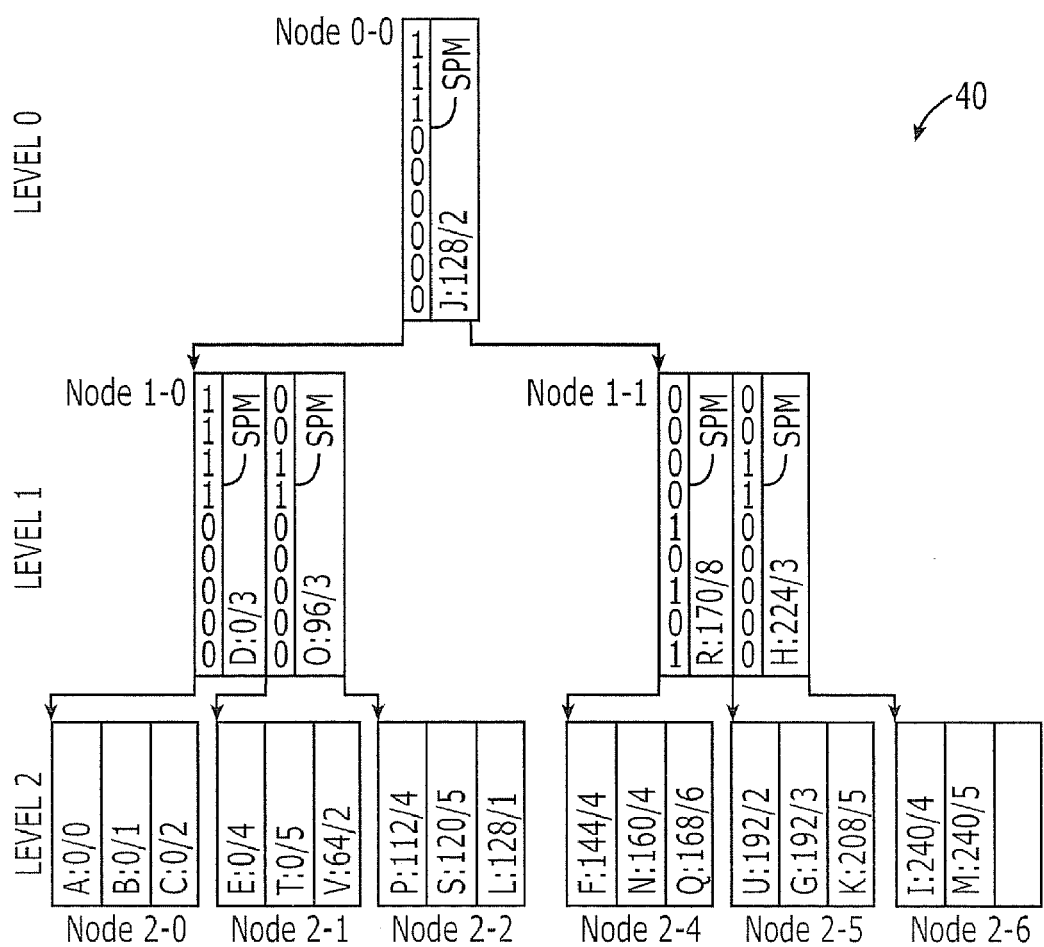
FIG. 4A illustrates a three-level b-tree data structure that contains search prefixes and span prefix masks (SPMs) according to an embodiment of the present invention.

FIG. 4A illustrates a b-tree 40 that contains search prefixes and span prefix masks (SPMs) according to embodiments of the present invention, which may be embodied within a hardware search engine device containing a hierarchical memory. The b-tree 40 includes a root node (Node 0-0) at Level 0, two nodes (Node 1-0 and 1-1) at Level 1 and six nodes (Node 2-0, 2-1, 2-2, 2-4, 2-5 and 2-6) at Level 2. The six nodes at Level 2 represent leaf nodes. Each leaf node is configured to support a maximum of three search prefixes. The two nodes at Level 1 represent nodes at the leaf parent level (i.e., one level above the leaf nodes). Each of the nodes at Level 1 contains two search prefixes and two span prefix masks. The root node contains one search prefix and one span prefix mask. These span prefix masks (SPMs) supplement the b-tree 40 to ensure that all matches for an applied search key, including a longest prefix match, are found in response to a search operation. Each span prefix mask may contain W+1 mask bits in the form of a mask vector, where W is a positive integer that represents a width of the search prefixes in the b-tree 40. For purposes of illustration only, these search prefixes are illustrated as having a width W of eight (8) bits, however, most applications require the use of search prefixes that are substantially wider that those illustrated herein. Each span prefix mask associated with a respective search prefix in a non-leaf node identifies the search prefix itself and all shorter prefixes of the search prefix that are located below and to the left of the search prefix in the b-tree 40. Thus, the span prefix mask for the search prefix J:128/2, for example, is configured to identify the search prefix J:128/2 and the shorter prefixes L:128/1 and A:0/0, which are located at leaf nodes 2-0 and 2-2, respectively. The search prefixes at the leaf nodes do not require span prefix masks because these prefixes are located at terminal nodes of the b-tree 40 and no shorter prefixes exist at any lower level of the b-tree 40.

To derive bits 0 through 8 of the 9-bit SPM corresponding to search prefix J:128/2 at node 0-0, bit-by-bit AND operations may be performed between the search prefix J and the nine 8-bit vectors illustrated by TABLE 2. Performing these AND operations results in the identification of search prefixes A:0/0, L:128/1 and J:128/2, which means the span prefix mask corresponding to search prefix J:128/2 within the b-tree 40 equals: SPM[0:8]=111000000.

TABLE 2

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
| --- | --- | --- | --- | --- | --- |
| /0 | 00000000 | 128 = 10000000 | 0/0 = A | YES | SPM[0] = 1 |
| /1 | 10000000 | 128 = 10000000 | 128/1 = L | YES | SPM[1] = 1 |
| /2 | 11000000 | 128 = 10000000 | 128/2 = J | YES | SPM[2] = 1 |
| /3 | 11100000 | 128 = 10000000 | 128/3 | NO | SPM[3] = 0 |
| /4 | 11110000 | 128 = 10000000 | 128/4 | NO | SPM[4] = 0 |
| /5 | 11111000 | 128 = 10000000 | 128/5 | NO | SPM[5] = 0 |
| /6 | 11111100 | 128 = 10000000 | 128/6 | NO | SPM[6] = 0 |
| /7 | 11111110 | 128 = 10000000 | 128/7 | NO | SPM[7] = 0 |
| /8 | 11111111 | 128 = 10000000 | 128/8 | NO | SPM[8] = 0 |

To derive bits 0 through 8 of the 9-bit SPM corresponding to search prefix D:0/3 at node 1-0, bit-by-bit AND operations may be performed between the search prefix D and the nine 8-bit vectors illustrated by TABLE 3. Performing these AND operations results in the identification of search prefixes A:0/0, B:0/1, 0:0/2 and D:0/3, which means the span prefix mask corresponding to search prefix D:0/3 within the b-tree 40 equals: SPM[0:8]=111100000.

TABLE 3

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 0 = 00000000 | 0/0 = A | YES | SPM[0] = 1 |
| /1 | 10000000 | 0 = 00000000 | 0/1 = B | YES | SPM[1] = 1 |
| /2 | 11000000 | 0 = 00000000 | 0/2 = C | YES | SPM[2] = 1 |
| /3 | 11100000 | 0 = 00000000 | 0/3 = D | YES | SPM[3] = 1 |
| /4 | 11110000 | 0 = 00000000 | 0/4 | NO | SPM[4] = 0 |
| /5 | 11111000 | 0 = 00000000 | 0/5 | NO | SPM[5] = 0 |
| /6 | 11111100 | 0 = 00000000 | 0/6 | NO | SPM[6] = 0 |
| /7 | 11111110 | 0 = 00000000 | 0/7 | NO | SPM[7] = 0 |
| /8 | 11111111 | 0 = 00000000 | 0/8 | NO | SPM[8] = 0 |

To derive bits 0 through 8 of the 9-bit SPM corresponding to search prefix O:96/3 at node 1-0, bit-by-bit AND operations may be performed between the search prefix 0 and the nine 8-bit vectors illustrated by TABLE 4. Performing these AND operations results in the identification of search prefixes V:64/2 and O:96/3, which means the span prefix mask corresponding to search prefix O:96/3 within the b-tree 40 equals: SPM[0:8]=001100000.

TABLE 4

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 96 = 01100000 | 0/0 | NO | SPM[0] = 0 |
| /1 | 10000000 | 96 = 01100000 | 0/1 | NO | SPM[1] = 0 |
| /2 | 11000000 | 96 = 01100000 | 64/2 = V | YES | SPM[2] = 1 |
| /3 | 11100000 | 96 = 01100000 | 96/3 = O | YES | SPM[3] = 1 |
| /4 | 11110000 | 96 = 01100000 | 96/4 | NO | SPM[4] = 0 |
| /5 | 11111000 | 96 = 01100000 | 96/5 | NO | SPM[5] = 0 |
| /6 | 11111100 | 96 = 01100000 | 96/6 | NO | SPM[6] = 0 |
| /7 | 11111110 | 96 = 01100000 | 96/7 | NO | SPM[7] = 0 |
| /8 | 11111111 | 96 = 01100000 | 96/8 | NO | SPM[8] = 0 |

To derive bits 0 through 8 of the 9-bit SPM corresponding to search prefix R:170/8 at node 1-1, bit-by-bit AND operations may be performed between the search prefix R and the nine 8-bit vectors illustrated by TABLE 5. Performing these AND operations results in the identification of search prefixes N:160/4, Q:168/6 and R:170/8, which means the span prefix mask corresponding to search prefix R:170/8 within the b-tree 40 equals: SPM[0:8]=000010101.

TABLE 5

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
|---|---|---|---|---|---|
| /0 | 00000000 | 170 = 10101010 | 0/0 | NO | SPM[0] = 0 |
| /1 | 10000000 | 170 = 10101010 | 128/1 | NO | SPM[1] = 0 |
| /2 | 11000000 | 170 = 10101010 | 128/2 | NO | SPM[2] = 0 |
| /3 | 11100000 | 170 = 10101010 | 160/3 | NO | SPM[3] = 0 |
| /4 | 11110000 | 170 = 10101010 | 160/4 = N | YES | SPM[4] = 1 |
| /5 | 11111000 | 170 = 10101010 | 168/5 | NO | SPM[5] = 0 |
| /6 | 11111100 | 170 = 10101010 | 168/6 = Q | YES | SPM[6] = 1 |
| /7 | 11111110 | 170 = 10101010 | 170/7 | NO | SPM[7] = 0 |
| /8 | 11111111 | 170 = 10101010 | 170/8 = R | YES | SPM[8] = 1 |

To derive bits 0 through 8 of the 9-bit SPM corresponding to search prefix H:224/3 at node 1-1, bit-by-bit AND operations may be performed between the search prefix H and the nine 8-bit vectors illustrated by TABLE 6. Performing these AND operations results in the identification of search prefixes U:192/3 and H:224/3, which means the span prefix mask corresponding to search prefix H:224/8 within the b-tree 40 equals: SPM[0:8]=001100000.

longest prefix match to the search key 171 at Level 0 of the search operation. The identification of search prefixes A:0/0 and L:128/1, which are located outside the search path associated with the applied search key 171, represents a type of "lookahead" search to Levels 1 and 2 of the b-tree 30.

Because the search key 171 is greater than 128, the next stage of the search at Level 1 passes down and to the right of node 0-0 to node 1-1. At node 1-1, it is apparent that the search

TABLE 6

| SPM LENGTH | VECTOR | SEARCH PREFIX | "AND" RESULT | IS RESULT EQUAL TO SEARCH PREFIX OR SHORTER PREFIX WITHIN LEFT SUB-TREE? | SPM VALUE |
| --- | --- | --- | --- | --- | --- |
| /0 | 00000000 | 224 = 11100000 | 0/0 | NO | SPM[0] = 0 |
| /1 | 10000000 | 224 = 11100000 | 128/1 | NO | SPM[1] = 0 |
| /2 | 11000000 | 224 = 11100000 | 192/2 = U | YES | SPM[2] = 1 |
| /3 | 11100000 | 224 = 11100000 | 224/3 = H | YES | SPM[3] = 1 |
| /4 | 11110000 | 224 = 11100000 | 224/4 | NO | SPM[4] = 0 |
| /5 | 11111000 | 224 = 11100000 | 224/5 | NO | SPM[5] = 0 |
| /6 | 11111100 | 224 = 11100000 | 224/6 | NO | SPM[6] = 0 |
| /7 | 11111110 | 224 = 11100000 | 224/7 | NO | SPM[7] = 0 |
| /8 | 11111111 | 224 = 11100000 | 224/8 | NO | SPM[8] = 0 |

As illustrated by TABLES 2-6, the bit corresponding to the longest prefix that is set within a span prefix mask represents the search prefix associated with the span prefix mask. For example, as illustrated by TABLE 2, the /2 bit of the span prefix mask associated with the search prefix J:128/2 in node 0-0 corresponds to J:128/2 itself. As will be understood by those skilled in the art, the search prefix associated with a span prefix mask can always be inferred, but it is preferable in hardware and software implementations of the search operations described herein to set the span prefix mask bit corresponding to the search prefix. For some implementations, the setting of this bit can also result in an efficient way of encoding the length of the search prefix based on the bit position of the longest prefix bit of the span prefix mask that is set for the search prefix. This can save a bit within $\log_2 W$ bits per search prefix, depending on how an implementation operates to encode the prefix length.

Fortunately, each search prefix need only be represented once per level of the b-tree 40 to a guarantee a first pass search success for all possible search keys. Moreover, the set bits within each span prefix mask for a corresponding search prefix need only account for shorter prefixes that are located within a left sub-tree of the corresponding search prefix. For example, the search prefix A:0/0, which is the leftmost search prefix within the leftmost leaf node 2-0, is represented by the least significant bit of the span prefix mask associated with the search prefix J at the root node 0-0 and the least significant bit of the span prefix mask associated with the search prefix D within node 1-0.

Figure 3:
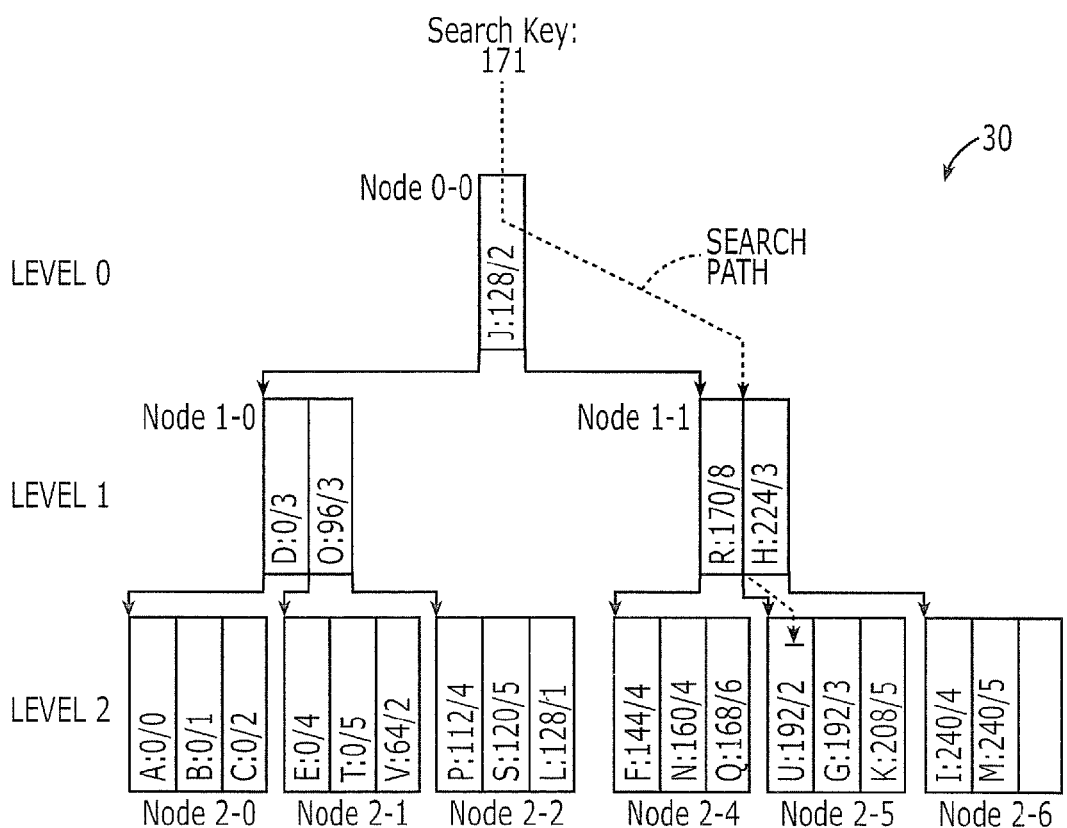
FIG. 3 illustrates a conventional three-level b-tree data structure containing the search prefixes illustrated by FIGS. 1 and 2.
Figure 4B:
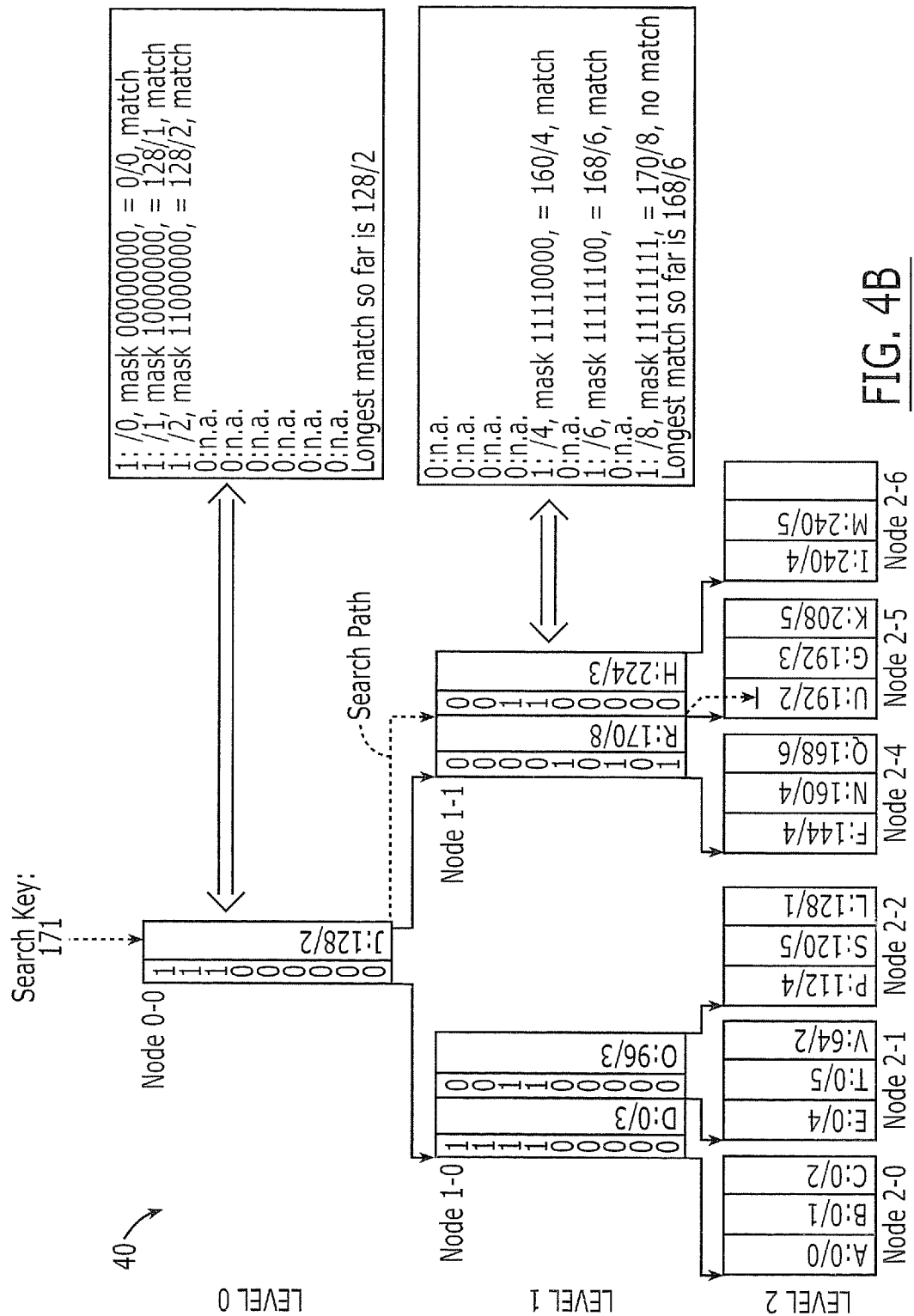
FIG. 4B illustrates an annotated three-level b-tree data structure that contains search prefixes and span prefix masks (SPMs) according to an embodiment of the present invention.

As described previously with respect to FIG. 3, a search of the b-tree 30 in FIG. 3 failed using 171 as a search key because the search prefix Q:168/6, which is the longest prefix match to the search key 171, was not encountered during the search operation. However, the performance of a corresponding search in the b-tree 40 of FIG. 4B results in the correct detection of search prefix Q:168/6 as the longest prefix match to the search key 171. As illustrated by the breakout box to the right of node 0-0 and TABLE 2, a traversal of the search prefix J:128/2 at node 0-0 (and corresponding SPM) results in the identification of three (3) matching search prefixes within the b-tree 40. These matching search prefixes include: A:0/0, L:128/1 and J:128/2, with the search prefix J:128/2 being the key 171 is greater than the search prefix R:170/8 and less than the search prefix H:224/3, which means the next stage of the search operation at Level 2 passes to node 2-5, which contains no matching search prefixes. Here, the breakout box to the right of node 1-1 shows that the span prefix mask associated with the search prefix R:170/8 identifies three search prefixes (N:160/4, Q:168/6 and R:170/8) as being within the b-tree 40 even though the search path passes to the right of the search prefix R and does not encounter leaf node 2-4 of the b-tree 40, which contains the additional matching search prefixes of N:160/4 and Q:168/6. These three search prefixes are identified by ANDing the vectors 11110000 (corresponding to SPM/4), 11111100 (corresponding to SPM/6) and 11111111 (corresponding to SPM/8) with 170, which is represented in binary format as 10101010b. This ANDing operation is illustrated more fully by TABLE 5. Of the identified search prefixes N:160/4, Q:168/6 and R:170/8 within the breakout box to the right of node 1-1, search prefix Q:168/6 represents a longest prefix match to the applied search key 171. Thus, even though the search prefix Q:168/6 is not within the search path that extends from node 0-0 to node 1-1 and then terminates at node 2-5, it is properly identified as a longest prefix match with the aid of the SPMs. In this manner, the SPM associated with search prefix R:170/8 supports a "lookahead" search operation to node 2-4, which is outside the search path associated with the applied search key 171.

Search operations within a search engine device according to some embodiments of the invention result not only in the detection of a longest prefix match within a database of entries (e.g., a hierarchical memory containing a multi-level b-tree), but also in the generation of result data, which is typically provided to a command host responsible for issuing search and other instructions to the search engine device. This result data, which is referred to herein as "handles," may be maintained within handle memory associated with the search engine device.

One approach to updating a hierarchical memory that supports a b-tree in accordance with FIG. 4A includes representing a handle associated with a search prefix at multiple levels within the b-tree. This incurs the cost of additional handle memory, but allows for highly efficient updates to the hierarchical memory. A requirement that each handle associated with a search prefix be stored up to once for each level of the b-tree can result in the total handle memory size being much greater than the amount of memory needed for one handle times the maximum number of search prefixes supported by the b-tree. However, because it is typically difficult to predict or tightly control a distribution of search prefixes and their corresponding handles within a b-tree, an efficient way to reduce handle memory is by tailoring the shape of a b-tree to minimize handle memory usage. Here, the worst case for handle memory usage is to provide storage for one handle per each bit of each SPM in each node above the leaf level and one handle for each search prefix in each leaf node.

FIG. 4C illustrates the three-level b-tree 40 of FIG. 4A along with a diagram that illustrates an allocation of a dedicated handle memory 42 to support the b-tree 40. This handle memory 42 includes one handle memory block for each leaf node at Level 2 of the b-tree 40 and one handle memory block for each search prefix at the leaf parent level and higher levels (e.g., Levels 0 and 1) of the b-tree 40. Each handle memory block at the leaf parent level and higher level(s) provides sufficient storage for one handle per bit of the span prefix mask associated with the corresponding search prefix. Accordingly, as illustrated at FIG. 4C, a maximum of nine (9) handles (i.e., W+1 handles) may be stored in a handle memory block associated with the search prefix at the root node (i.e., node 0-0) of the b-tree 40, with the number of valid handles in the handle memory block being equivalent to the number of bits set within the corresponding span prefix mask. Each of the handle memory blocks at the leaf parent level is also configured to store as many as nine (9) handles. Fortunately, each handle memory block at the leaf level, which contains most of the search prefixes within the b-tree, only needs sufficient capacity to store one handle per search prefix within a node at the leaf level. Each handle memory block at the leaf level can be indexed based on the search prefix position of the longest matching prefix within the leaf node at which a search terminated. Moreover, it is only necessary to perform one read operation on the dedicated handle memory 42 per search. Thus, there is no need to perform one read operation on the handle memory for each level of the tree as there is when performing a search operation on a hierarchical memory containing the b-tree.

In the search example described above with respect to FIG. 4B, the longest matching prefix was shown to be Q:168/6. The search prefix Q was not found by traversing the node where search prefix Q was located within the b-tree 40, but was instead based on the /6 bit being set in the SPM associated with search prefix R:170/8 at node 1-1, key 0. Indexing the handle memory 42 in FIG. 4C using the position of search prefix R as the reference, identifies a sub-block of handles with valid handles. These valid handles are represented by the handle words corresponding to the /4, /6 and /8 bits of the corresponding SPM. Reading the location in handle memory 42 associated with the /6 bit returns "Handle 0" which is the correct handle for the longest matching prefix Q:168/6.

As illustrated by FIG. 4D, it is possible to save some handle storage space at the leaf parent level within the b-tree for those cases where M<W within the b-tree (i.e., where the number M of search prefixes within each leaf node (e.g., 3) is less than the width of the search prefixes in the b-tree (e.g., 8)). In this special case, instead of needing handle storage space for W+1 (e.g., 9) handles per search prefix, it is only necessary to store M+1 (e.g., 4) handles per search prefix at the leaf parent level. This reduced capacity handle memory 42' is illustrated at FIG. 4D.2. This special case scenario may also be applied at any non-leaf level where the capacity (i.e., # of search prefixes) of all sub-trees to the non-leaf level is less than W.

Figure 5A:
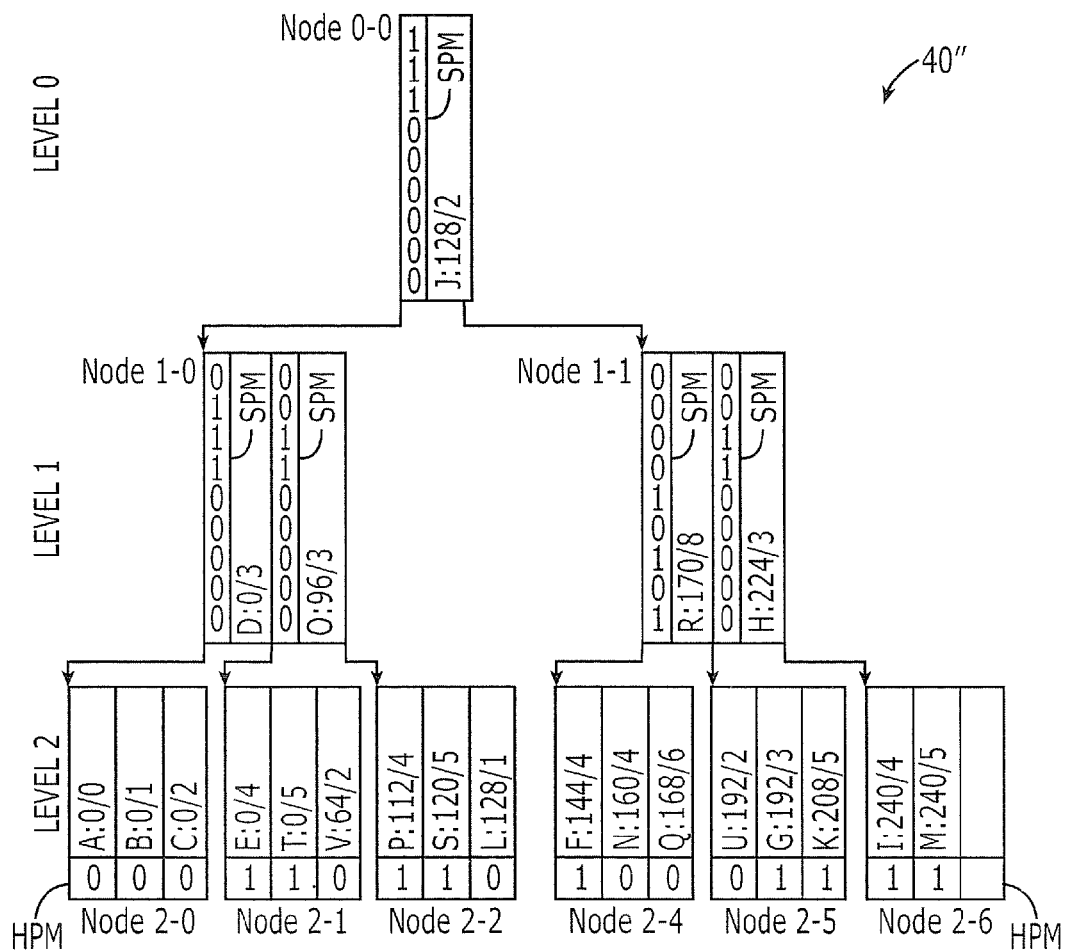
FIG. 5A illustrates a three-level b-tree data structure that contains search prefixes and span prefix masks (SPMs) according to another embodiment of the present invention.

A three-level b-tree data structure 40" that contains search prefixes and span prefix masks (SPMs) according to another embodiment of the present invention is illustrated by FIG. 5A. This b-tree data structure 40" is similar to the b-tree 40 of FIG. 4A, however, three differences are present. The first difference can be understood by evaluating, for example, the span prefix masks (SPMs) associated with the search prefix J at the root node (node 0-0) and the search prefix D at node 1-0, in FIG. 5A. At the root node, the /0 bit of the SPM (i.e., SPM[0]) associated with the search prefix J is set to "1" to thereby reflect the presence of search prefix A at a lower leaf node (i.e., node 2-0). The setting of this bit is consistent with the results illustrated by TABLE 2. However, at node 1-0, the /0 bit of the SPM associated with the search prefix D is held at "0" to thereby remove any identification of the search prefix A at the leaf node 2-0, because it has already been identified by the SPM associated with search prefix J at a higher level within the b-tree 40" Thus, in FIG. 5A, a search prefix is reflected only once in an SPM, and then only at the highest level that it can be represented within the b-tree 40".

The second and third differences are present because it is necessary to know if a handle (i.e., result) associated with a search prefix is stored in memory associated with a location of the search prefix within the b-tree or associated with an SPM bit being set to represent the search prefix at a higher level within the b-tree. In particular, the second difference involves setting a corresponding bit in an SPM to represent the SPM's search prefix only if that search prefix is not identified in another SPM at a higher level within the b-tree. For example, the /2 bit of the SPM corresponding to search prefix J is set to "1" to thereby reflect the search prefix J, and the /3 bits of the SPMs corresponding to the search prefixes D, O and H at nodes 1-0 and 1-1 are all set to "1" because none of these search prefixes are identified in the SPM corresponding to the search prefix J at a higher level in the b-tree 40". However, if the search prefix D, O, or H was identified in the SPM corresponding to search prefix J, then the /3 bit of the corresponding SPM for that search prefix would not be set at level 1 in the b-tree 40". The third difference includes using one "handle present mask" bit (HPM) per search prefix within the leaf nodes to indicate whether the corresponding search prefix has been identified in an SPM at a higher level in a b-tree. Thus, at node 2-0 in FIG. 5A, for example, all mask bits are set to "0" because the search prefixes A, B and C are all represented at higher levels within the b-tree 40". In particular, the search prefix A is identified in the SPM corresponding to the search prefix J at the root node and the search prefixes B and C are identified in the SPM corresponding to the search prefix D at node 1-0. At node 2-1, the mask bits for search prefixes E and T are set to "1" because neither of these search prefixes are represented in an SPM at a higher level node in the b-tree 40". However, the mask bit for the search prefix V is set to "0" because the search prefix V is represented by the /2 bit in the SPM associated with the search prefix O at node 1-0.

Figure 5B:
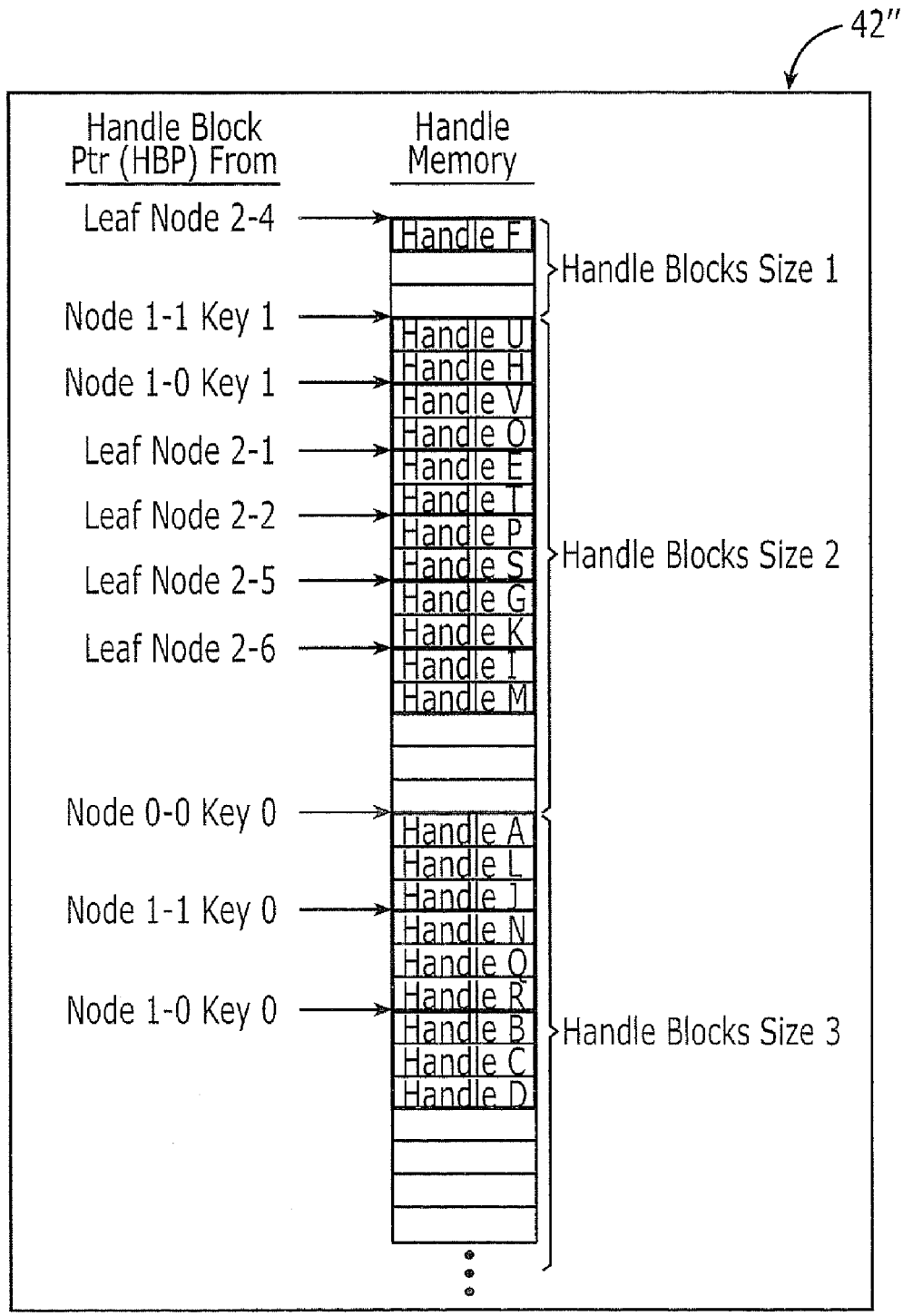
FIG. 5B illustrates an allocation of handle memory that supports the b-tree data structure of FIG. 5A.

Because each search prefix in the b-tree 40" is represented by only one set SPM bit or one set HPM bit, the capacity of a memory needed to support the corresponding handles for the search prefixes in the b-tree 40" can be significantly reduced relative to the handle memories 42 and 42' illustrated by FIGS. 4C.2 and 4D.2. This is because each handle only has to be stored once within a handle memory. As illustrated by FIG. 5B, an exemplary allocation of a handle memory 42" for the b-tree 40" of FIG. 5A includes a variable-sized handle memory block for each search prefix at the leaf parent level or higher and one variable-sized handle memory block for each leaf node. Each leaf node and each search prefix at the leaf parent level or higher may use a corresponding handle block pointer (HBP) to point to a respective handle memory block. Thus, for search prefix J at node 0-0, a respective HBP points to a handle memory block having a capacity of three handles corresponding search prefixes A, L and J. Similarly, for search prefix H (at node 1-1, key 1) an HBP points to a handle memory block having a capacity of two handles corresponding to search prefixes U and H. And, for leaf node 2-5, an HBP points to a handle memory block having a capacity of two handles corresponding to search prefixes G and K.

Finally, because fully specified search prefixes (e.g., search prefix R:170/8 at node 1-1, key 0) cannot be prefixes of other prefixes, they will never be represented in SPMs located at higher levels within the b-tree. Accordingly, whenever a fully specified search prefix is present at a leaf parent level or higher level within a b-tree, the HBP associated with this fully specified search prefix will point to a block of handle memory that is equivalent in size to the number of set bits within the SPM corresponding to this fully specified search prefix and the last handle in this block will correspond to the fully specified search prefix. This special case is best illustrated by the handle block in FIG. 5B that corresponds to the search prefix R at node 1-1, key 0. This handle block includes the handles N and Q, which correspond to set bits within the SPM for the search prefix R, and the additional handle R.

Figure 6:
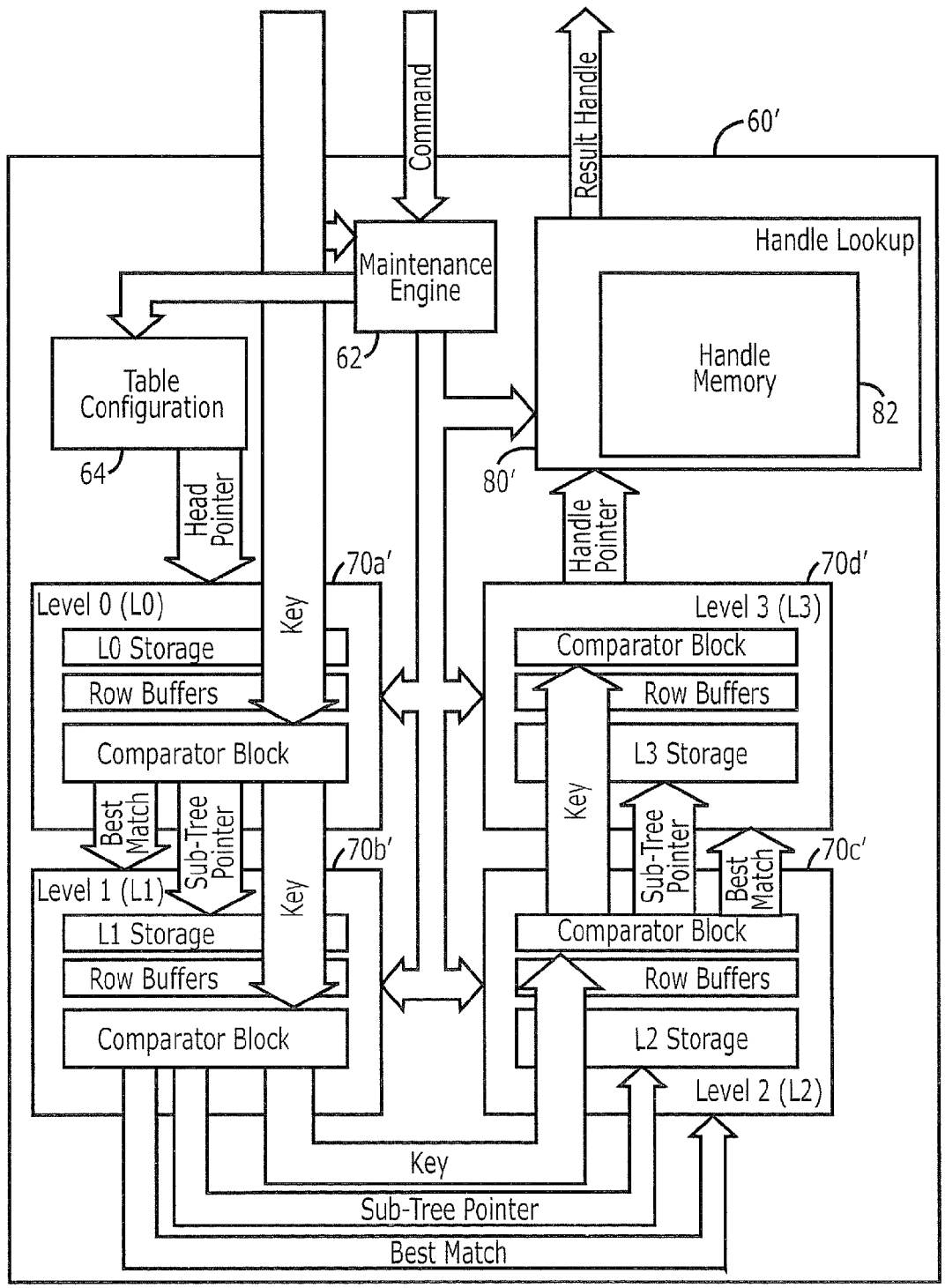
FIG. 6 is a block diagram of a pipelined search engine device that supports the b-tree data structure of FIG. 4B and an allocation of handle memory, according to an embodiment of the invention.

FIG. 6 illustrates a block diagram of a pipelined search engine device 60' that supports the above-described b-tree data structures (with SPMs) and handle memory and is responsive to applied search keys and commands. This search engine device 60', which supports multiple four-level b-trees as separate tables (i.e., databases), which share the same node storage and search logic, includes a plurality of pipeline stages 70a'-70d' dedicated to each b-tree level and a separate pipeline stage 80' for the final result handle lookup and generation of result handles. Alternative embodiments of the search engine device 60' can support b-trees having more or less than four levels. The first pipeline stage 70a' represents a Level 0 block (L0) of the b-tree containing Level 0 storage elements, row buffers (optional in some designs) and comparator logic. The first pipeline stage 70a' is responsive to a head pointer and a key. The second pipeline stage 70b' represents a Level 1 block (L1) containing Level 1 storage elements, row buffers (optional in some designs) and comparator logic. The second pipeline stage 70b' is responsive to a sub-tree pointer, a best match result generated by the first pipeline stage 70a' and the key. Similarly, the third pipeline stage 70c' represents a Level 2 block (L2) containing Level 2 storage elements, row buffers (optional in some designs) and comparator logic. The third pipeline stage 70c' is responsive to a sub-tree pointer, a best match result generated by the second pipeline stage 70b' and the key. The fourth pipeline stage 70d' represents a Level 3 block (L3) containing Level 3 storage elements, row buffers (optional in some designs) and comparator logic. The fourth pipeline stage 70d', which generates a handle block pointer, is responsive to a sub-tree pointer, a best match result generated by the third pipeline stage 70c' and the key. The final pipeline stage is a handle lookup stage 80', which performs handle lookup operations within a handle memory 82 to thereby generate a result handle in response to the handle block pointer.

A table maintenance engine 62 is also provided, which integrates with the four pipeline stages 70a'-70d' and the handle lookup stage 80'. This table maintenance engine 62 performs operations including search key insertion and deletion operations during idle search clock cycles. A table configuration circuit 64 is provided, which can support multiple search trees and map a table ID associated with a received search request to a tree head pointer (HEAD POINTER) for the corresponding table. Because of the pipelined structure of the search engine device 60', the maximum search rate can equal the maximum clock speed supported by the four pipeline stages 70a'-70d' and the handle lookup stage 80'.

The table maintenance engine 62 receives search keys and commands on behalf of the search engine device 60' and forwards search commands to the table configuration circuit 64. The table maintenance engine 62 also queues up any key insert or key delete commands (i.e., update commands) it receives for processing because key insertion and key deletion typically cannot be completed in a simple single pass through the search engine pipeline. When idle command cycles indicate there are memory access opportunities available to perform table maintenance accesses on the memories (L0, L1, L2, L3) within each pipeline stage 70a'-70d' and the handle memory 82 within the handle lookup stage 80', the maintenance engine 62 performs maintenance accesses corresponding to portions of a key insert or key delete request. The maintenance engine 62 can process an insert or delete request and manage search memory node allocation to thereby allocate free nodes when needed to process key inserts and returning freed nodes to a pool when freed during key deletes. To ensure search coherency and permit searching while the maintenance engine 62 processes a key update command, the maintenance engine 62 makes a copy of nodes that must be modified while processing updates and only modifies these "temporary" copies. Once all node copies have been modified at all necessary levels for a key update, the maintenance engine 62 updates pointers in all necessary search levels to point to the modified node copies it was working on and reclaims the original nodes, which were copied, for future use. These pointers are updated in a manner that preserves search coherency on every lookup.

Once all temporary node copies at all levels have been properly updated, a special command is executed within the pipeline of stages to thereby cause each level of the b-tree to point to the node copies and reclaim the nodes that are being replaced. This update process propagates through the pipeline across all levels at the same speed as a search command. Accordingly, all searches that enter the pipeline before the special command will search against a database before any changes pertaining to the update are applied, but any searches that enter the pipeline after the special command will search against a database that appears to have been instantly and completely modified to reflect the update. In this manner, it is not necessary to temporarily stall the multiple levels of the search engine device 60' while an update is being performed.

The table configuration circuit 64 receives search commands from the maintenance engine 62, which include a table ID for the table to be searched. The table configuration circuit 64 then maps the table ID, corresponding to a unique b-tree within the search engine device 60', to a root tree node pointer in the Level 0 block 70a'. The table configuration circuit 64 then forwards this pointer to the Level 0 block 70a' instructing it to perform a search starting at the root node pointed to by the root tree node pointer.

Each of the Level 0, Level 1 and Level 2 blocks 70a'-70c' corresponds to one of the upper three levels of an SPM b-tree. Each level receives a search key, a sub-tree pointer and an indication of the best match found by the previous levels in the search. In the case of the Level 0 block 70a', which is only utilized (as the root level) when the height of the search tree equals four, this best match input indication is always null. A Level 0, Level 1 or Level 2 block reads a search node from its node storage based on the sub-tree pointer it receives and buffers it in a set of flip-flops within its respective row buffer sub-block. Each node stores a set of keys, SPM bit-masks and sub-tree pointers. The comparator sub-block compares the search key to all of the keys and the SPM bit-masks read from the node storage sub-block and determines the best match for the search key, if any, and also determines which of the node's sub-tree pointers the search should follow for the next level of the search. The Level 0, Level 1 or Level 2 block forwards the sub-tree pointer it finds to the next lower level block along with the search key. If the next lower level block finds a new best match, then this best match for the search key is forwarded to the next lower level search stage. However, if no new best match is found, then the best match from the previous higher stage is forwarded to the next stage.

The Level 4 block corresponds to the leaf level of the SPM b-tree. It receives a search key, sub-tree pointer and any indication of a best match from the previous levels in the search. The Level 4 block reads a search node from its node storage based on the sub-tree pointer that it receives and buffers it in a set of flip-flops within its row buffer sub-block. The comparator sub-block compares the search key to all of the keys read from the node storage sub-block and determines a best match, if any. If the Level 4 block finds a new best match for the search key, then it forwards its own best match as the handle pointer to the handle lookup block 80'. Otherwise, if no new best match is found, then the best match received from the prior stage is passed as the handle pointer.

The handle lookup block 80' receives an indication of the best match found by the Level 0-Level 3 search stages 70a'-70d' and uses the best match as an index to lookup a search result handle in the handle memory 82. In response to the index, the handle memory 82 outputs a retrieved handle as the result handle (i.e., the search result).

A search engine device according to additional embodiments of the present invention is configured as a pipelined search engine having a multiple levels of hierarchical processing logic. As described and illustrated more fully hereinbelow with respect to FIGS. 7-11, each (LEVEL_i) includes: (i) control and search logic, (ii) storage for that level's node data-structures, and (iii) a node maintenance sub-engine. The node maintenance sub-engine locally handles node modifications for that level's nodes, communicates with its child level (i.e., next lowest level the hierarchy) to assist in handling node overflows and underflows at that level (does not apply to leaf level) and communicates with its parent level to get support in handling its own node overflows and underflows (does not apply to LEVEL_1). Each level (LEVEL_i) also communicates with a handle memory lookup engine (HANDLE_MEMORY) to delegate and coordinate handle memory updates that must be kept in sync with node data structure updates.

Figure 7:
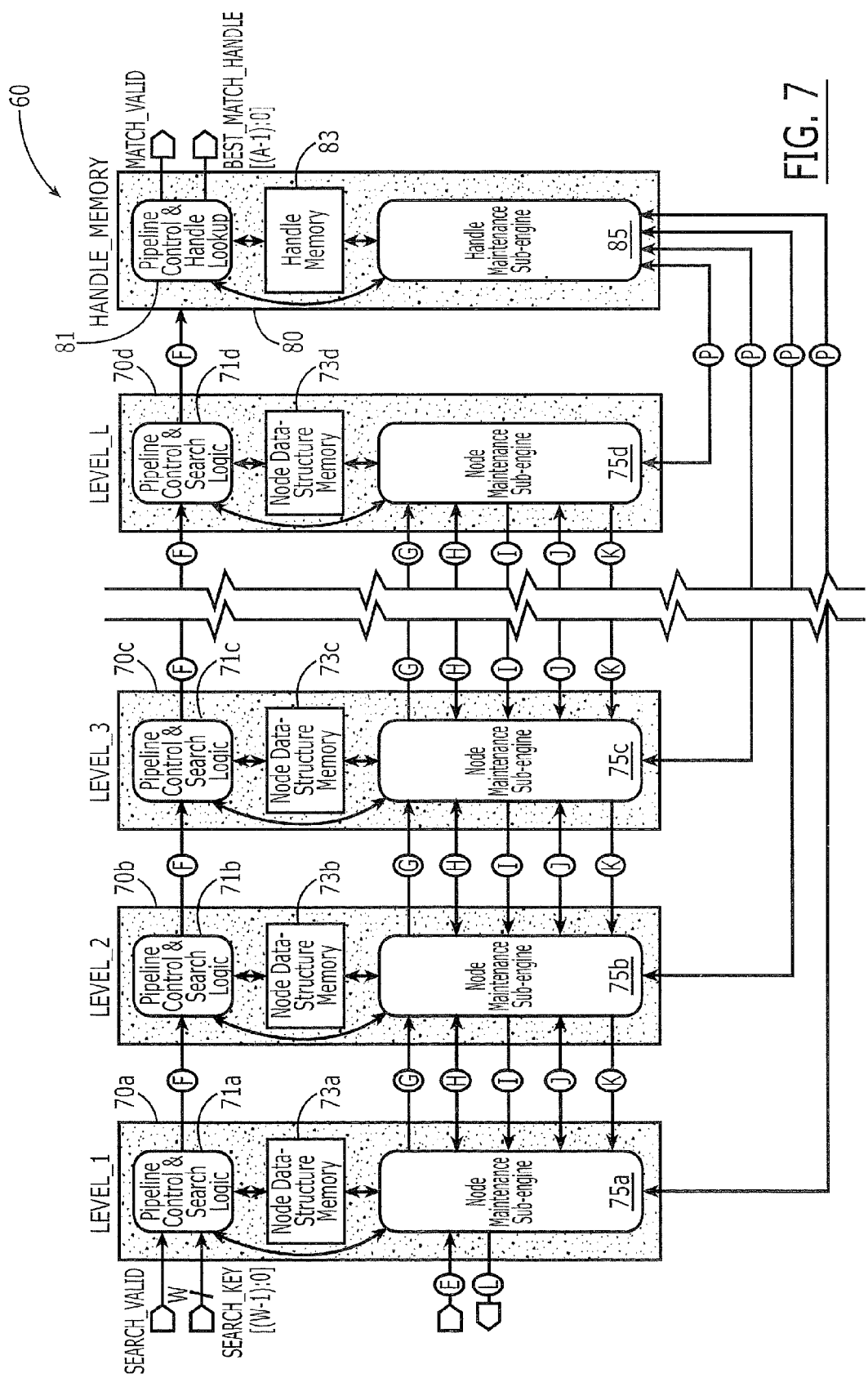
FIG. 7 is a block diagram of an integrated search engine device according to an embodiment of the present invention.

Referring now to FIG. 7, an integrated circuit search engine 60 according to additional embodiments of the present invention includes a pipelined arrangement of search and tree maintenance sub-engines 70a-70d and a final stage handle memory lookup engine 80 therein. Each of these sub-engines 70a-70d includes a corresponding level of a hierarchical memory therein. Thus, the first search and tree maintenance sub-engine 70a contains the highest level of the hierarchical memory and the fourth search and tree maintenance sub-engine 70d contains the lowest level of the hierarchical memory. The second and third search and tree maintenance sub-engines 70b and 70c contain respective intermediate levels of the hierarchical memory. The number of intermediate levels of the hierarchical memory may vary depending on the application to which the search engine 60 is applied. The search and tree maintenance sub-engines 70a-70d are also identified by the reference labels LEVEL_1, LEVEL_2, LEVEL_3, . . . , LEVEL_L, which identify the memory level supported therein. Alternatively, the reference labels LEVEL_0, LEVEL_1, . . . , LEVEL_L−1 could also be used to reflect the same relative levels, as show by FIGS. 3-6. The reference character "L" represents a positive integer equal to a maximum height of the tree that can be supported by the search engine 60. The hierarchical memory is configured to store a multi-way tree (e.g., b-tree, b*tree, b+tree) of search prefixes that spans the plurality of memory levels. The hierarchical memory is also preferably configured to support increases in a height of the multi-way tree relative to a leaf node level of the multi-way tree, which can be fixed in location at a lowest one of the plurality of memory levels (i.e., LEVEL_L) within the fourth search and tree maintenance sub-engine 70d. These increases in the height of the multi-way tree typically occur as a capacity of the multi-way tree increases in response to search prefix insertions.

The first search and tree maintenance sub-engine 70a is illustrated as including a first pipeline control and search logic module 71a, which is also referred to herein more generally as a first control module, a first level node memory 73a, which operates as a highest memory level within the hierarchical memory, and a first node maintenance sub-engine 75a. The second search and tree maintenance sub-engine 70b is illustrated as including a second pipeline control and search logic module 71b, which is also referred to herein more generally as a second control module, a second level node memory 73b, which operates as a second highest memory level within the hierarchical memory, and a second node maintenance sub-engine 75b. The third search and tree maintenance sub-engine 70c is illustrated as including a third pipeline control and search logic module 71c, which is also referred to herein more generally as a third control module, a third level node memory 73c, which operates as a third highest memory level within the hierarchical memory, and a third node maintenance sub-engine 75c. The fourth search and tree maintenance sub-engine 70d is illustrated as including a fourth pipeline control and search logic module 71d, which is also referred to herein more generally as a fourth control module, a fourth level node memory 73d, which operates as a lowest memory level within the hierarchical memory, and a fourth node maintenance sub-engine 75d. As described more fully hereinbelow, the first, second and third level node memories 73a-73c may be configured to store search prefixes, SPMs and related tree data in some embodiments of the present invention. These memories are also referred to herein as a node-data-structure memories. The handle memory lookup engine 80 includes a pipeline control and handle lookup logic module 81, a handle memory 83 and a handle maintenance sub-engine 85.

Upon commencement of a search operation, the first control module 71a receives a search valid signal SEARCH_VALID, which initiates a search operation within the search engine 60 when asserted, and a corresponding applied search key SEARCH_KEY[(W−1):0], which is also treated herein more generally as an applied search prefix (e.g., a fully specified search prefix). In response, the first control module 71a may generate a plurality of signals that are passed downstream on an internal interface/bus F to the next highest control module within the pipeline. This next highest control module is illustrated as the second control module 71b. The plurality of signals passed downstream on interface/bus F may include: SEARCH_VALID, SEARCH_KEY[(W−1):0], NEXT_LEVEL[(J−1):0], NEXT_PTR[(P−1):0], MATCH_VALID, BEST_MATCH_LEVEL[(J−1):0], BEST_MATCH_PTR[(P−1):0], BEST_MATCH_KEY_POS[(K−1):0] and BEST_MATCH_KEY_OFFSET[(F−1):0]). These signals and the operations performed by the pipelined control modules 71a-71d are described more fully hereinbelow with respect to FIGS. 10A-10C and 11A-11B.

The first node maintenance sub-engine 75a is illustrated as being communicatively coupled to a maintenance request interface E and a maintenance acknowledgment interface L. The maintenance request interface E may be used to pass maintenance instructions (e.g., insert, delete, age, learn, search and learn (SNL)) to the search engine 60 for processing therein and the maintenance acknowledgment interface L may be used to communicate maintenance results and status information back to an issuing host processor (not shown). Interfaces G, H, I, J and K extend between the node maintenance sub-engines 75a-75d, as illustrated. Interface G is a maintenance information interface, which can communicate maintenance information downstream (for inserts and deletes), and a bidirectional interface H is "key drop" interface, which supports upstream requests (for prefixes) and downstream transfers of search prefixes between the plurality of levels (LEVEL_1, . . . , LEVEL_L) of the search engine 60. Interface I is a child modification interface, which supports upstream transfers of information relating to child nodes associated with a lower memory level. Interface J is a bidirectional "key raise" interface, which supports upstream transfers of search prefixes between the plurality of levels of the search engine 60 and downstream transfers of parent acknowledgment information. Interface K is a maintenance "ready" interface, which indicates a ready/non-ready status (done or error). Finally, interface P is a handle update interface, which supports handle memory updates within the handle memory lookup engine 80. As illustrated, this interface is coupled to each of the search and tree maintenance sub-engines 70a-70d in the pipeline. In some embodiments of the present invention, the handle memory lookup engine 80 may have the same general configuration illustrated by FIGS. 4C-4D and 11A-11B.

Figure 8A:
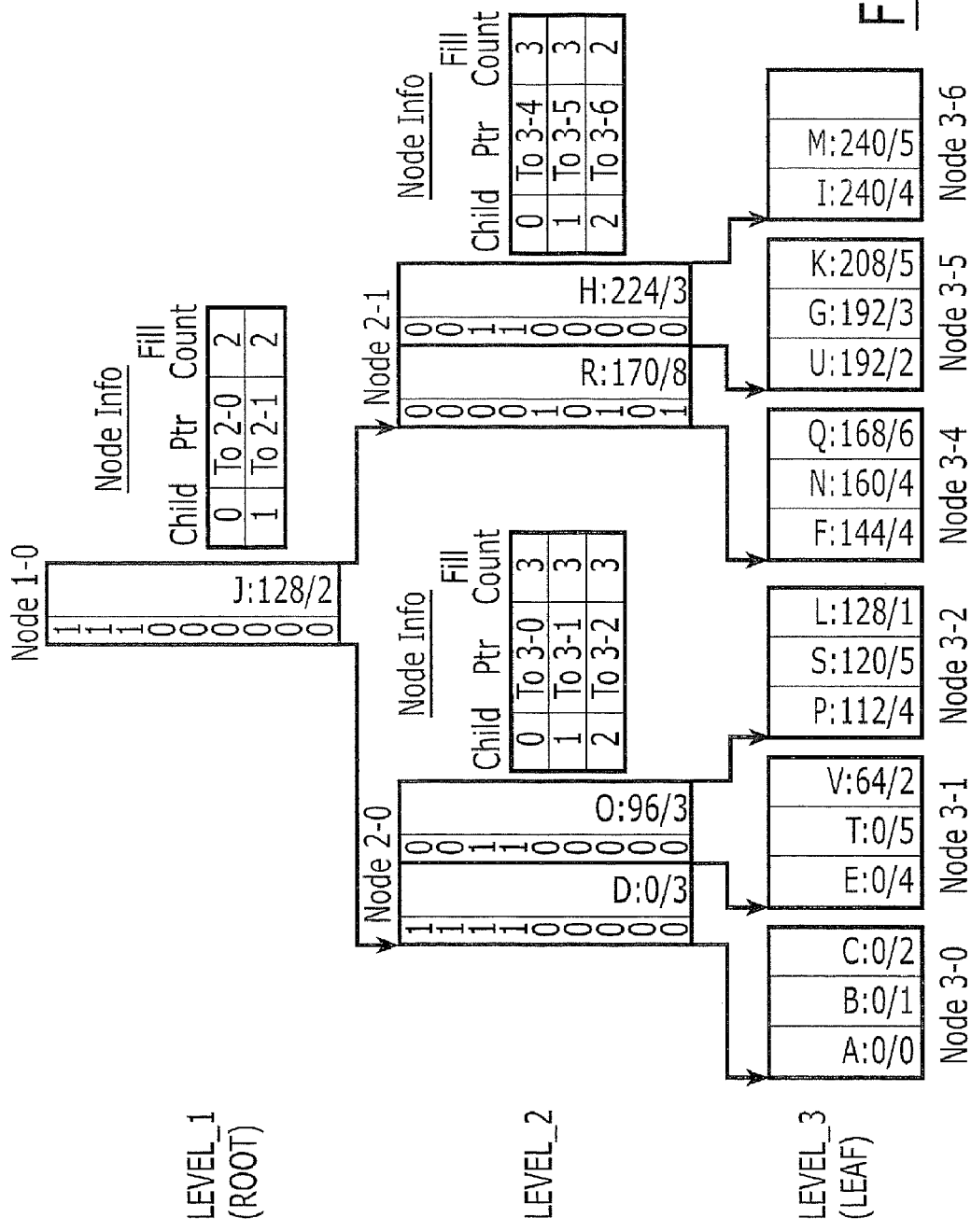
FIGS. 8A-8B illustrate a three-level SPM b-tree data structure that can be supported by the search engine device of FIG. 7, before and after insertion of a search prefix therein requiring leaf node splitting.
Figure 8B:
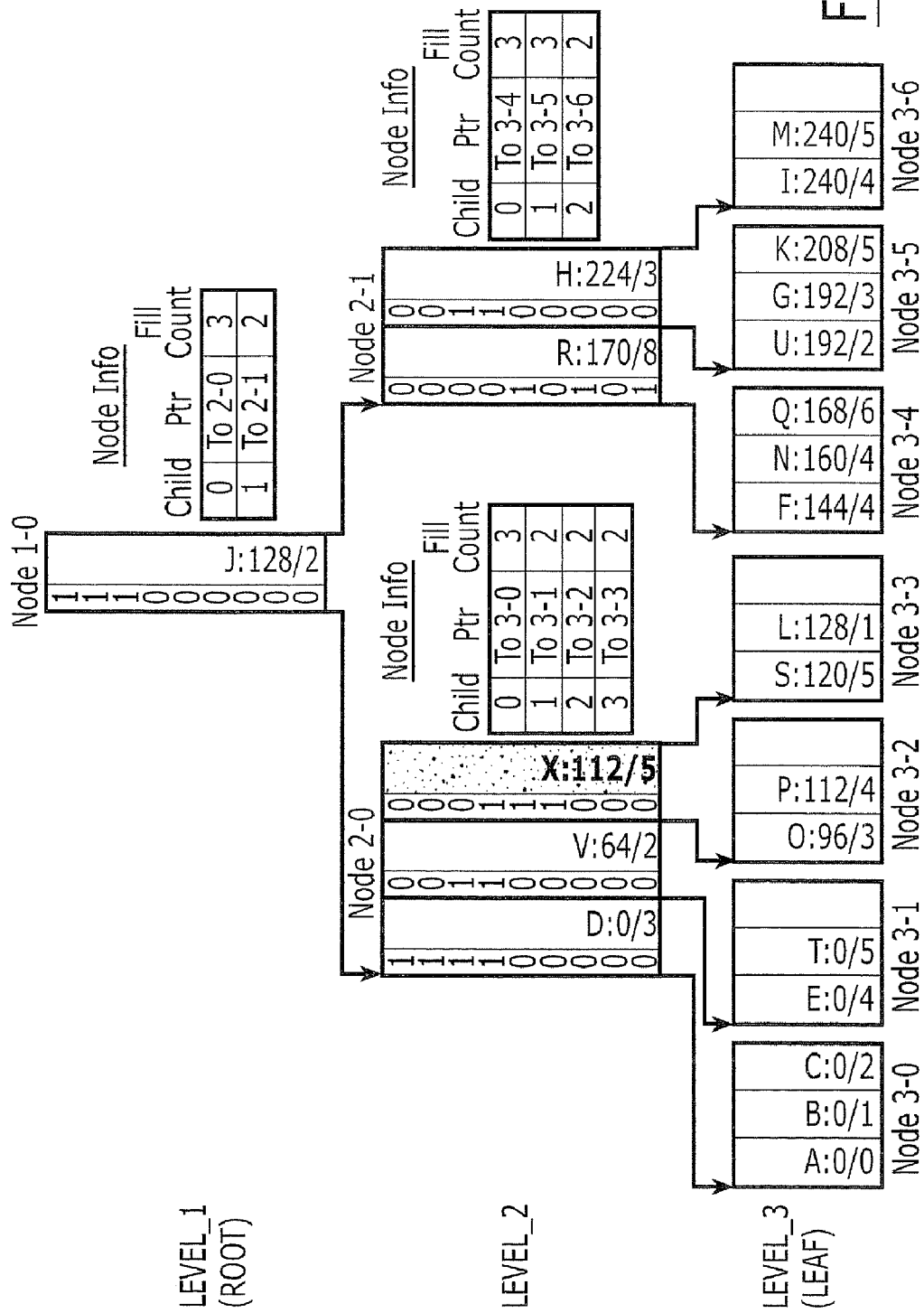

Some methods of operating the search engine 60 of FIG. 7 will now be described more fully with reference to FIGS. 8A-8B and 9A-9H for the simplified case where L (i.e., maximum tree height) equals 3. These methods reflect operations performed within the search engine 60, in response to an insert instruction. In particular, FIG. 8A illustrates a "before" snapshot of a three-level b-tree data structure containing search prefixes and span prefix masks (SPMs) according to embodiments of the present invention and FIG. 8B illustrates an "after" snapshot of the three-level b-tree data structure, which has been updated by the insertion of search prefix X:112/5 therein. The three-level b-tree in FIG. 8A includes a root node (NODE 1-0) at LEVEL_1 with two child nodes (NODE 2-0, NODE 2-1) located at LEVEL_2. The root node (NODE 1-0) contains the search prefix J:128/2 (and corresponding 9-bit SPM) and two pointers to the two child nodes, which each have a fill count of 2. NODE 2-0 at LEVEL_2 includes two search prefixes (with corresponding SPMs), which are illustrated as D:0/3 and O:96/3. NODE 2-1 at LEVEL_2 includes two search prefixes (with corresponding SPMs), which are illustrated as R:170/8 and H:224/3. NODE 2-0 points to three leaf nodes (NODES 3-0, 3-1 and 3-2), which each have a fill count of 3. NODE 2-1 points to two leaf nodes (NODES 3-4 and 3-5), which each have a fill count of 3, and a third leaf node (NODE 3-6), which has a fill count of 2. The exemplary b-tree of FIG. 8A assumes that M=3 (i.e., maximum of three keys per node) at each level, with a required node utilization of ⅔ of M.

The three-level b-tree in FIG. 8B, includes a root node (NODE 1-0) at LEVEL_1 with two child nodes (NODE 2-0, NODE 2-1) located at LEVEL_2. The root node (NODE 1-0) contains the search prefix J:128/2 (and corresponding 9-bit SPM) and two pointers to the two child nodes. NODE 2-0 at LEVEL_2 includes three search prefixes (with corresponding SPMs), which are illustrated as D:0/3 and V:64/2 and the newly added search prefix: X:112/5. NODE 2-1 at LEVEL_2 includes two search prefixes (with corresponding SPMs), which are illustrated as R:170/8 and H:224/3. NODE 2-0 points to four leaf nodes: NODES 3-0, 3-1, 3-2 and 3-3. NODE 3-0 has a fill count of 3 and NODES 3-1, 3-2 and 3-3 have a fill count of 2 (resulting from a split operation). NODE 2-1 points to two leaf nodes (NODES 3-4 and 3-5), which each have a fill count of 3, and a third leaf node (NODE 3-6), which has a fill count of 2.

Operations for generating the b-tree data structure of FIG. 8B by inserting the search prefix X:112/5 into the b-tree data structure of FIG. 8A will now be described more fully with reference to FIGS. 7 and 9A-9H. In particular, in response to an INSERT_START command received on the maintenance request interface E, the search path follows the LEVEL_1 left side child pointer 0 from root NODE 1-0 to NODE 2-0 at LEVEL_2 and then follows the right side child pointer 2 from NODE 2-0 to NODE 3-2 in LEVEL_3, which is fully occupied at a fill count of 3. The node maintenance sub-engine 75c at LEVEL_3 determines that the insert prefix X:112/5 should be inserted between prefix P:112/4 in key position 0 and prefix S:120/5 in key position 1 of NODE 3-2. But, this proposed insertion violates the maximum fill count requirement (M=3) for this leaf node and therefore requires additional insert overflow processing.

Figure 9A:
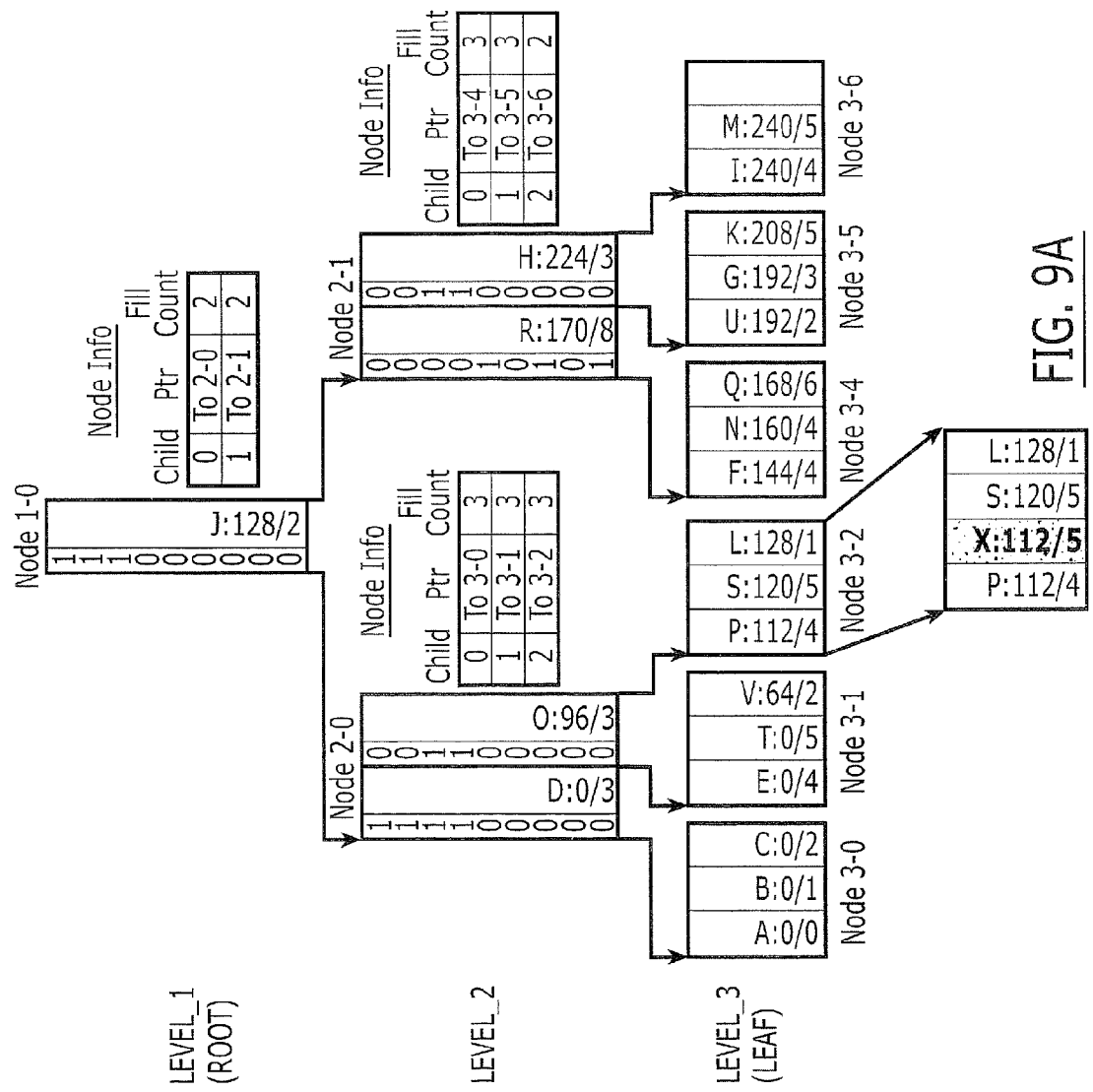
FIGS. 9A-9H illustrate portions of a three-level SPM b-tree data structure that can be supported by the search engine device of FIG. 7, at various stages of an insert overflow operation.

The first node maintenance sub-engine 75a within the first search and tree maintenance sub-engine 70a at LEVEL_1 also recommends (via its G interface) to LEVEL_2 a redistribution between NODES 2-0 and 2-1 if NODE 2-0 incurs an overflow in response to the insert command. The second node maintenance sub-engine 75b at LEVEL_2 recommends (via its G interface) to LEVEL_3 a 2->3 split starting with NODES 3-1 and 3-2, if NODE 3-2 incurs an overflow. In response to this recommendation, the third node maintenance sub-engine 75c at LEVEL_3 recognizes that the node to be inserted into, NODE 3-2, is already full and will overflow if the insert is to proceed as illustrated by FIG. 9A. Thus, the third node maintenance sub-engine 75c at LEVEL_3 must undergo an insert overflow operation by performing the 2->3 node split involving NODES 3-1 and 3-2.

Figure 9B:
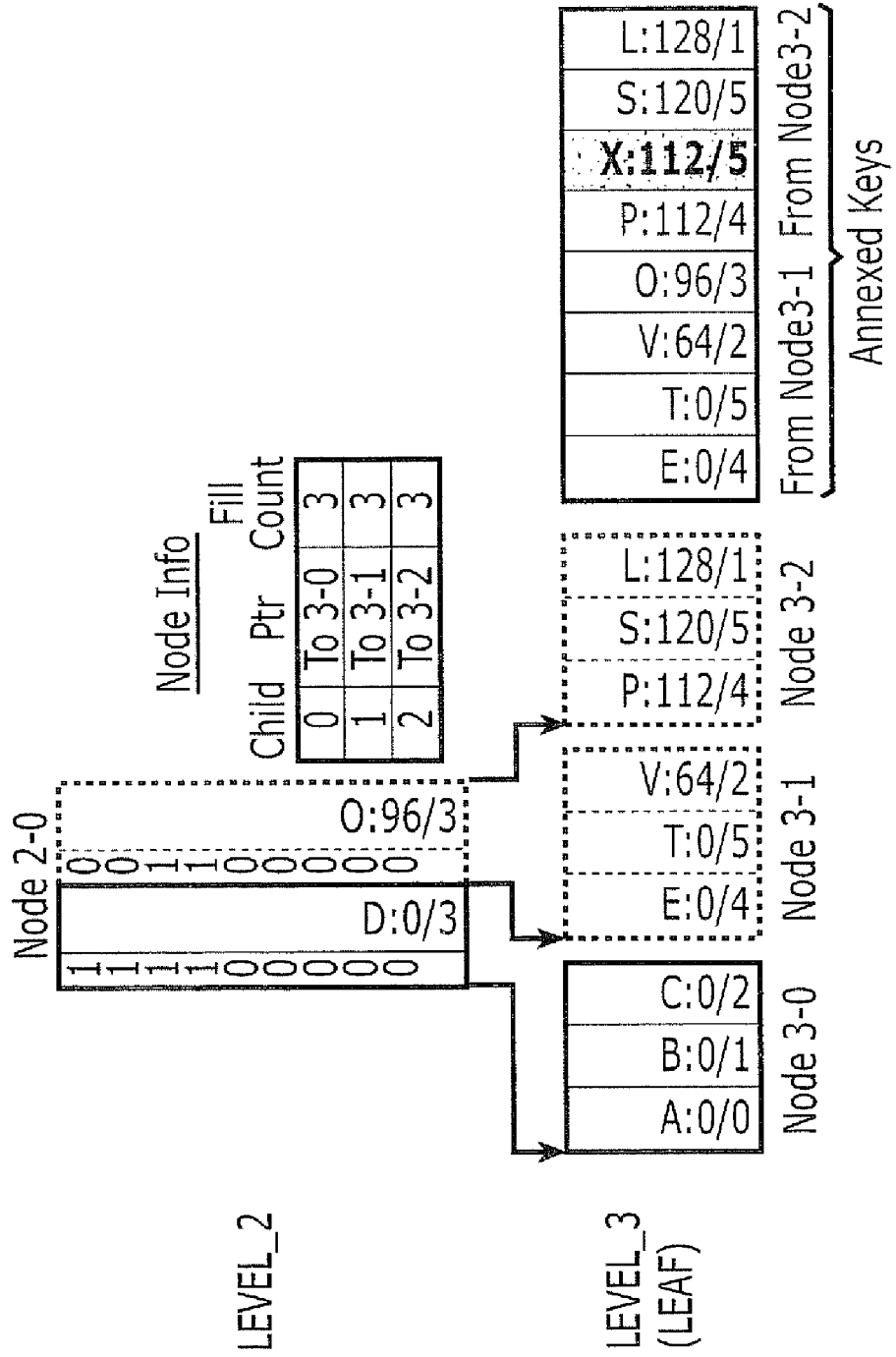
Figure 9C:
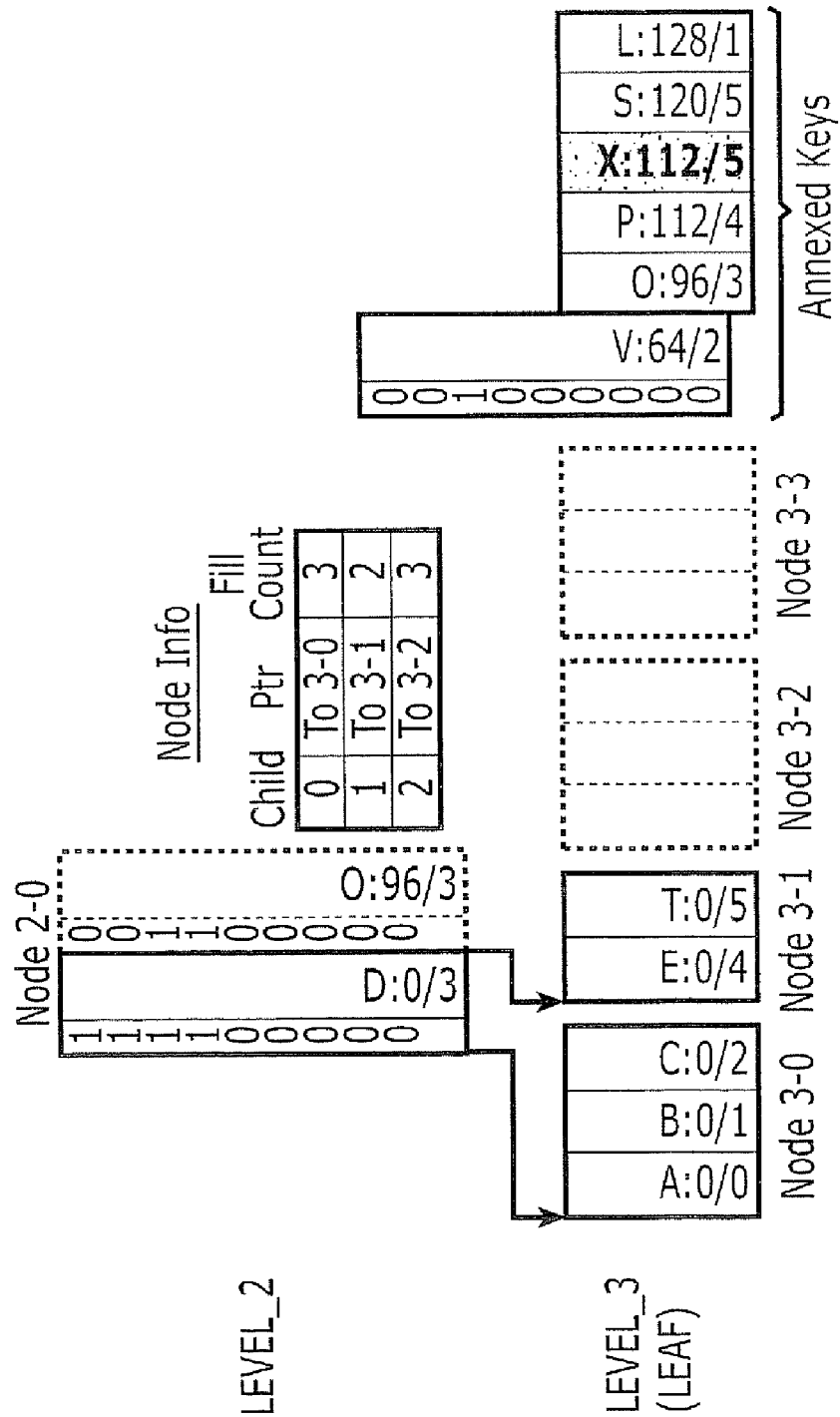
Figure 9D:
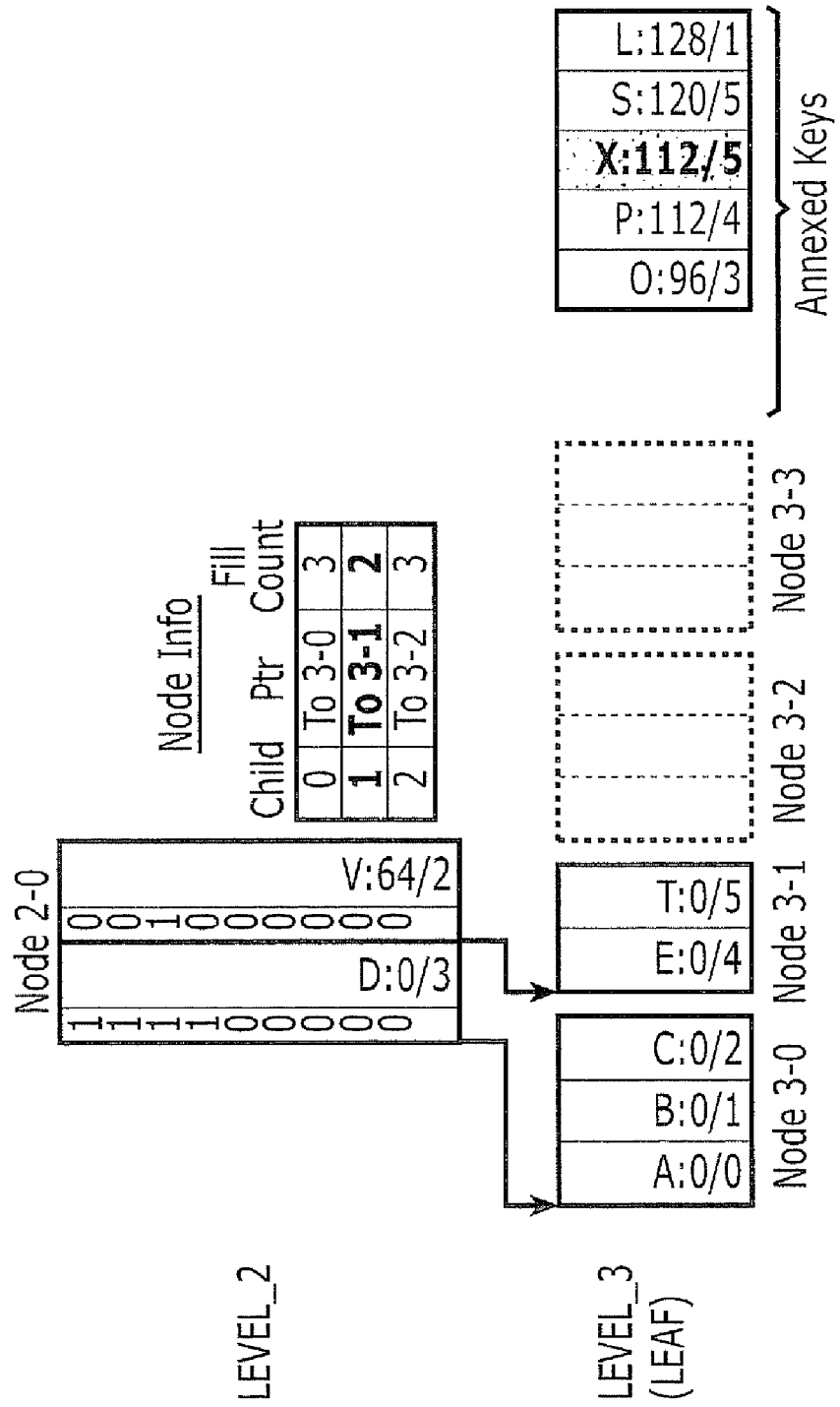

Referring now to FIG. 9B, the third node maintenance sub-engine 75c annexes all the prefixes in NODES 3-1 and 3-2 with the parent prefix O:96/3 located between them (from LEVEL_2). To do this, LEVEL_3 requests (via interface H) that LEVEL_2 drop the prefix at NODE 2-0, key position 1, down to LEVEL_3 and LEVEL_2 responds back on interface H with prefix O:96/3. The third node maintenance sub-engine 75c at LEVEL_3 then writes two prefixes (E:0/4 and T:0/5) back to NODE 3-1 so that a ⅔ fill condition in NODE 3-1 is achieved, as illustrated by FIG. 9C. In addition, LEVEL_3 prepares the SPM for the next prefix V:64/2, which is to be raised up to the node data structure memory 73b in LEVEL_2 based on the two prefixes placed in NODE 3-1. Referring now to FIG. 9D, the sub-engine 75c at LEVEL_3 then sends a child modification message to LEVEL_2 for NODE 3-1, via interface I, and LEVEL_2 updates its child node information for NODE 2-0, child 1 (i.e., NODE 3-1). The sub-engine 75c at LEVEL_3 then raises prefix V:64/2 (and its SPM) up to LEVEL_2 on interface J and LEVEL_2 puts this raised prefix into NODE 2-0, key position 1, as illustrated.

Figure 9E:
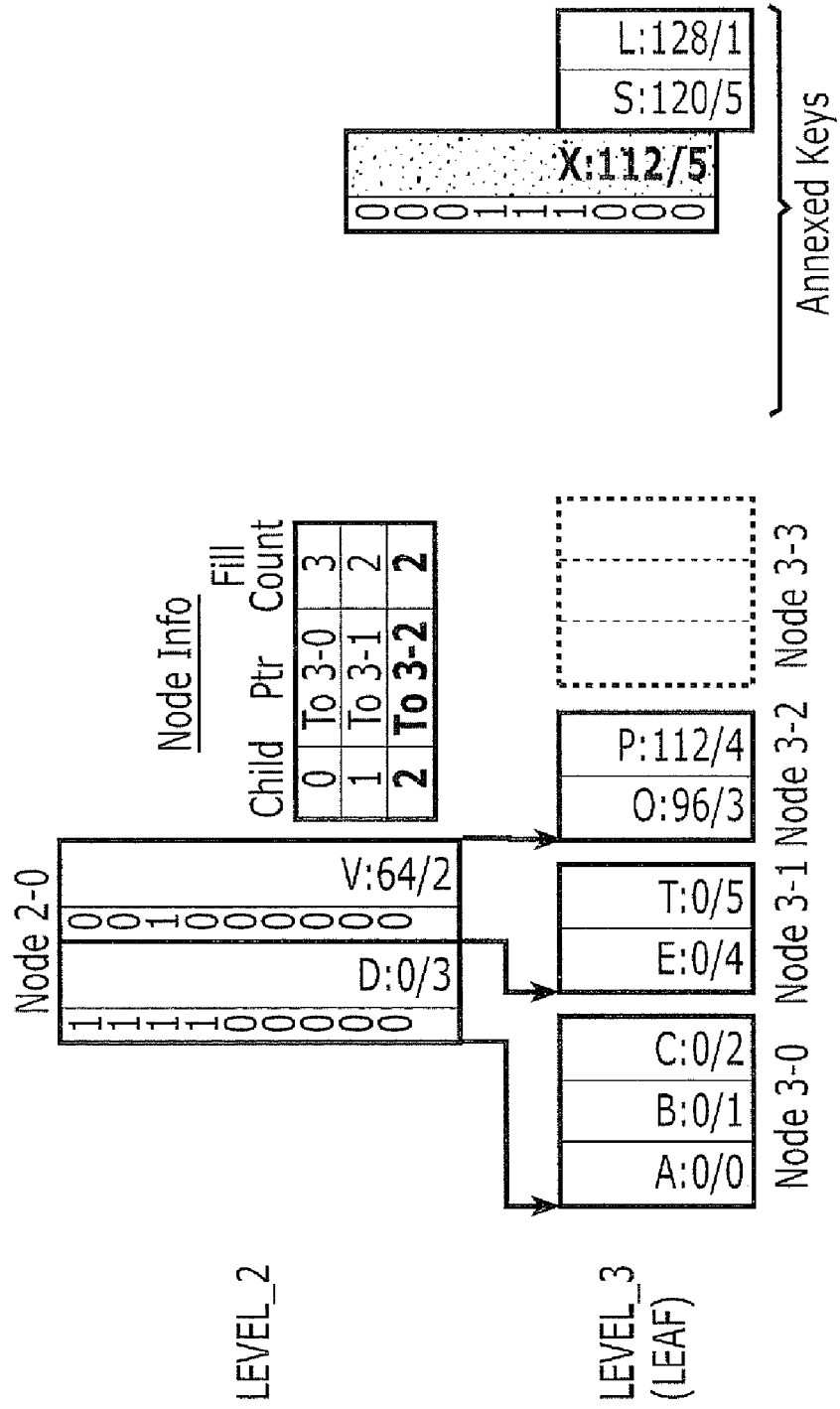

Referring now to FIG. 9E, the third node maintenance sub-engine 75c at LEVEL_3 then transfers the next two prefixes (O:96/3 and P:112/4) back to NODE 3-2 and prepares the SPM for the inserted prefix: X:112/5, so that this prefix and SPM can be written into the second node memory 73b at LEVEL_2. The third node maintenance sub-engine 75c then sends a child modification message to the second node maintenance sub-engine 75b at LEVEL_2 for NODE 3-2 (via interface I) and LEVEL_2 updates its child information for NODE 2-0, child 2. The sub-engine 75c at LEVEL_3 also allocates a node pointer for NODE 3-3 (from a free list (not shown)), the newly added node.

Figure 9F:
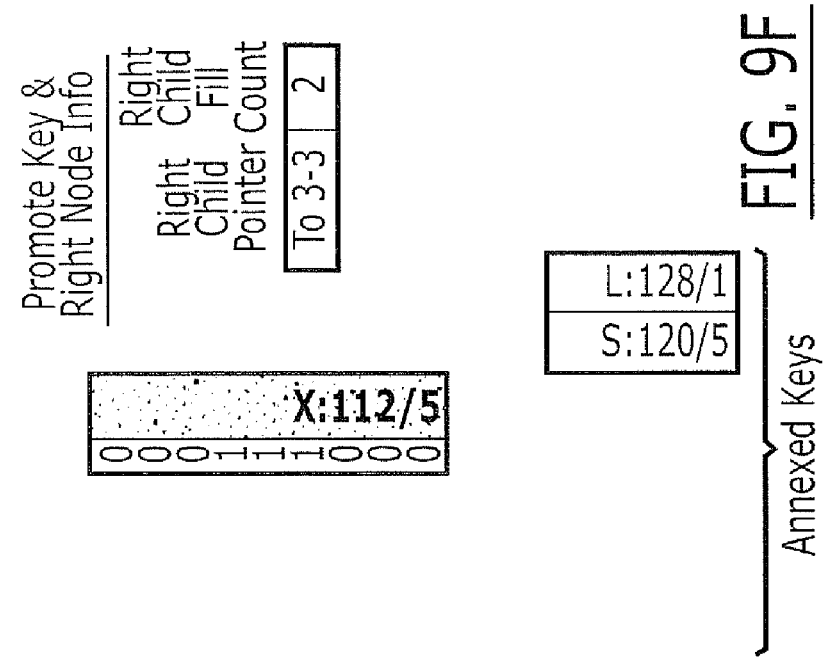
Figure 9F:
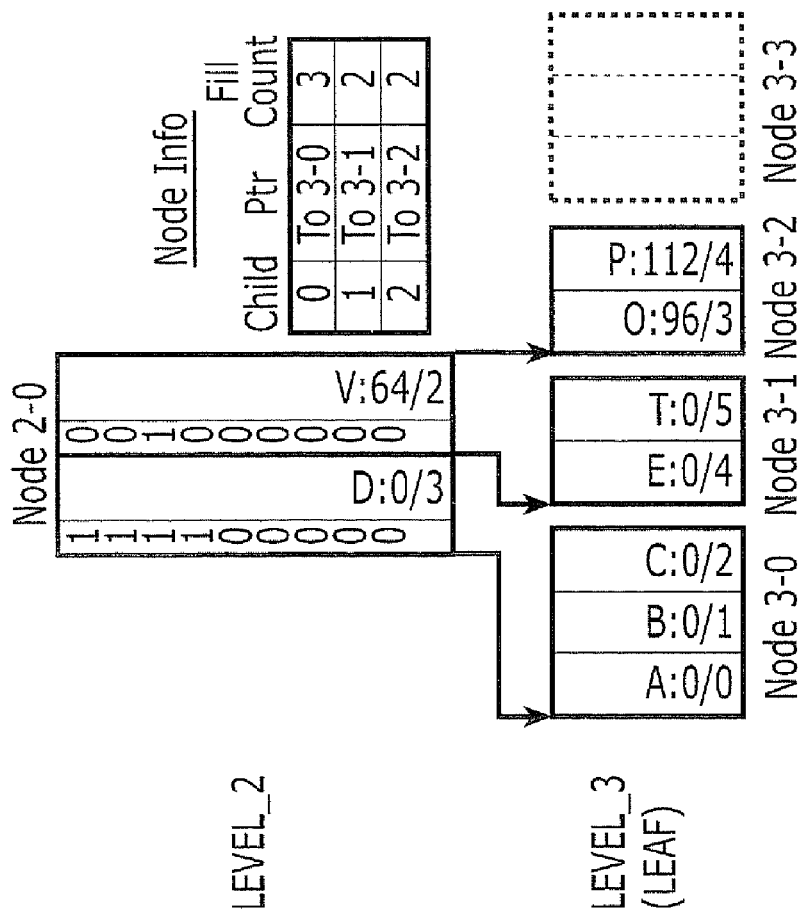
Figure 9G:
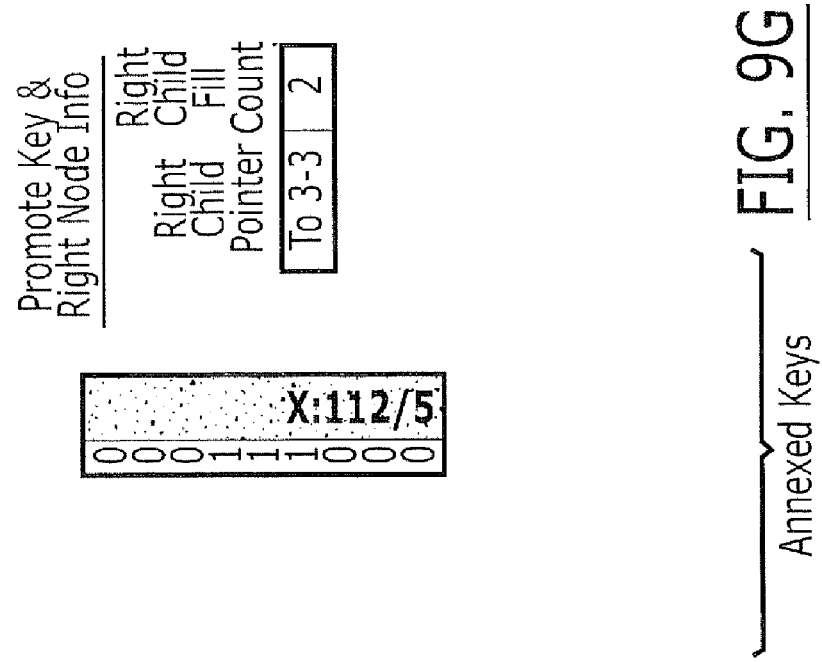
Figure 9G:
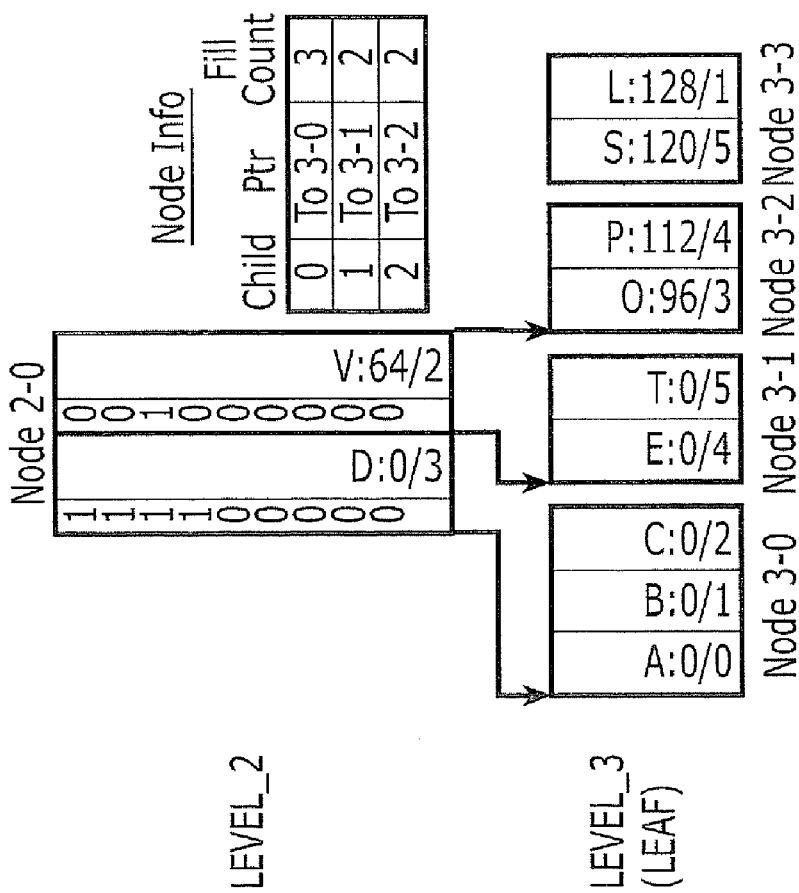

Referring now to FIGS. 9F-9G, the third node maintenance sub-engine 75c then promotes the inserted prefix (X:112/5) and its corresponding SPM up to LEVEL_2 (via interface J), along with its right child pointer to NODE 3-3 (and its future node fill count (2)), and LEVEL_2 buffers these promotions. The third node maintenance sub-engine 75c then updates the third node memory 73c by writing the two remaining annexed prefixes (S:120/5 and L:128/1) into NODE 3-3.

Figure 9H:
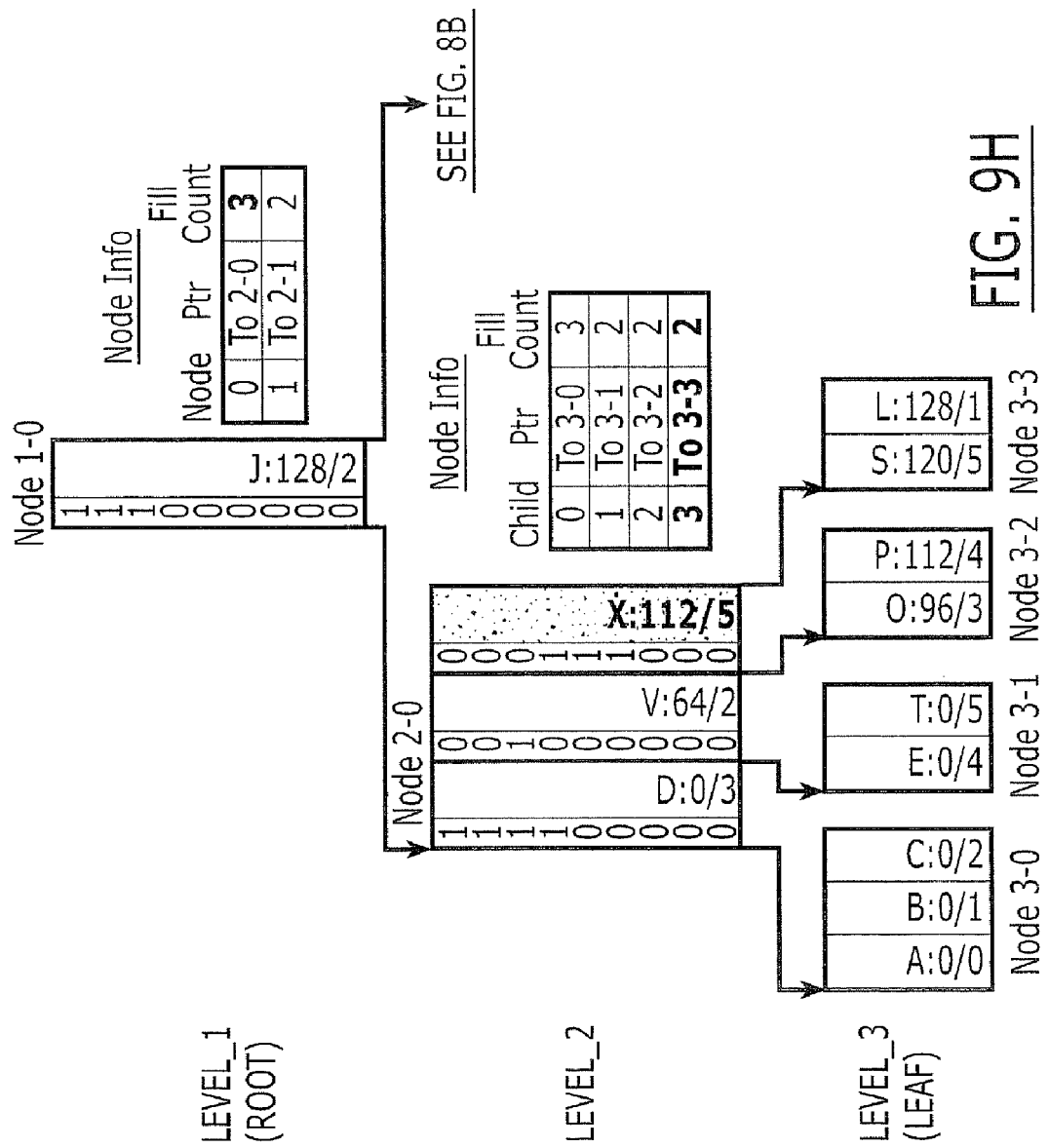

Finally, the third node maintenance sub-engine 75c at LEVEL_3 sends a maintenance ready message on the K interface to LEVEL_2 to thereby indicate that LEVEL_3 is done inserting all prefixes into its nodes. In response, the second node maintenance sub-engine 75b at LEVEL_2 determines that it must now insert the promoted prefix (X:112/5) into a non-full node, which will not overflow. Then, as illustrated by FIG. 9H, the second node maintenance sub-engine 75b inserts the promoted prefix into NODE 2-0 and adds its right side child/pointer information to the node information. LEVEL_2 then sends a child modification message regarding NODE 2-0 to LEVEL_1 via interface I. This child modification message informs the first node maintenance sub-engine 75a that its fill count associated with the left side child pointer (to NODE 2-0) must be increased from 2 to 3. LEVEL_2 also sends a maintenance ready message to LEVEL_1 on the interface K, which indicates that LEVEL_2 is done inserting the prefix X:112/5 into its updated node. LEVEL_1 also determines that it does not have to deal with an overflow because LEVEL_2 did not promote any prefix to LEVEL_1 and LEVEL_1 has already updated its child information (and corresponding SPM, if necessary) associated with the update to NODE 2-0. LEVEL_1 then outputs a maintenance acknowledgment on interface L thereby indicating successful completion of the insert operation and b-tree update (see, FIG. 8B).

Figure 10A:
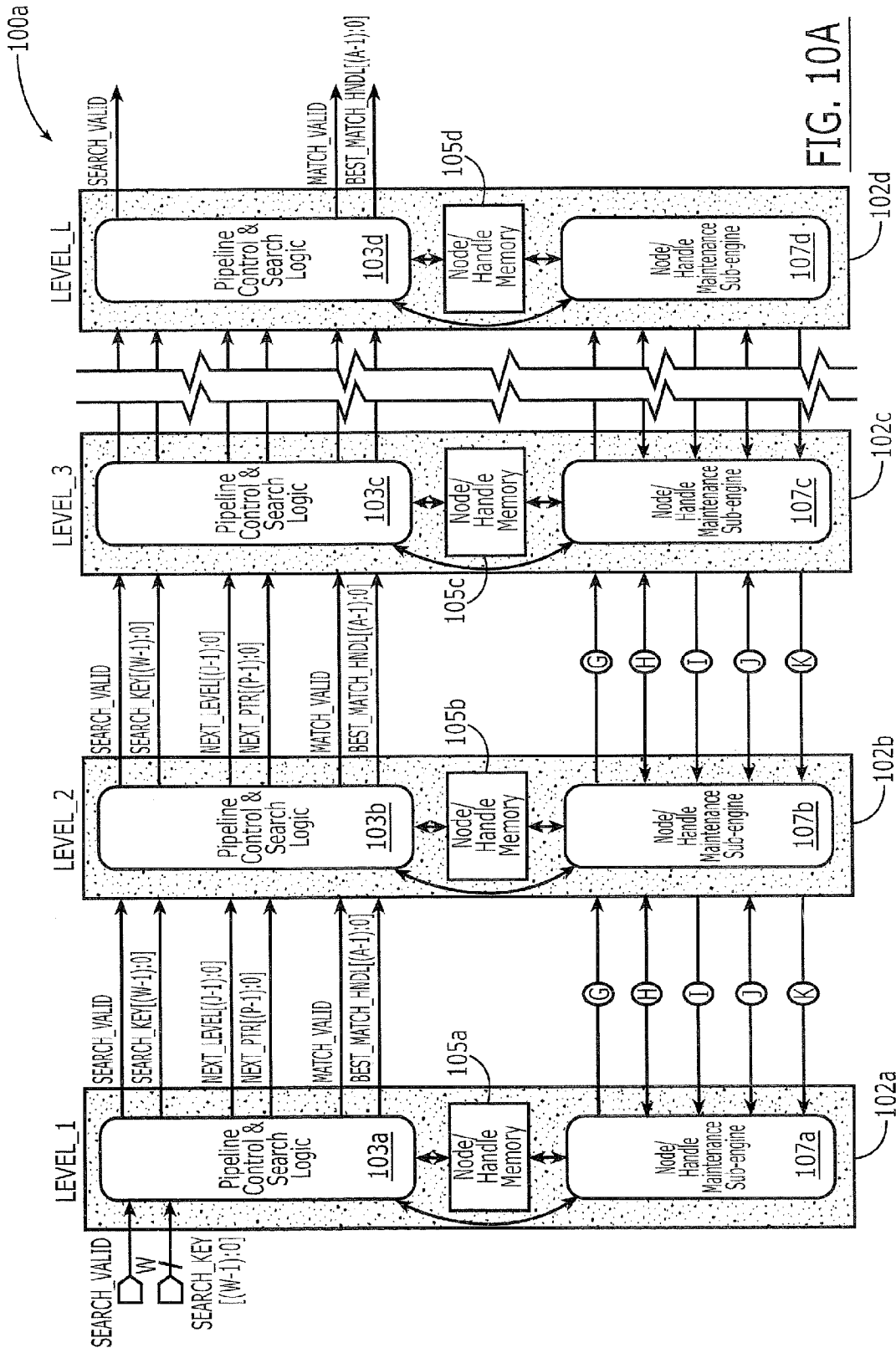
FIGS. 10A-10C are block diagrams of integrated search engine devices according to embodiments of the present invention.

Referring now to FIG. 10A, a pipelined integrated circuit search engine 100a according to additional embodiments of the present invention includes a pipelined arrangement of search and tree maintenance sub-engines 102a-102d therein. Each of these sub-engines 102a-102d includes a corresponding level of a hierarchical memory. Thus, the first search and tree maintenance sub-engine 102a contains the highest level of the hierarchical memory and the fourth search and tree maintenance sub-engine 102d contains the lowest level of the hierarchical memory. The second and third search and tree maintenance sub-engines 102b and 102c contain respective intermediate levels of the hierarchical memory. The number of intermediate levels of the hierarchical memory may vary depending on application. The search and tree maintenance sub-engines 102a to 102d are also identified by the reference labels LEVEL_1, LEVEL_2, LEVEL_3, LEVEL_L, which identify the memory level supported therein. The reference character "L" represents a positive integer equal to a maximum height of the multi-way tree that may be supported by the search engine 100a.

The hierarchical memory is configured to store a multi-way tree (e.g., b-tree, b*tree, b+tree) of search prefixes that spans the plurality of memory levels. As illustrated by FIGS. 4-5 and 8-9, this hierarchical memory may also be configured to store span prefix masks (SPMs) for search prefixes located on non-leaf nodes of the tree. Moreover, according to the search engine 100a of FIG. 10A, the hierarchical memory is further configured to store data associated with the search prefixes, which is referred to herein as "associated data". As will be understood by those skilled in the art, one type of associated data is typically referred to as a "handle," which may, in some embodiments, represent an address (e.g., router address, memory address, etc.) that is provided to an output interface of the search engine 100a. The hierarchical memory is also configured to support increases in a height of the multi-way tree relative to a leaf node level of the multi-way tree, which is fixed in location at a lowest one of the plurality of memory levels (LEVEL_L) within the fourth search and tree maintenance sub-engine 102d. These increases in the height of the multi-way tree typically occur as a capacity of the multi-way tree increases in response to search prefix insertions.

Referring still to FIG. 10A, the first search and tree maintenance sub-engine 102a is illustrated as including a first pipeline control and search logic module 103a, also referred to herein more generally as a first control module, a first node/handle memory 105a, which operates as a highest memory level within the hierarchical memory, and a node/handle maintenance sub-engine 107a. This node/handle maintenance sub-engine 107a performs operations similar to those described above with respect to the node maintenance sub-engines 75a-75d and handle maintenance sub-engine 85 illustrated by FIG. 7. Upon commencement of a search operation, the first control module 103a receives a search valid signal SEARCH_VALID, which initiates a search operation within the search engine 100a when asserted, and a corresponding applied search key SEARCH_KEY[(W−1):0]. In response, the first control module 103a may generate a plurality of signals that are passed downstream to the next control module within the pipeline. This next control module is illustrated as the second control module 103b.

The plurality of signals that are passed downstream from the first control module 103a are illustrated as: SEARCH_VALID, SEARCH_KEY[(W−1):0], NEXT_LEVEL[(J−1):0], NEXT_PTR[(P−1):0], MATCH_VALID and BEST_MATCH_HNDL[(A−1):0]. This passing of the plurality of signals need not occur during the same clock cycle(s). In particular, whenever a search and tree maintenance sub-engine completes its role in a search operation, the search request and search key are passed, along with the search results, to the next control module (in the pipeline) via the SEARCH_VALID and SEARCH_KEY[(W−1):0] signals so that the search operands propagate downstream from sub-engine to sub-engine.

Upon commencement of a search operation, the first search and tree maintenance sub-engine 102a evaluates a locally stored root level indicator (ROOT_LEVEL) and a locally stored root pointer (ROOT_PTR) to determine whether the highest one of the plurality of memory levels residing therein contains a root node of the multi-way tree and, if so, the location (e.g., memory address) of the root node designated by the root pointer ROOT_PTR. The presence of the root node within the highest memory level (LEVEL_1) indicates that the multi-way tree is at a maximum height and spans all memory levels within the hierarchical memory. When this is the case, the first search and tree maintenance sub-engine 102a participates in the requested search operation, beginning at the memory location identified by the root pointer ROOT_PTR. According to some embodiments of the invention, the root level indicator ROOT_LEVEL and root pointer ROOT_PTR may be stored within the logic (e.g., registers) associated with the first control module 103a.

In the event the root level indicator ROOT_LEVEL specifies that the root node of the multi-way tree resides within the highest memory level (LEVEL_1), then upon completion of a first level search and generation of a non-match result, the first search and tree maintenance sub-engine 102a will: (i) set its output NEXT_LEVEL[(J−1):0] to a value that specifies LEVEL_2 as the next memory level to continue the search operation; and (ii) set its output NEXT_PTR[(P−1):0] to a value that identifies the location of the next node of the multi-way tree in LEVEL_2 to be evaluated during the pipelined search operation. The value of NEXT_PTR[(P−1):0] issued by the first control module 103a is based on a node branching decision made during the search of the root node within LEVEL_1 of the hierarchical memory.

In the event the search engine is configured as an exact match search engine requiring fully specified search prefixes within the b-tree and the first level search results in an exact match search result, thereby indicating a match between a search prefix residing at the root node and the applied search key (i.e., SEARCH_KEY[(W−1):0]), then the output NEXT_LEVEL[(J−1):0] may be set to a default value that precludes all downstream search and tree maintenance sub-engines from participating in the search and corrupting the search results associated with the first level search. The output NEXT_PTR[(P−1):0] may also be set to a default value or a "don't care" value. For example, the output NEXT_LEVEL [(J−1):0] may be set to a default value greater than the numeric value of the last memory level within the pipeline (i.e., greater than the value of integer L), so that none of the downstream search and tree maintenance sub-engines consider a match with the value NEXT_LEVEL[(J−1):0] generated by a preceding sub-engine. The output MATCH_VALID will also be asserted by the first control module 103a to reflect the presence of a match with the search prefix located at the root node. Furthermore, the output BEST_MATCH_HNDL [(A−1):0] will be set to the value of the locally stored handle (or possibly other associated data) that corresponds to the matching search prefix within the LEVEL_1 memory. In alternative embodiments of the present invention, the assertion of the MATCH_VALID signal at the output of a sub-engine can be used to block downstream sub-engines from participating in any search operations. The use of an asserted MATCH_VALID signal to block subsequent search operations can be used to eliminate a need to set the NEXT_LEVEL [(J−1):0] signal to the default value.

As a further alternative, if the root level indicator ROOT_LEVEL designates that the root node of the multi-way tree resides within a lower memory level (e.g., LEVEL_2 through LEVEL_L), then the first search and tree maintenance sub-engine 102a will set its output NEXT_LEVEL[(J−1):0] to a value that specifies the memory level containing the root node of the multi-way tree and set its output NEXT_PTR[(P−1):0] to the value of the root pointer ROOT_PTR that is locally stored within the first control module 103a.

The continuation of the search operation to the next highest memory level causes the second highest search and tree maintenance sub-engine 102b (LEVEL_2) to evaluate its input NEXT_LEVEL [(J−1):0], which specifies whether it is to participate in the search operation (either as a root note or as a branch node stemming from the root node residing in LEVEL_1). If the second search and tree maintenance sub-engine 102b is to participate in the search operation, then the value of the input NEXT_PTR[(P−1):0] will specify the location of the node within the LEVEL_2 memory to continue the search by comparing the applied search prefix SEARCH_KEY[(W−1):0] against the search prefixes stored within the designated node. This continuation of the search may result in the generation of a branching pointer to the LEVEL_3 memory. This means the signals NEXT_LEVEL [(J−1):0] and NEXT_PTR[(P−1):0] generated by the second control module 103b will reflect LEVEL_3 as the next level to participate in the search and also designate the corresponding node within LEVEL_3 to evaluate as the search operation continues. If the search within the second search and tree maintenance sub-engine 102b is successful at identifying a match with the applied search prefix (SEARCH_KEY[(W−1):0], then output MATCH_VALID will be asserted by the second control module 103b to reflect the presence of a match with the applied search prefix. The output BEST_MATCH_HNDL[(A−1):0] will also be set to the value of the handle (or possibly other associated data) that corresponds to the matching search prefix within the LEVEL_2 memory.

On the other hand, if the received NEXT_LEVEL [(J−1):0] signal specifies a value other than LEVEL_2 (e.g., LEVEL_3), then the second search and tree maintenance sub-engine 102b will not participate in the search operation, but will merely pass all its inputs: SEARCH_VALID, SEARCH_KEY[(W−1):0] NEXT_LEVEL [(J−1):0], NEXT_PTR[(P−1):0], MATCH_VALID and BEST_MATCH_HNDL[(A−1):0] downstream to the third search and tree maintenance sub-engine 102c for further processing.

These above-described search operations continue in a similar manner for each of the downstream sub-engines 102c and 102d, as each level of multi-way tree is traversed. In this manner, the search results propagate through the search pipeline until a final result is generated by the last sub-engine 102d associated with LEVEL_L of the hierarchical memory. This final result is reflected in the value of the MATCH_VALID signal, which reflects whether or not a match has been detected. If a match has been detected, then value of the BEST_MATCH_HANDLE[(A−1):0] generated by the last sub-engine 102d will correspond to the handle of the matching search prefix within the multi-way tree.

Figure 10B:
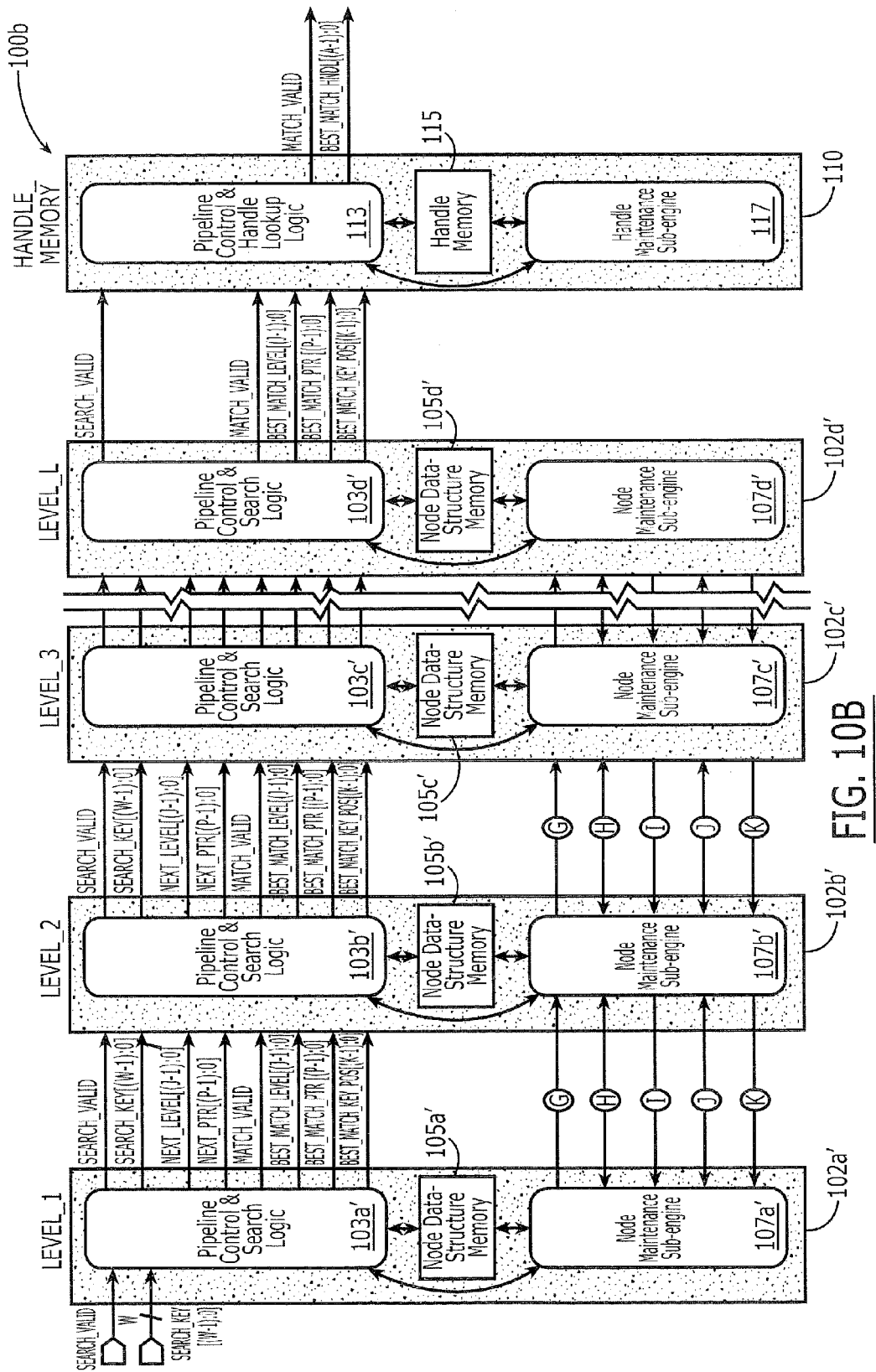

Referring now to FIG. 10B, a pipelined integrated circuit search engine 100b according to an additional embodiment of the present invention is illustrated. In this search engine 100b, the first, second, third and fourth search and tree maintenance engines 102e-102d' are each illustrated as including respective control modules 103a'-103d', node memories 105a'-105d' and node maintenance sub-engines 107a'-107d'.

This search engine 100b is similar to the search engine 100a of FIG. 10A, however, the associated data (e.g., prefix handles), which was stored locally in each of the plurality of memory levels (LEVEL_1-LEVEL_L) illustrated in FIG. 10A, is now aggregated together within a dedicated handle memory lookup engine 110. This handle memory lookup engine 110 includes a pipeline control and handle lookup module 113, handle memory 115 and a handle maintenance sub-engine 117, which is communicatively coupled by an interface P (not shown) to the node maintenance sub-engines 107a'-107d'. The handle memory lookup engine 110 is configured as a last stage to the pipelined search engine 100b. To support the transfer of the prefix handles to a dedicated handle memory lookup engine 110, the output signal lines associated with the BEST_MATCH_HANDLE[(A−1):0] in FIG. 10A are replaced by the following signal lines: BEST_MATCH_LEVEL[(J−1):0], BEST_MATCH_PTR[(P−1):0] and BEST_MATCH_KEY_POS[(K−1):0]. The signal BEST_MATCH_LEVEL[(J−1):0] identifies the level within the multi-way tree that contains the matching search prefix and the signal BEST_MATCH_PTR[(P−1):0] identifies the "matching" node. The signal BEST_MATCH_KEY_POS [(K−1):0] identifies the location of the search prefix within the "matching" node. These three signals are referred to herein collectively as the BEST_MATCH_* signals.

Figure 11A:
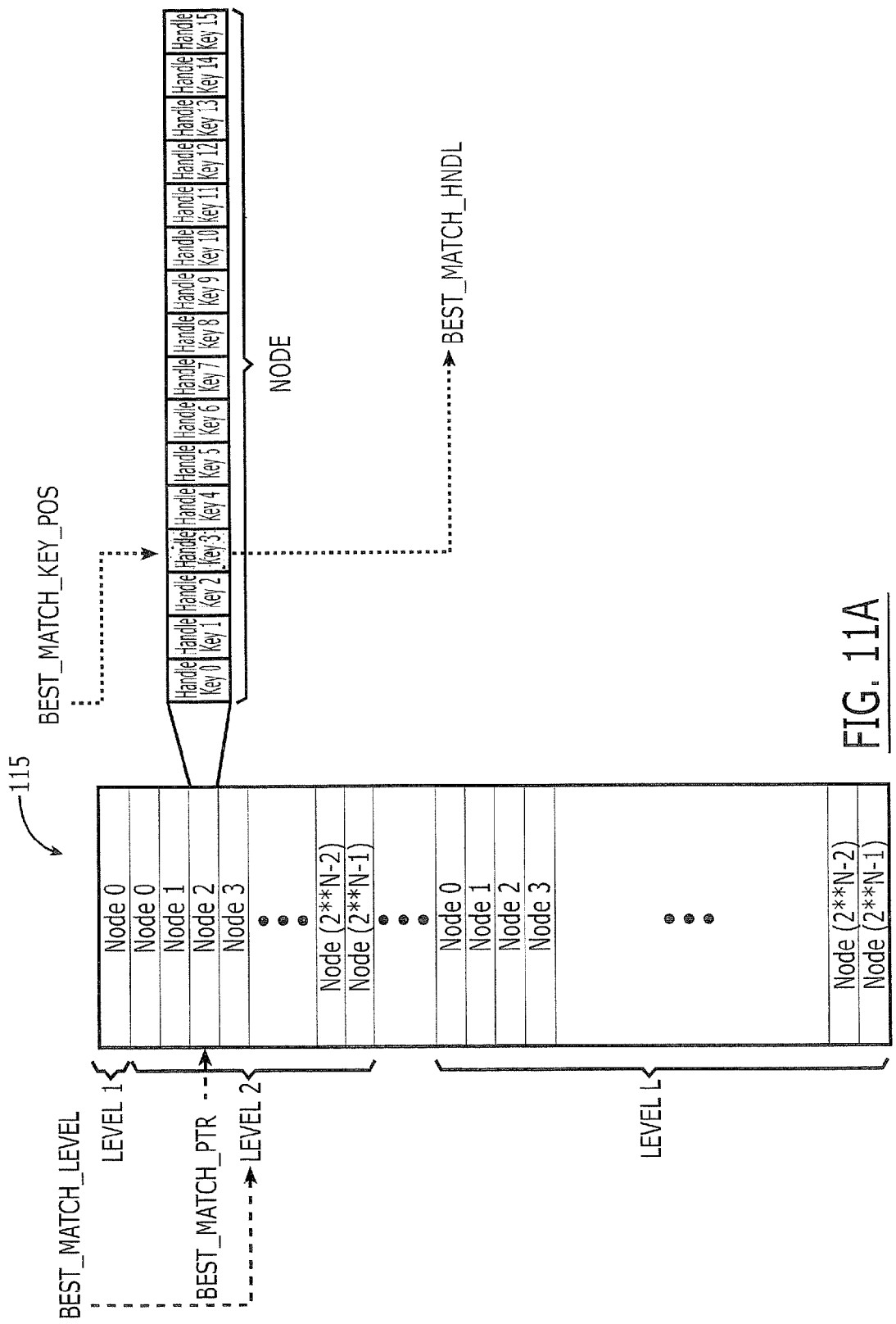
FIGS. 11A-11B are schematic diagrams that illustrate various allocations handles within a handle memory used in integrated search engine devices according to embodiments of the present invention.

Upon detection of an exact match within the search engine 100b, the BEST_MATCH_* signals are passed to the handle memory lookup engine 110, where they are then used as corresponding portions of a memory address. This memory address is applied as a read address to handle memory 115, to thereby obtain a handle associated with the matching search prefix (i.e., matching entry) within the multi-way tree. This handle (BEST_MATCH_HNDL[(A−1):0]) is then passed to the output of the search engine device 100b to complete the search operation. As illustrated by FIG. 11A, this handle memory 115 may be allocated so that all handles are grouped hierarchically (i) by level within the multi-way tree (selected by BEST_MATCH_LEVEL[(J−1):0]), (ii) by node within a respective level (selected by BEST_MATCH_PTR[(P−1):0]); and (iii) by position within a respective node (selected by BEST_MATCH_KEY_POS[(K−1):0]).

Figure 10C:
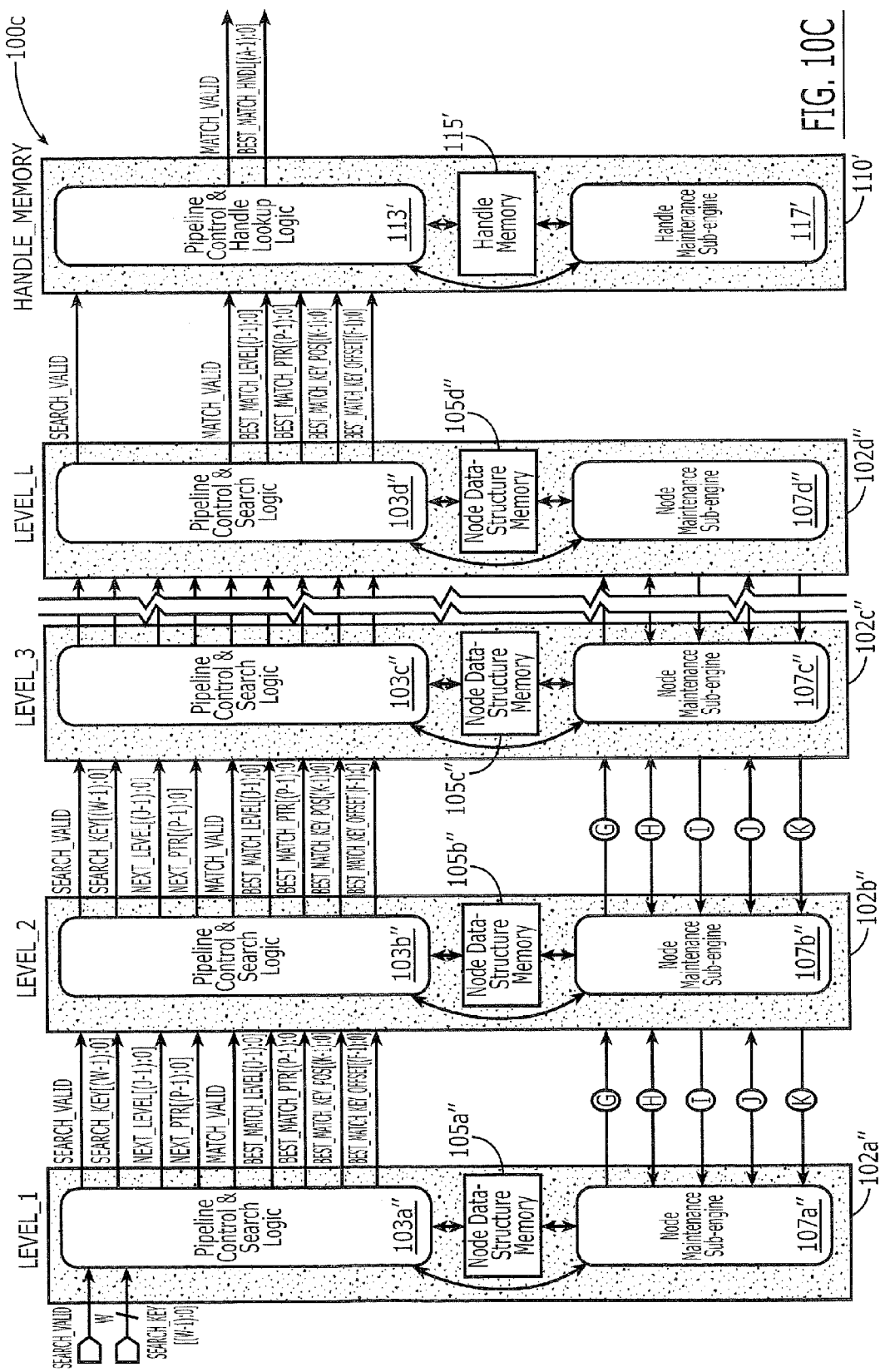

Referring now to FIG. 10C, a pipelined integrated circuit search engine 100c according to another embodiment of the invention may be configured to have LPM capability, which is the capability to identify a search prefix that represents a longest prefix match with an applied search prefix. In this case, the hierarchical memory within the search engine 100c is configured to store an SPM with each search prefix located above the lowest memory level (LEVEL_L) (i.e., for all search prefixes that do not reside at a leaf level of the multi-way tree). Operations to derive SPMs for search prefixes within a multi-way tree are described more fully hereinabove with respect to FIGS. 4A-4D and TABLES 2-6. In this search engine 100c, the first, second, third and fourth search and tree maintenance engines 102a''-102d'' are each illustrated as including respective control modules 103a''-103d'', node memories 105a''-105d'' and node maintenance sub-engines 107e-107d''. In addition, the handle memory lookup engine 110' includes a pipeline control and handle lookup module 113', handle memory 115' and a handle maintenance sub-engine 117', which is communicatively coupled by an interface P (not shown) to the node maintenance sub-engines 107a''-107d''.

Figure 11B:
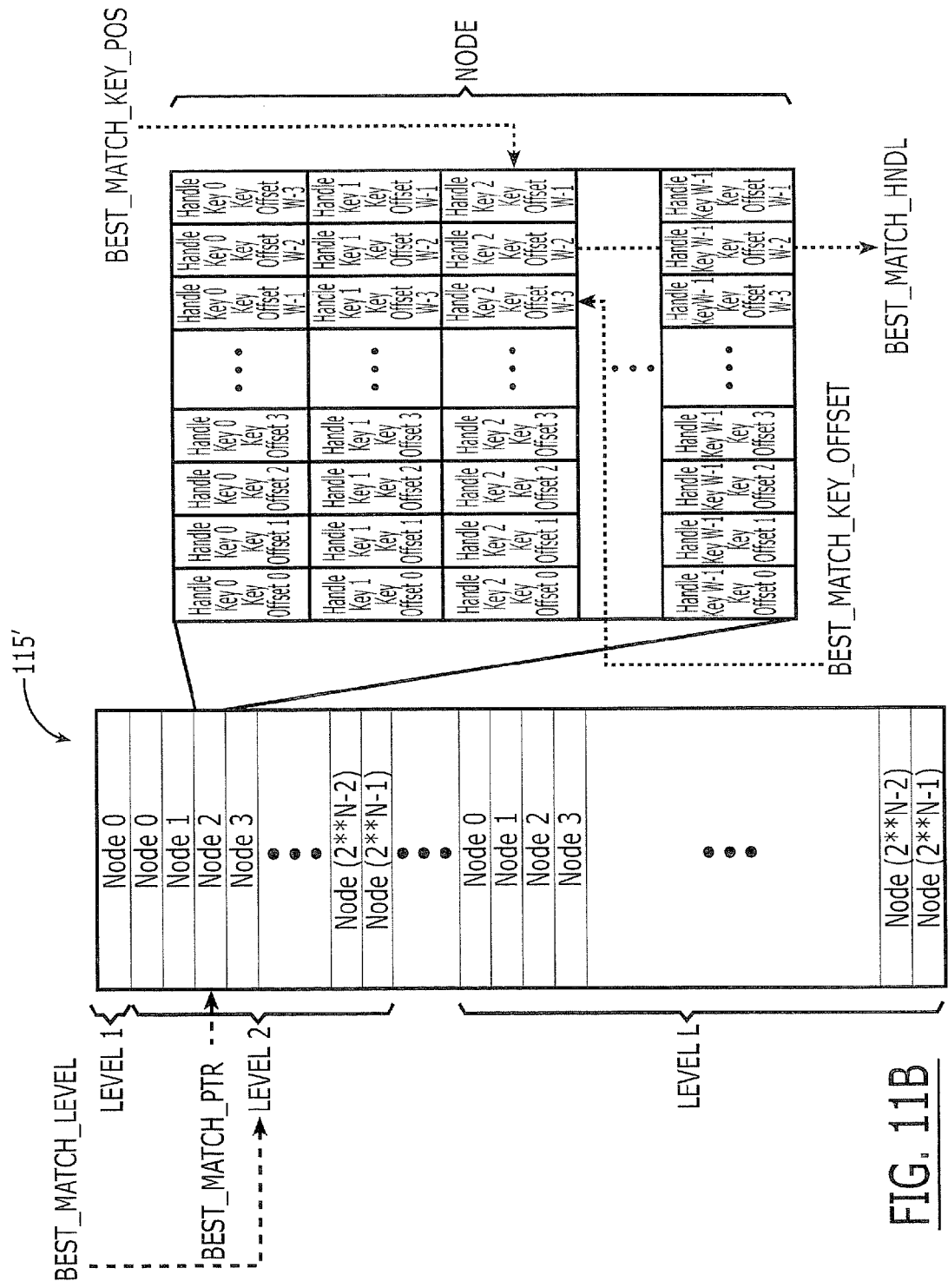

In particular, the search engine 100c of FIG. 10C is similar to the search engine 100b of FIG. 10B, however, an additional signal BEST_MATCH_KEY_OFFSET[(F−1):0] is generated by each of the sub-engines 102a''-102d'' within the pipeline. This additional signal identifies the location of an asserted bit (or set bit position) within an SPM associated with a search prefix that is evaluated during a corresponding search operation. Thus, using the b-tree 40 of FIG. 4B as an example of a multi-way tree supported by the search engine 100c, the identity of the seventh bit of the SPM associated with the search prefix R:170/8 at node 1-1 of the b-tree 40 would be specified by the signal BEST_MATCH_KEY_OFFSET [(F−1):0] for the case of an applied search prefix equal to 171. Referring now to FIGS. 11B and 4C.2, the handle memory 115' used within the search engine 100c may be allocated so that all handles are grouped hierarchically (i) by level within the multi-way tree (selected by BEST_MATCH_LEVEL[(J−1):0]), (ii) by node within a respective level (selected by BEST_MATCH_PTR[(P−1):0]); (iii) by position within a respective node (selected by BEST_MATCH_KEY_POS[(K−1):0]); and (iv) by an offset within a respective position (selected by BEST_KEY_OFFSET[(F−1):0]). Alternatively, the handle memory 115' may be configured as illustrated by FIG. 4D.2.

According to further embodiments of the present invention, the search engine devices illustrated by FIGS. 6-7 and 10A-10C may be configured to perform tree update operations concurrently with ongoing search operations. In particular, as illustrated by FIGS. 12A-12B and 13A-13D, the search engine devices described herein may be configured to support the performance of fixed-latency search operations on exclusively valid multi-way trees of search prefixes concurrently with tree update operations, which include variable-latency tree update operations and fixed-latency tree update operations.

Figure 12A:
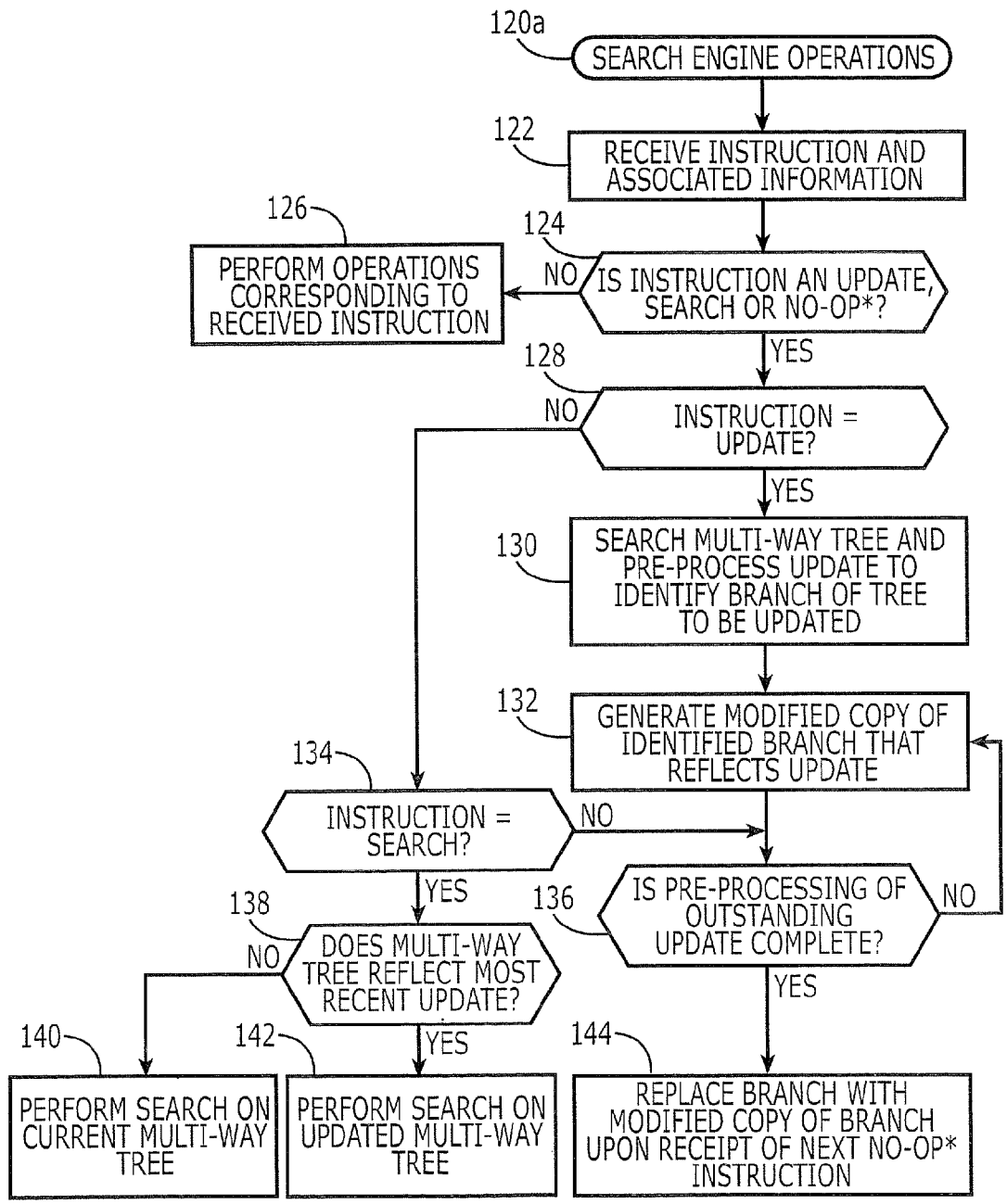
FIGS. 12A-12B are flow diagrams that illustrate methods of performing tree-based search operations concurrently with tree update operations, according to embodiments of the present invention.

As shown by FIG. 12A, search engine operations 120a according to embodiments of the present invention include operations to receive an instruction supported by the search engine along with related information (e.g., applied search prefix) associated with the instruction, Block 122. A check can be made to determine whether the received instruction is an update instruction (e.g., insert, delete), a search instruction or a no-op* instruction, Block 124. As defined herein, a no-op* instruction represents a conventional no-op instruction that is received while operations associated with an update instruction are being performed within the search engine. If this check at Block 124 results in a "yes" determination, another check may be performed to determine whether the received instruction is an update instruction, Block 128. Otherwise, operations corresponding to another type of instruction (e.g., key read, flush) are performed, Block 126. If the check performed at Block 128 results in a "yes" determination, then an update operation commences by searching a multi-way tree within the search engine with an applied search prefix to be inserted or deleted. This search operation is performed to identify nodes of the tree that are within the search path associated with the applied search prefix. Once the nodes of the tree within the search path have been identified, operations are performed to identify a branch of the tree that is to be modified in response to the update instruction, Block 130. A modified copy of the identified branch of the tree, which reflects the appropriate update (i.e., search key insertion or deletion), is then generated, Block 132. The operations associated with Blocks 130 and 132 may be performed concurrently with additional operations to search the multi-way tree in response to search instructions received subsequent to the update instruction. Referring now to Block 136, a check is made to determine whether operations necessary to generate a modified copy of the identified branch of the tree have been completed. If this check results in a "no" determination, then the operations performed by Block 132 are continued. However, if this check results in a "yes" determination, then operations are performed to substitute the modified copy of the identified branch, which has been generated in response to the update instruction, for the branch of the multi-way tree identified at Block 130, Block 144. This substitution operation may be performed upon receipt of the next no-op* instruction, which is treated herein as a branch replacement instruction. The operations associated with Block 144 may be performed as pipelined operations having the same latency as a fixed-latency search operation.

Referring again to Block 128, if the check of whether the received instruction represents an update instruction results in a "no" determination, then another check can be made to determine whether the received instruction is a search instruction, Block 134. If this check at Block 134 results in a "yes" determination, another check can be made to determine whether the multi-way tree reflects a most recent update, Block 138. If this check results in a "no" determination, then the requested search can be performed on the current multi-way tree, Block 140. However, if the check results in a "yes" determination, then the requested search can be performed on the most recently updated multi-way tree, Block 142. This check at Block 138 is merely illustrative of the fact that each search operation is performed on an exclusively valid tree and not one that can possibly represent a "partially updated" condition. However, in the embodiments described herein, a check operation, such as the one illustrated by Block 138, is not performed. Instead, each search operation passes through the pipelined arrangement of sub-engines (see, e.g., FIGS. 7 and 10A-10C), which properly reflect the state of a valid tree even if the tree has not yet been updated (in response to a branch replacement operation) to reflect a previously received update instruction. Thus, as described above, and illustrated by FIGS. 13A-13D described hereinbelow, the concurrent nature of the search and update operations makes it appear as if the operations associated with an update (insert or delete) occur atomically between two consecutive searches even when the update operations actually span multiple searches.

Alternatively, if the check at Block 134 results in a "no" determination, which means the received instruction is a no-op* instruction, then operations are performed to replace the previously identified branch (see Block 130), with the modified copy of the branch, Block 144, if the pre-processing identified at the decision Block 136 reflects a completed status of the update pre-processing.

Figure 12B:
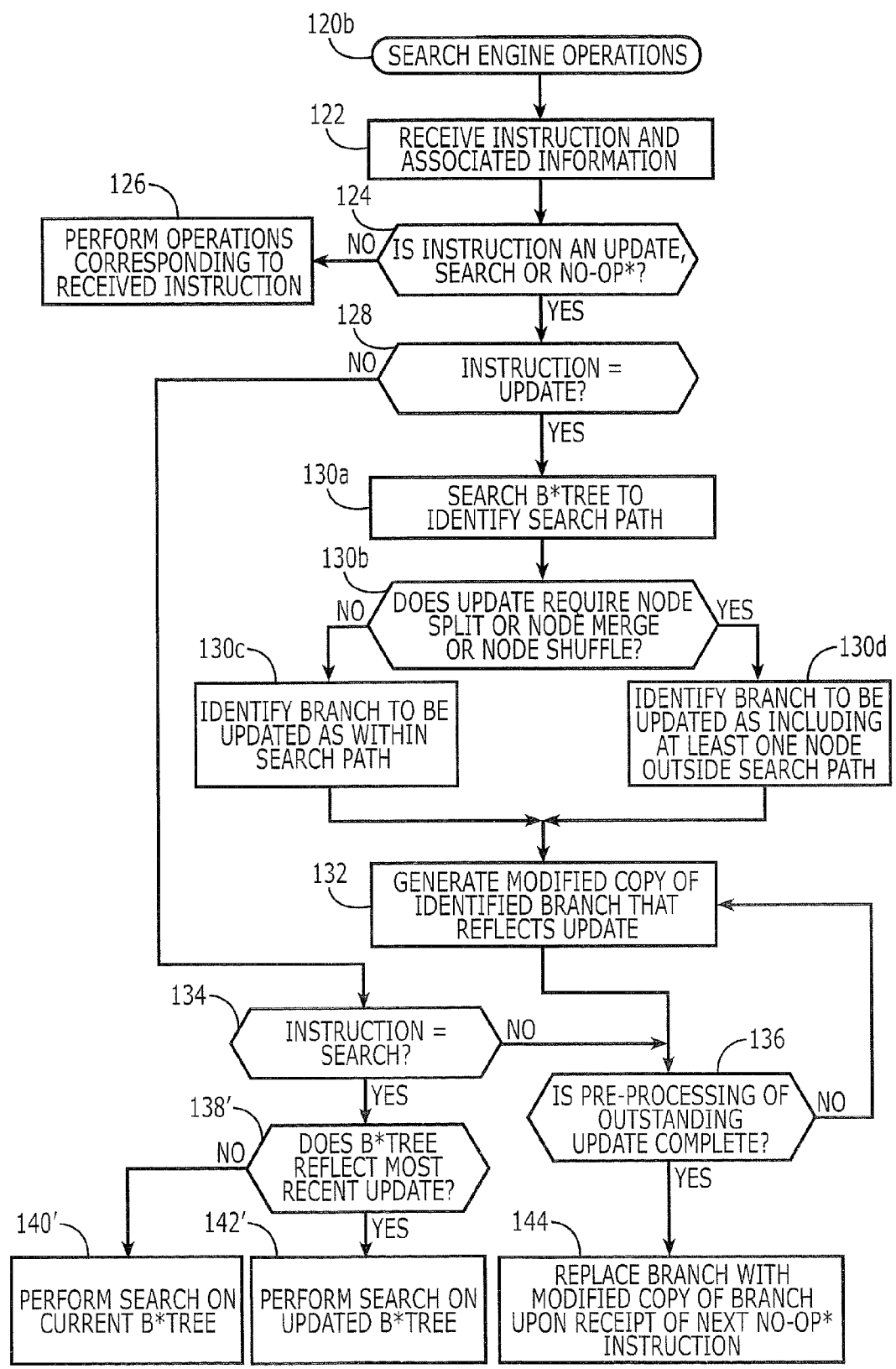

The search engine operations 120b illustrated by FIG. 12B are similar to those illustrated by FIG. 12A, however, the operations 120b correspond to those that may be performed by a search engine configured to support at least one b*tree-based database. In particular, the operations 120b include operations to receive an instruction supported by a b*tree-based search engine along with related information (e.g., applied search prefix) associated with the instruction, Block 122. A check can be made to determine whether the received instruction is an update instruction (e.g., insert, delete), a search instruction or a no-op* instruction, Block 124. If this check at Block 124 results in a "yes" determination, another check may be performed to determine whether the received instruction is an update instruction, Block 128. Otherwise, operations corresponding to another type of instruction are performed, Block 126. If the check performed at Block 128 results in a "yes" determination, then an update operation commences by searching a b*tree within the search engine with an applied search prefix to be inserted or deleted. This search operation is performed to identify a search path associated with the applied search prefix to be deleted or inserted, Block 130a.

A check may then be made to determine whether the update will ultimately result in a node split, node merge or possibly a node shuffle (i.e., shuffle of keys amongst nodes, without causing a node split or merge), Block 130b. If no node split, node merge or node shuffle is required, then the branch to be updated will be identified as being exclusively within the search path, Block 130c. However, if a node split, node merge or node shuffle is required, then the branch to be updated will be identified as including at least one node outside the search path, Block 130d.

Referring now to Block 132, a modified copy of the identified branch of the b*tree is then generated to reflect the update (insert or delete). The operations associated with the generation of the modified copy can be performed as background operations within the search engine, which do not interfere with concurrent foreground operations (e.g., search operations). This lack of interference may be achieved by setting the priority of update related operations as having lower priority to search engine resources (e.g., memory accesses, etc.) relative to search operations during resource arbitration within the search engine.

Referring now to Block 136, a check is made to determine whether operations necessary to generate a modified copy of the identified branch of the tree have been completed. If this check results in a "no" determination, then the operations performed by Block 132 are continued. However, if this check results in a "yes" determination, then operations are performed at Block 144 to substitute the modified copy of the identified branch, which has been generated in response to the update instruction, for the branch of the b*tree identified at Block 130c or Block 130d. This substitution operation may be performed upon receipt of the next no-op* instruction, which is treated herein as a branch replacement instruction. The operations associated with Block 144 may be performed as pipelined operations having the same latency as a fixed-latency search operation.

Referring again to Block 128, if the check of whether the received instruction represents an update instruction results in a "no" determination, then another check can be made to determine whether the received instruction is a search instruction, Block 134. If this check at Block 134 results in a "yes" determination, another check can be made to determine whether the b*tree reflects a most recent update, Block 138'. If this check results in a "no" determination, then the requested search can be performed on the current b*tree, Block 140'. However, if the check results in a "yes" determination, then the requested search can be performed on the most recently updated b*tree, Block 142'. As described above with respect to FIG. 12A, the check at Block 138' is merely illustrative of the fact that each search operation is performed on an exclusively valid tree and not one that can possibly represent a "partially updated" condition.

Alternatively, if the check at Block 134 results in a "no" determination, which means the received instruction is a no-op* instruction, then operations are performed to replace the previously identified branch (see Blocks 130a-130d), with the modified copy of the branch, Block 144, if the pre-processing identified at the decision Block 136 reflects a completed status of the update pre-processing.

Figure 13A:
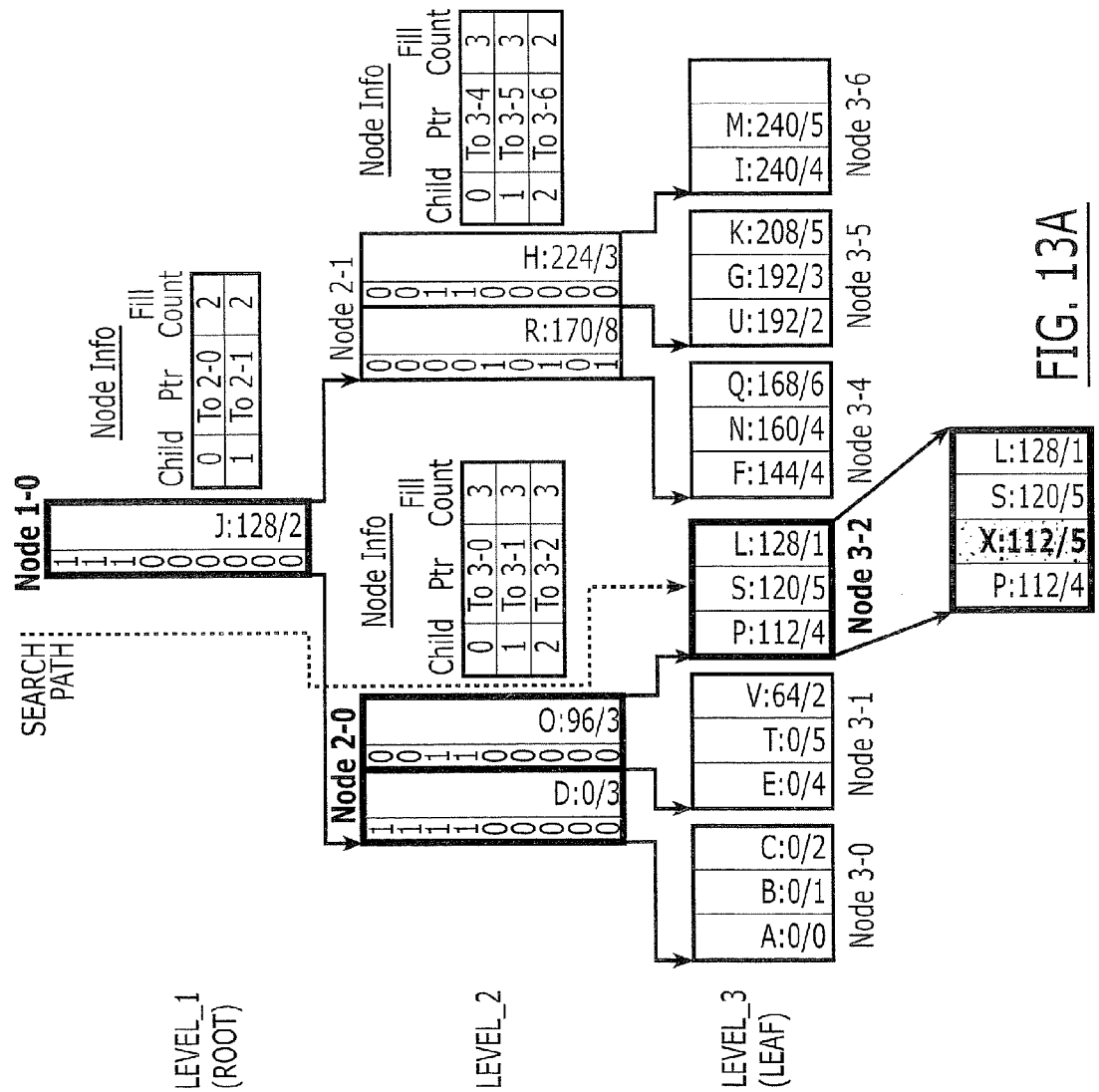
FIGS. 13A-13D illustrate operations to insert a search prefix into a b*tree by generating a modified copy of a branch of the b*tree and performing a branch substitute operation on the b*tree, according to embodiments of the present invention.
Figure 13B:
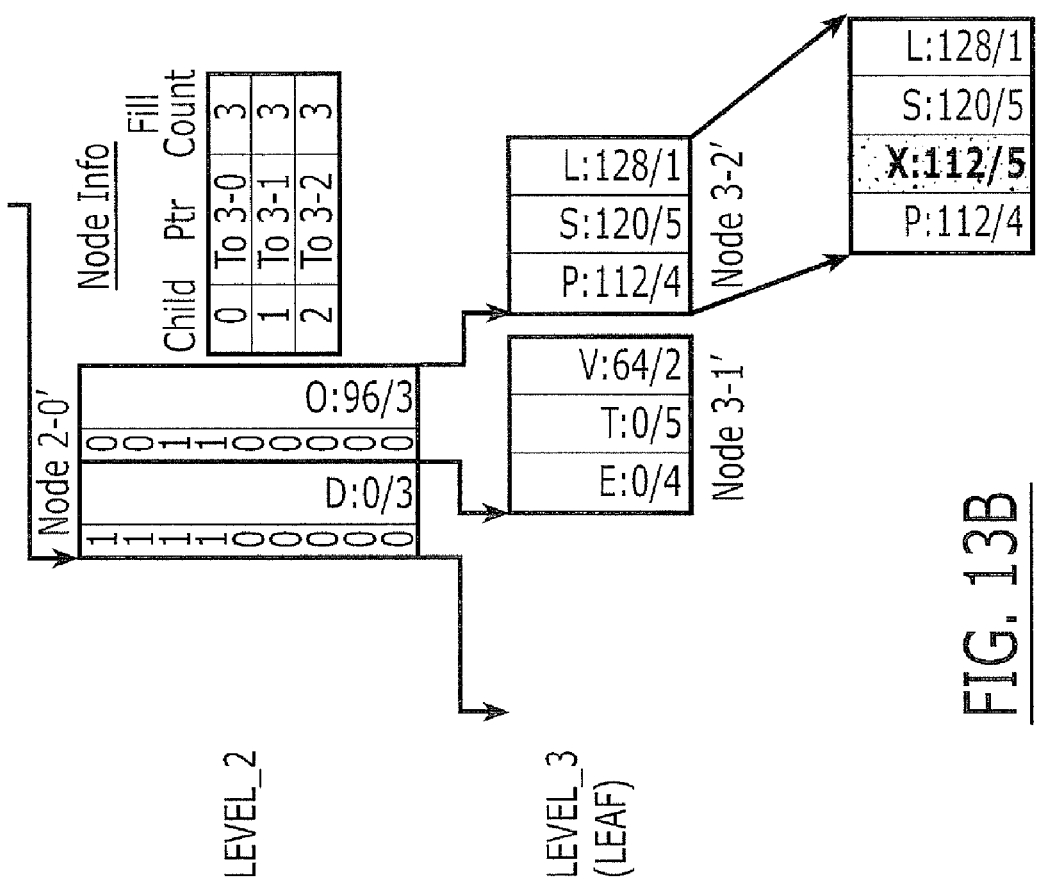
Figure 13C:
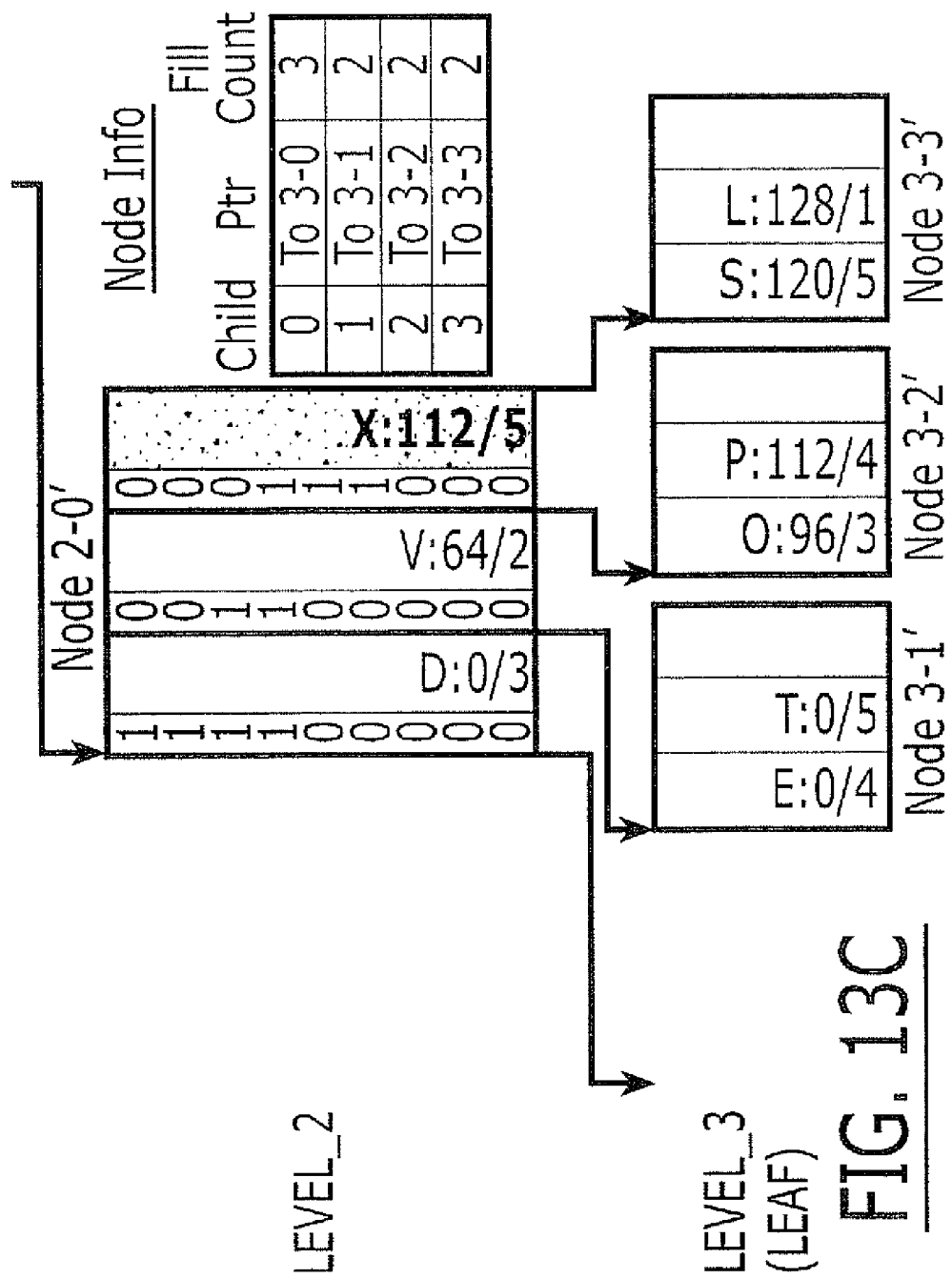
Figure 13D:
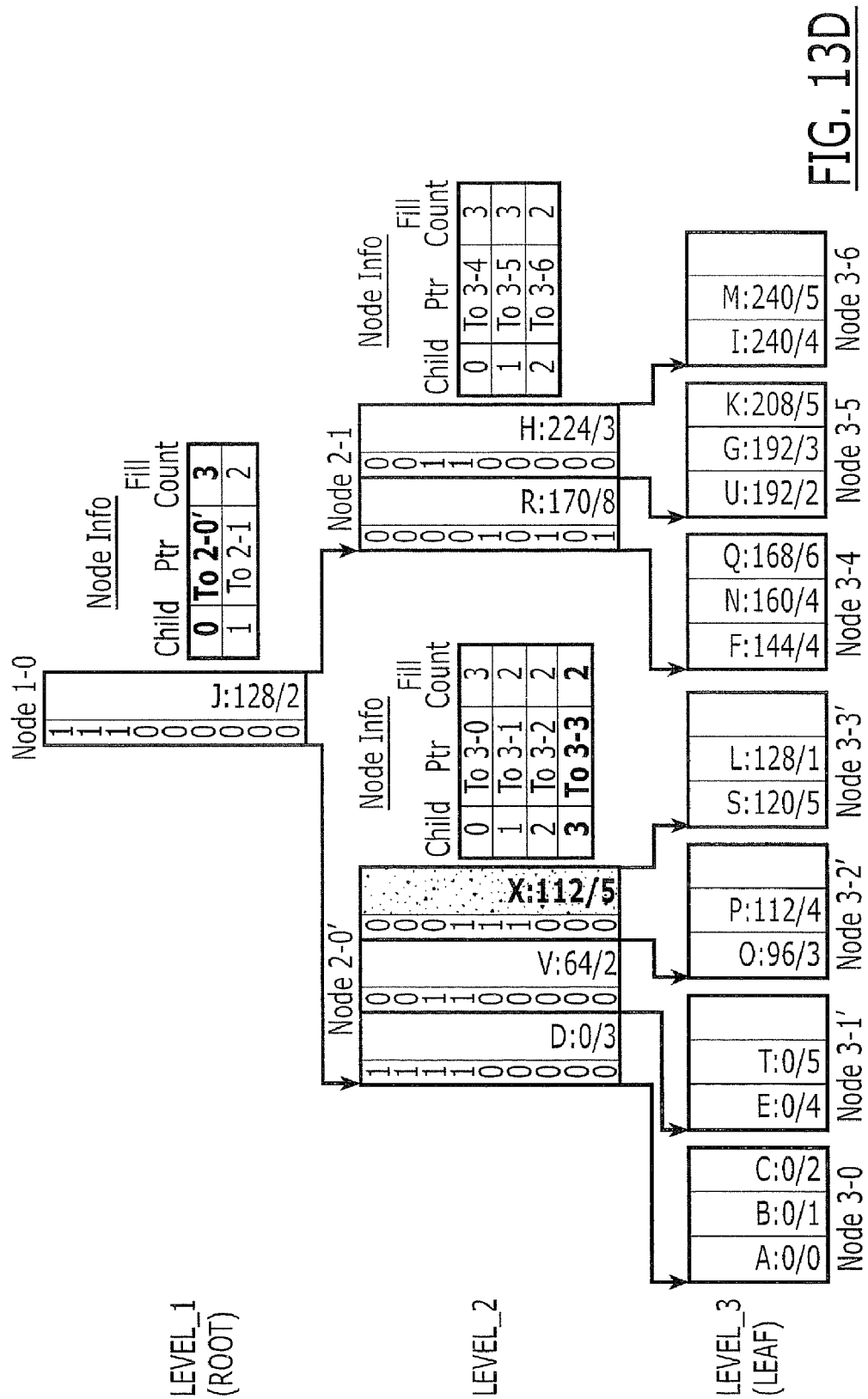
Figure 14:
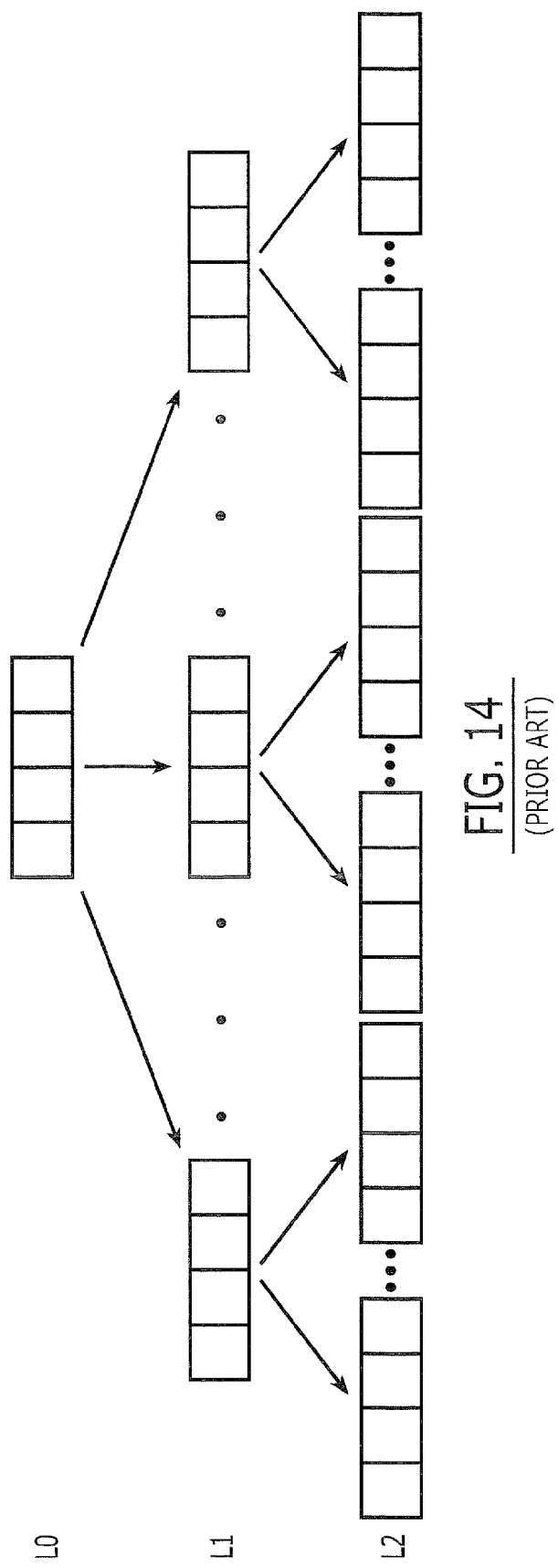
FIG. 14 illustrates a conventional three-level b*tree data structure of ¾ efficiency (i.e., N/(N+1)=¾), having four key locations per node.
Figure 15A:
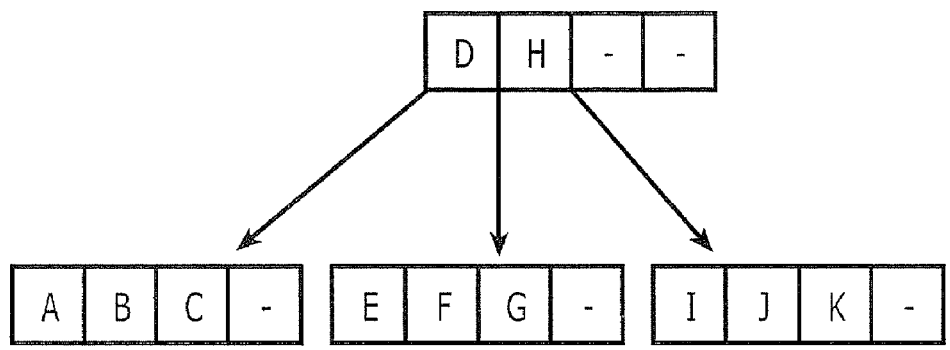
FIG. 15A illustrates a portion of a b*tree having a parent node and three sibling nodes with excess capacity.
Figure 15B:
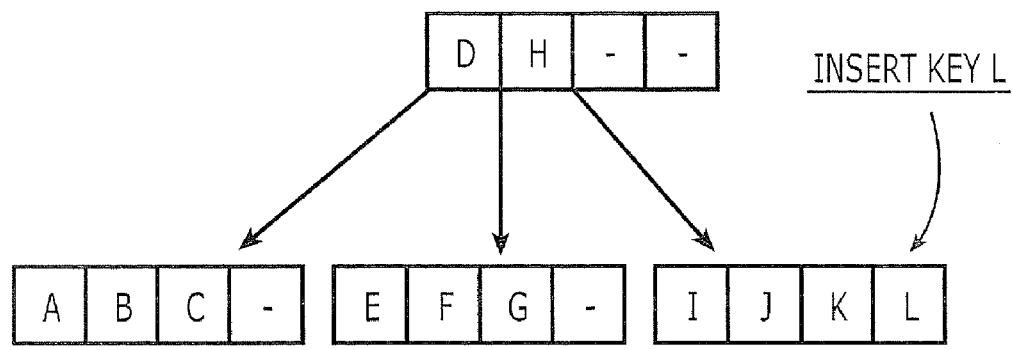
FIG. 15B illustrates an example of a search key insertion into the b*tree of FIG. 15A.
Figure 15C:
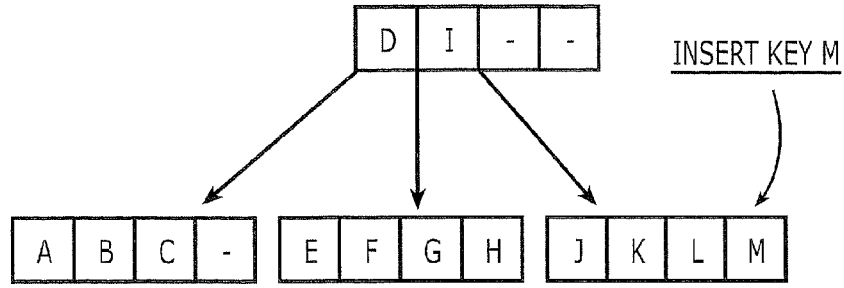
FIG. 15C illustrates an example of a search key insertion into the b*tree of FIG. 15B, which requires an overflow into an adjacent sibling node.
Figure 15D:
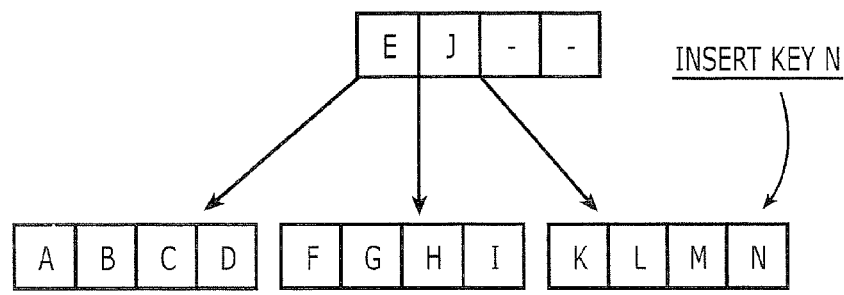
FIG. 15D illustrates an example of a search key insertion into the b*tree of FIG. 15C, which requires an overflow into non-adjacent sibling node.
Figure 15E:
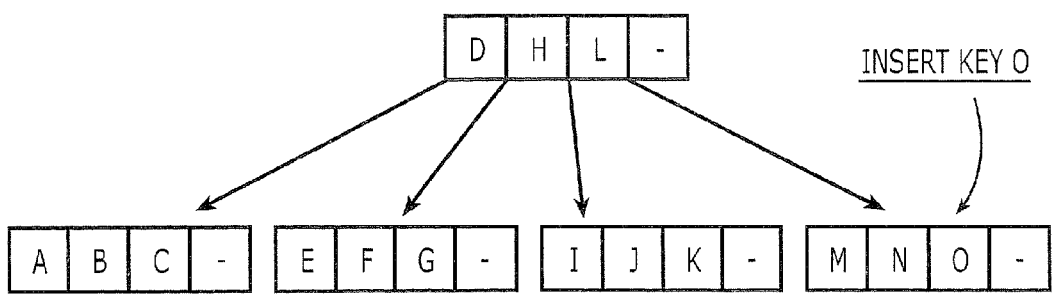
FIG. 15E illustrates an example of a search key insertion into the b*tree of FIG. 15D, which requires a 3-4 split for the b*tree to remain structurally correct.
Figure 16A:
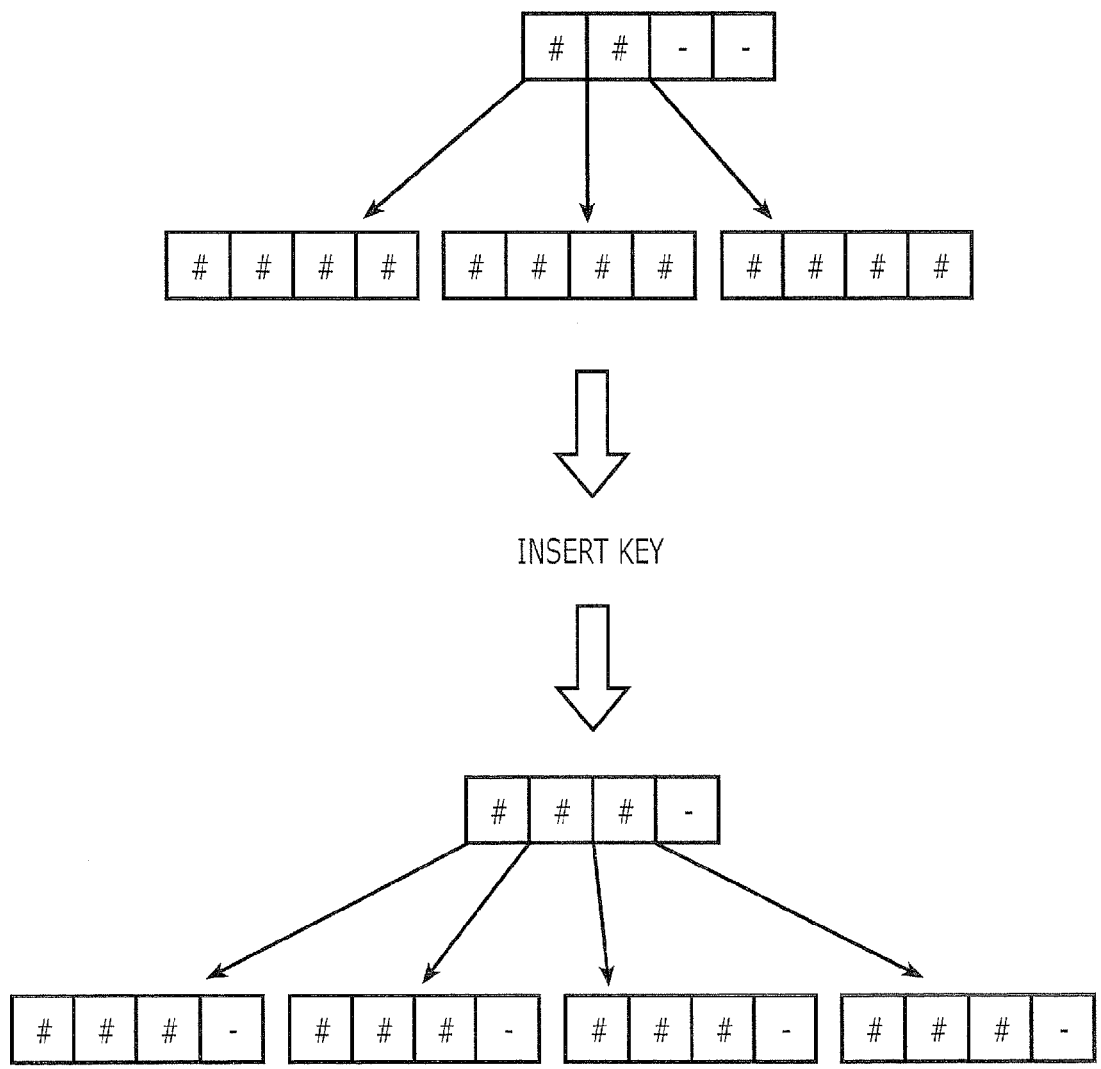
FIG. 16A illustrates an example of a search key insertion into a b*tree that requires a split to remain structurally correct.
Figure 16B:
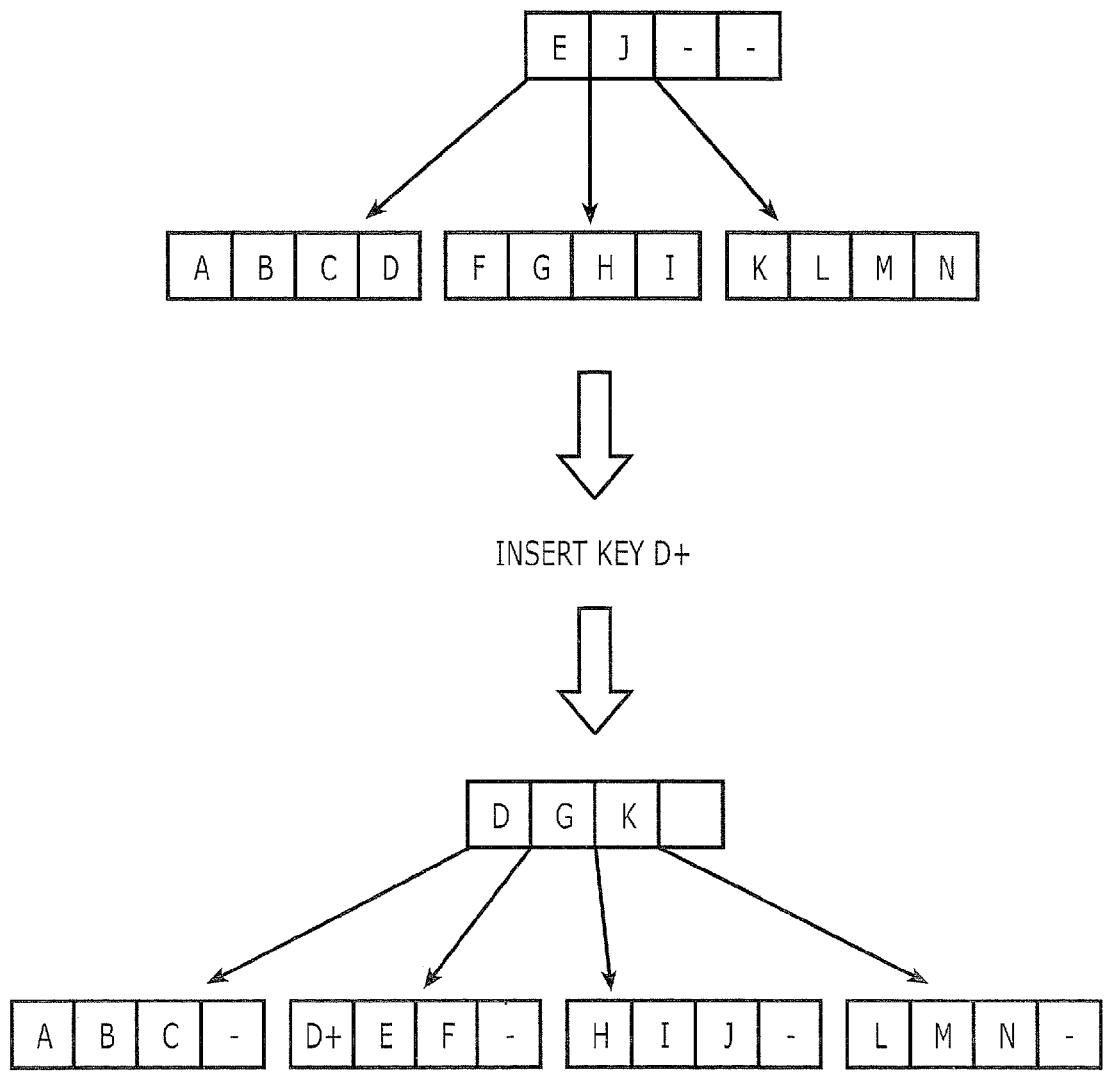
FIG. 16B illustrates an example of a search key insertion (search key D+) into a b*tree that requires a split to remain structurally correct.
Figure 16C:
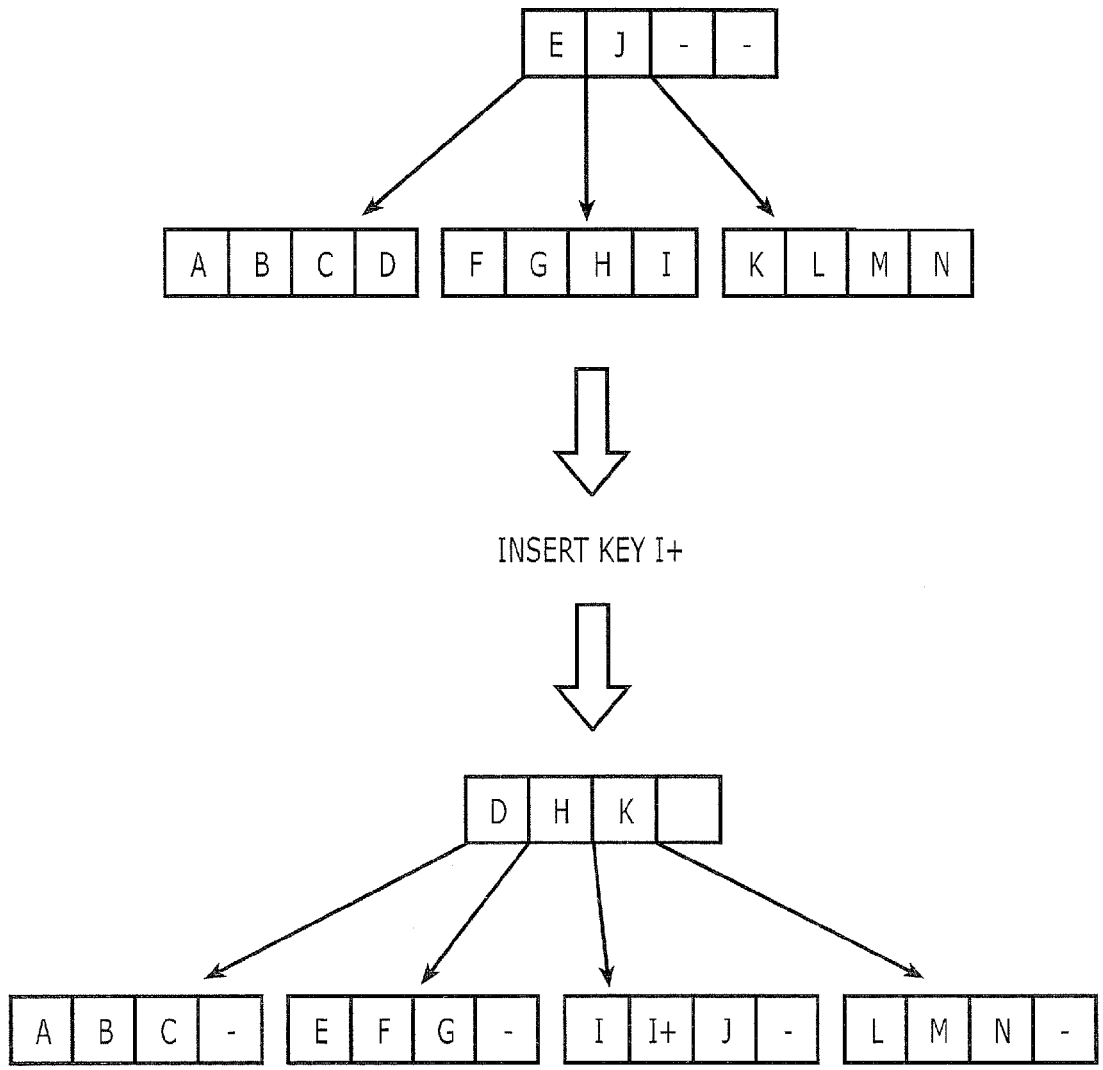
FIG. 16C illustrates an example of a search key insertion (search key I+) into a b*tree that requires a split to remain structurally correct.
Figure 16D:
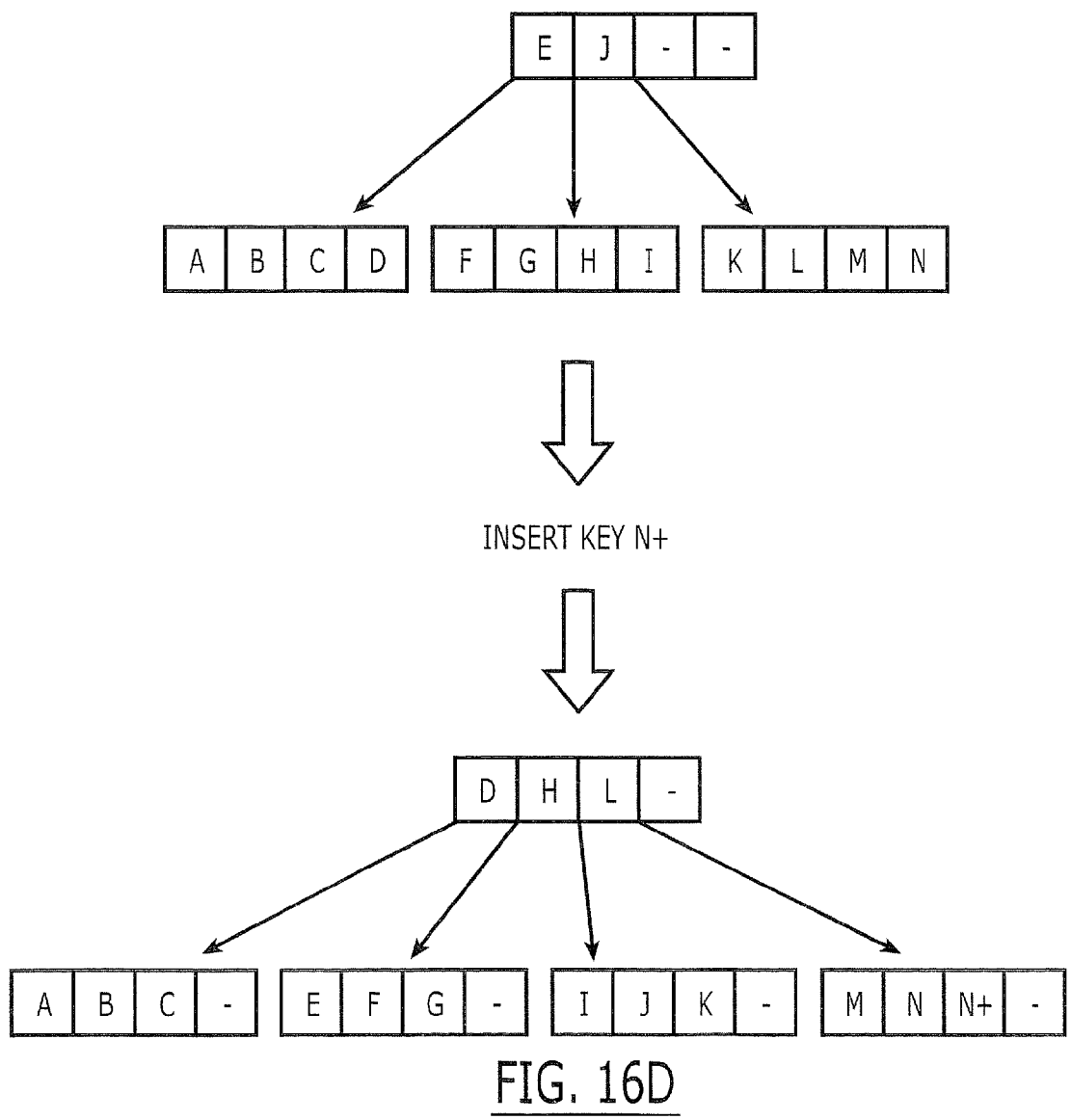
FIG. 16D illustrates an example of a search key insertion (search key N+) into a b*tree that requires a split to remain structurally correct.

The operations described above with respect to FIG. 12B can also be illustrated by the b*tree example of FIGS. 13A-13D. As highlighted by FIG. 13A, which shows an exemplary three-level b*tree, the receipt of an instruction to insert a search prefix (X:112/5) into the b*tree results in the performance of a search of the b*tree to identify a search path associated with the applied search prefix (X:112/5). This search path is illustrated as passing through nodes 1-0, 2-0 and 3-2. Because the insertion of the applied search prefix will result in a split between nodes 3-1 and 3-2 and an addition to node 2-0, a copy of a branch of the b*tree containing nodes 2-0, 3-1 and 3-2 is made. This copy is illustrated by the branch of FIG. 13B, which contains nodes 2-0', 3-1' and 3-2'. As illustrated by the modified branch of FIG. 13C and described more fully with respect to FIGS. 8A-8B and 9A-9H, the insertion of the applied search prefix into the copy of the branch results in a modification to nodes 2-0', 3-1' and 3-2' and the creation of a new node 3-3'. As described above with respect to FIGS. 12A-12B, these operations to modify the nodes 2-0', 3-1' and 3-2' may be performed as background operations that are performed concurrently with foreground operations to search the current b*tree. A substitute operation is then performed to replace the branch of the current b*tree containing nodes 2-0, 3-1 and 3-2 with the modified branch illustrated by FIG. 13C and update the child information (i.e., fill count) associated with node 1-0. This substitute operation, which may be performed in response to treating a received no-op* instruction as a branch replacement instruction, results in the generation of the updated b*tree illustrated by FIG. 13D. The latency associated with the branch replacement instruction may be equivalent to the latency of a search instruction.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
a search engine having a pipelined arrangement of a plurality of search and tree maintenance sub-engines, wherein the search engine is configured to: (i) perform search operations on multi-way trees of search prefixes, (ii) concurrently perform update operations on the multi-way trees as they are being searched, and (iii) perform an update operation on a first multi-way tree by generating a modified copy of a first branch of the first multi-way tree, wherein the modified copy comprises a plurality of temporary node pointers associated with copies of nodes of the first branch of the first multi-way tree, wherein the plurality of temporary node pointers are generated by extracting the plurality of temporary node pointers from a free list within the search engine, and wherein the modified copy of the first branch does not comprise all nodes of the first multi-way tree.

2. The integrated circuit device of claim 1, wherein the search engine is further configured to perform an insert-type update operation on the first multi-way tree by searching the first multi-way tree to identify the first branch thereof that is to receive a search prefix to be inserted.

3. The integrated circuit device of claim 1, wherein the modified copy of the first branch is generated by (a) copying a portion of the first branch and (b) modifying the copied portion after a request to perform the update operation is received.

4. The integrated circuit device of claim 2, wherein the search engine is further configured to update the first multi-way tree by removing the first branch from the first multi-way tree and substituting the modified copy of the first branch therefor.

5. The integrated circuit device of claim 4, wherein the search engine is configured to return node pointers within the first branch to the free list in response to removing the first branch from the first multi-way tree.

6. The integrated circuit device of claim 4, wherein the search engine is configured so that operations to generate a modified copy of the first branch can be performed concurrently with operations to search the first branch of the first multi-way tree.

7. An integrated circuit device, comprising:
a search engine configured to support search operations on multi-way trees of search prefixes concurrently with tree update operations that comprise replacing branches of the multi-way trees with modified copies of the branches that reflect updates to the multi-way trees, wherein the modified copies of the branches are generated by generating a plurality of temporary node pointers associated with copies of nodes of the branches of the multi-way trees, wherein the plurality of temporary node pointers are generated by extracting the plurality of temporary node pointers from a free list within the search engine, and wherein each of the modified copies of the branches do not comprise all nodes of the tree to which the modified copy of the branch belongs.

8. The integrated circuit device of claim 7, wherein the tree update operations further comprise a search operation using a search prefix to be inserted into or deleted from the multi-way tree.

9. The integrated circuit device of claim 8, wherein the tree update operations further comprise replacing a first branch of the multi-way tree with a modified copy of the first branch that reflects an update to the first branch using a branch replacement operation having a latency equivalent to a latency of the search operations.

10. The integrated circuit device of claim 7, wherein the tree update operations further comprise replacing a first branch of the multi-way tree with a modified copy of the first branch that reflects an update to the first branch using a branch replacement operation having a latency equivalent to a latency of the search operations.

11. The integrated circuit device of claim 8, wherein the tree update operations are variable-latency operations.

12. An integrated search engine device, comprising:
a pipelined arrangement of a plurality of search and tree maintenance sub-engines configured to: (i) support corresponding levels of a b-tree of search prefixes therein, and (ii) insert search prefixes into the b-tree by modifying copies of a plurality of nodes within the b-tree and by generating updated pointers to the modified copies of the plurality of nodes before reclaiming the plurality of nodes as free nodes, wherein generating updated pointers comprises generating a plurality of temporary node pointers associated with the copies of the plurality of nodes within the b-tree, wherein the plurality of temporary node pointers are generated by extracting the plurality of temporary node pointers from a free list within the search engine, and wherein the plurality of nodes does not comprise all nodes of the b-tree.

13. An integrated search engine device, comprising:
a pipelined arrangement of a plurality of search and tree maintenance sub-engines configured to: (i) support corresponding levels of a b-tree of search prefixes therein and (ii) support upstream and downstream communications between the plurality of search and tree maintenance sub-engines during operations to insert search prefixes into the b-tree by modifying copies of a plurality of nodes within the b-tree and by generating updated pointers to the modified copies of the plurality of nodes before reclaiming the plurality of nodes as free nodes, wherein generating updated pointers comprises generating a plurality of temporary node pointers associated with the copies of the plurality of nodes within the b-tree, wherein the plurality of temporary node pointers are generated by extracting the plurality of temporary node pointers from a free list within the search engine, and wherein the plurality of nodes does not comprise all nodes of the b-tree.

14. A method of updating an integrated circuit search engine device, comprising:
searching a multi-way tree within the search engine device to identify a first branch of the tree that is to receive a first search prefix, in response to an insert instruction;
generating a modified copy of the first branch that includes the first search prefix concurrently with searching at least a portion of the first branch of the tree with a second search prefix associated with a search instruction, wherein generating a modified copy of the first branch comprises generating a plurality of temporary node pointers associated with copies of nodes of the first branch, wherein the plurality of temporary node pointers are generated by extracting the plurality of temporary node pointers from a free list within the search engine, and wherein the modified copy of the first branch does not comprise all nodes of the multi-way tree; and replacing the first branch of the tree with the modified copy of the first branch.

15. The method of claim 14, wherein a latency associated with replacing the first branch of the tree is equivalent to a latency associated with the search instruction.

16. The method of claim 15, wherein a latency associated with the insert instruction is variable; and wherein the latency associated with the search instruction is fixed.

17. The method of claim 14, wherein replacing the first branch of the tree comprises replacing the first branch of the tree with the modified copy of the first branch, in response to treating a no-op instruction received by the search engine device as a branch replacement instruction.

18. The method of claim 14, wherein generating the modified copy of the first branch comprises generating the modified copy of the first branch using operations having lower priority to memory resources within the search engine device relative to operations to search the multi-way tree in response to the search instruction.

19. An integrated circuit device, comprising:

a search engine having a pipelined arrangement of a plurality of search and tree maintenance sub-engines, wherein the search engine is configured to: (i) perform fixed-latency search operations on multi-way trees of search prefixes concurrently with variable-latency tree update operations, and (ii) perform an update operation on a first multi-way tree by generating a modified copy of a first branch of the first multi-way tree, wherein the modified copy comprises a plurality of temporary node pointers associated with copies of nodes of the first branch of the first multi-way tree, wherein the plurality of temporary node pointers are generated by extracting the plurality of temporary node pointers from a free list within the search engine, and wherein the modified copy of the first branch does not comprise all nodes of the first multi-way tree.

* * * * *